(12) United States Patent
Sorenson et al.

(10) Patent No.: US 7,729,379 B2
(45) Date of Patent: *Jun. 1, 2010

(54) MAPPING OF BIT STREAMS INTO MPEG FRAMES

(75) Inventors: Donald C. Sorenson, Lawrenceville, GA (US); Richard J. Futch, Lawrenceville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 1344 days.

This patent is subject to a terminal disclaimer.

(21) Appl. No.: 10/245,032

(22) Filed: Sep. 17, 2002

(65) Prior Publication Data

US 2003/0053476 A1  Mar. 20, 2003

Related U.S. Application Data

(60) Provisional application No. 60/322,966, filed on Sep. 18, 2001, provisional application No. 60/338,868, filed on Nov. 13, 2001, provisional application No. 60/342,627, filed on Dec. 20, 2001, provisional application No. 60/397,987, filed on Jul. 23, 2002.

(51) Int. Cl.
*H04J 3/24* (2006.01)
(52) U.S. Cl. ..................................... 370/473
(58) Field of Classification Search ......... 370/389–391, 370/394, 395.5–395.52, 470–474, 532–544
See application file for complete search history.

(56) References Cited

U.S. PATENT DOCUMENTS 5,086,425 A * 2/1992 Le Goffic et al. ........... 370/545

5,715,356 A * 2/1998 Hirayama et al. ............ 386/96

(Continued)

OTHER PUBLICATIONS

"DAVIC 1.5 Specification, DAVIC Intranet, Technical Platform Specification (Provisional Document Structure), Revision 1.0," Digital Audio-Visual Council, Geneva, Switzerland, 1999, pp. i-xii and 1-27.

(Continued)

*Primary Examiner*—Thai D Hoang
(74) *Attorney, Agent, or Firm*—Tarolli, Sundheim, Covell & Tummino LLP

(57) ABSTRACT

An architecture for providing high-speed access over frequency-division multiplexed (FDM) channels allows transmission of ethernet frames and/or other data across a cable transmission network or other form of FDM transport. The architecture involves downstream and upstream FDM multiplexing techniques to allow contemporaneous, parallel communications across a plurality of frequency channels. Each downstream data flow is fragmented into individual octets that are multiplexed into MPEG packets. An MPEG packet may carry the octets for a plurality of individual data flows. Furthermore, the MPEG packets may be frequency-division multiplexed across and may be contemporaneously communicated over a plurality of frequency channels. Also, the octets from a data flow do not necessarily have to use consecutive octets in an MPEG packet. Instead, consecutive octets in an MPEG packet may carry information for two different data flows. Thus, in an MPEG packet there may be intervening octets that might be allocated to other data flows between the octets of an ethernet frame or other type of data from one data flow. In addition, the data flows carried in MPEG packets may support one or a plurality of client devices. Therefore, an MPEG packet may be used to time-division multiplex multiple data flows to one or a plurality of client devices.

15 Claims, 29 Drawing Sheets

U.S. PATENT DOCUMENTS

| | | | |
|---|---|---|---|
| 5,740,075 A | 4/1998 | Bigham et al. | 364/514 |
| 5,818,512 A | 10/1998 | Fuller | 348/8 |
| 5,872,784 A | 2/1999 | Rostoker et al. | 370/395 |
| 5,892,535 A | 4/1999 | Allen et al. | 348/9 |
| 5,987,518 A | 11/1999 | Gotwald | 709/230 |
| 6,636,531 B1* | 10/2003 | Nakashima et al. | 370/505 |
| 6,778,495 B1* | 8/2004 | Blair | 370/230 |
| 6,870,861 B1* | 3/2005 | Negishi et al. | 370/537 |
| 7,088,398 B1* | 8/2006 | Wolf et al. | 348/423.1 |
| 2002/0007494 A1* | 1/2002 | Hodge | 725/109 |
| 2002/0126685 A1 | 9/2002 | Leatherbury et al. | 370/432 |
| 2004/0264511 A1* | 12/2004 | Futch et al. | 370/535 |
| 2005/0100076 A1* | 5/2005 | Gazdzinski et al. | 375/130 |
| 2008/0092183 A1* | 4/2008 | Sorenson et al. | 725/109 |

OTHER PUBLICATIONS

"DAVIC 1.5 Specification, DAVIC Cable Modem (Technical Specification), Revision 3.1," Digital Audio-Visual Council, Geneva, Switzerland, 1999, pp. 1-134.

"Data-Over-Cable Service Interface Specifications, Radio Frequency Interface Specification", SP-RFI-I05-991105, Cable Television Laboratories, Inc., 1999, pp. i-xii and 1-202.

* cited by examiner

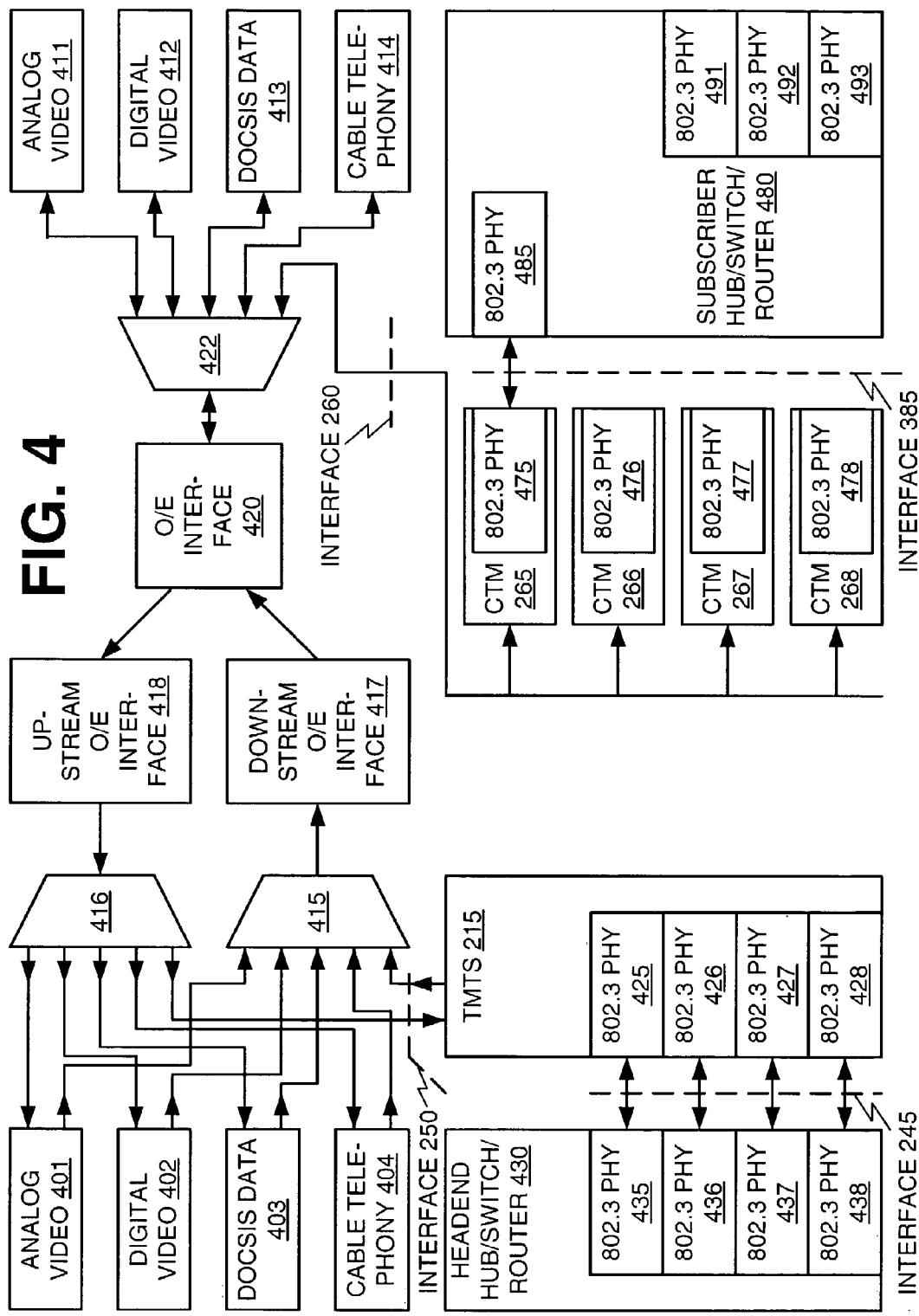

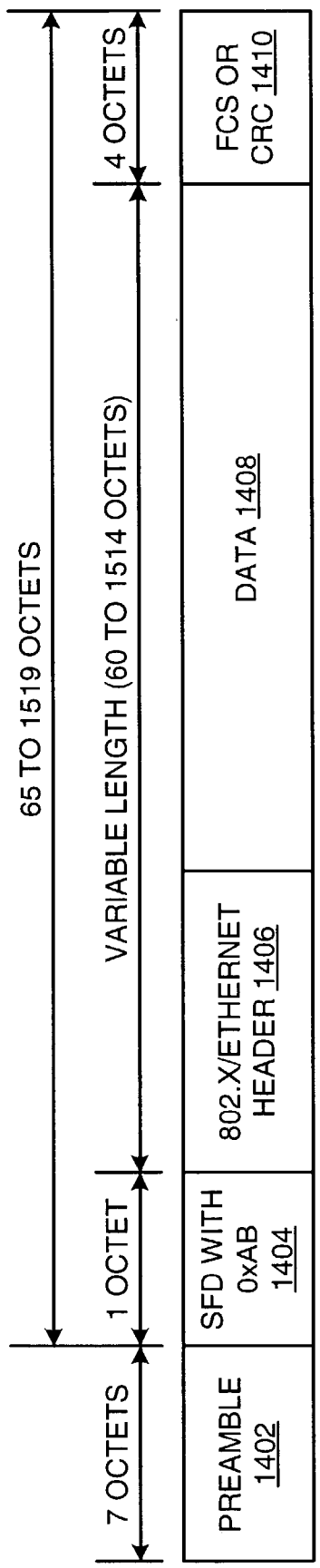
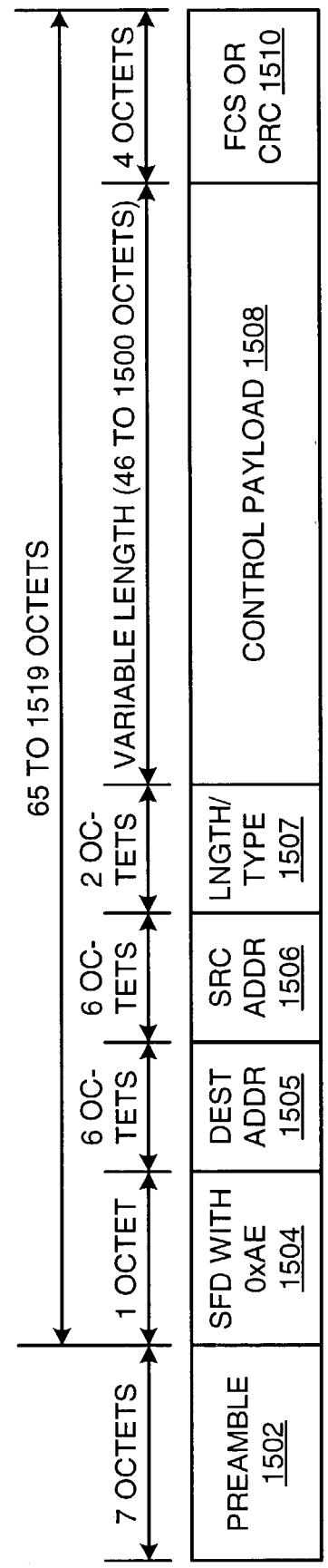
FIG. 14 - PRIOR ART
FIG. 15

FIG. 29

| TMTS MAC ADDRESS (6 OCTETS) 2902 | cTM MAC ADDRESS (6 OCTETS) 2904 | NUMBER OF ASSIGNED PORTS (W) (1 OCTET) 2906 | NUMBER OF ASSIGNED PAYLOAD OCTETS (2 OCTETS) 2908 | NUMBER OF AVAILABLE PAYLOAD OCTETS (2 OCTETS) 2910 |
|---|---|---|---|---|

FIG. 30

| TMTS PORT ID (1 OCTET) 3001 | cTM PORT ID (1 OCTET) 3002 | NUMBER OF PIDS (1 OCTET) 3003 | MPEG PIDS (2 OCTETS) 3004 | MPEG PAYLOAD ALLOCATION BIT MAP (23 OCTETS = 184 BITS) 3005 |
|---|---|---|---|---|
| TMTS PORT ID 1 3011 | cTM PORT ID 1 3012 | X PIDS 3014 | PID 1 3016 | BITMAP PATTERN 1 3018 |
| | | | PID 2 3026 | BITMAP PATTERN 2 3028 |
| | | | ... | ... |
| | | | PID X 3036 | BITMAP PATTERN X 3038 |
| TMTS PORT ID 2 3041 | cTM PORT ID 2 3042 | Y PIDS 3044 | PID 1 3046 | BITMAP PATTERN 1 3048 |
| | | | PID 2 3056 | BITMAP PATTERN 2 3058 |
| | | | ... | ... |
| | | | PID Y 3066 | BITMAP PATTERN Y 3068 |
| ... | ... | ... | ... | ... |
| TMTS PORT ID W 3071 | cTM PORT ID W 3072 | Z PIDS 3074 | PID 1 3076 | BITMAP PATTERN 1 3078 |
| | | | PID 2 3086 | BITMAP PATTERN 2 3088 |
| | | | ... | ... |
| | | | PID Z 3096 | BITMAP PATTERN Z 3098 |

MAPPING OF BIT STREAMS INTO MPEG FRAMES

CROSS-REFERENCE TO RELATED PATENT APPLICATIONS

This present application claims priority to U.S. provisional application having Ser. No. 60/322,966, which was filed on Sep. 18, 2001 and is entirely incorporated herein by reference. Also, this present application claims priority to U.S. provisional application having Ser. No. 60/338,868, which was filed on Nov. 13, 2001 and is entirely incorporated herein by reference. In addition, this present application claims priority to U.S. provisional application having Ser. No. 60/342,627, which was filed on Dec. 20, 2001 and is entirely incorporated herein by reference. Moreover, this present application claims priority to U.S. provisional application having Ser. No. 60/397,987, which was filed on Jul. 23, 2002, and is entirely incorporated herein by reference.

Furthermore, the present application is one of 6 related patent applications that are being filed on the same day. The 6 related patent applications are the following:

U.S. patent application Ser. No. 10/245,054—"Allocation of Bit Streams for Communication over Multi-Carrier Frequency-Division Multiplexing (FDM)"

U.S. patent application Ser. No. 10/245,250—"MPEG Program Clock Reference (PCR) Delivery for Support of Accurate Network Clocks"

U.S. Pat. No. 7,336,680—"Multi-Carrier Frequency-Division Multiplexing (FDM) Architecture for High-Speed Digital Service"

U.S. Pat. No. 7,519,081—"Multi-Carrier Frequency-Division Multiplexing (FDM) Architecture for High Speed Digital Service in Local Networks"

U.S. Pat. No. 7,218,901—"Ethernet over Multi-Carrier Frequency-Division Multiplexing (FDM)"

U.S. patent application Ser. No. 10/245,032—"Mapping of Bit Streams into MPEG Frames"

Also, U.S. Pat. No. 7,218,901, entitled "Ethernet over Multi-Carrier Frequency-Division Multiplexing (FDM)", and filed the same day is incorporated by reference in its entirety herein.

FIELD OF THE INVENTION

The present invention relates generally to the field of communication networks and systems for using frequency-division multiplexing to carry data across broadband networks with the potential to support a plurality of subscribers at high data rates.

BACKGROUND OF THE INVENTION

Many solutions have been tried for delivering digital data services to customers over cable networks. Historically, cable networks were designed for community antenna television (CATV) delivery supporting 6 MHz analog channels that were frequency-division multiplexed into a radio-frequency (RF) medium that was primarily coaxial cable or coax. To support higher throughput and advanced digital services, many of these cable TV networks migrated to a hybrid fiber-coax (HFC) architecture. With the development of HFC networks to support advanced services, such as digital television channels, the capability to provide bi-directional data services also evolved.

At present bi-directional data services are often available to customers using systems based upon the DOCSIS (Data-Over-Cable Service Interface Specifications) industry standards promulgated by Cable Television Laboratories or CableLabs. The DOCSIS standards comprise many documents that specify mechanisms and protocols for carrying digital data between a cable modem (CM), generally located at a customer premises, and a cable modem termination system (CMTS), commonly located within the headend of the service provider. Within distribution networks in the cable industry, data flowing from a service provider to a customer premises is commonly referred to as downstream traffic, while data flowing from a customer premises to a service provider is generally known as upstream traffic. Although DOCSIS is a bridged architecture that is capable of carrying other network protocols besides and/or in addition to the Internet Protocol (IP), it is primarily designed and used for Internet access using IP.

Furthermore, for many cable system operators (also known as multiple system operators or MSOs) the primary market for selling services such as cable TV, Internet access, and/or local phone services has been residential customers. Although DOCSIS cable modems could be used by business customers, DOCSIS was primarily designed to meet the Internet access needs of residential users. To make the deployment of DOCSIS systems economically feasible, the DOCSIS standards were designed to support a large number of price-sensitive residential, Internet-access users on a single DOCSIS system. Though home users may desire extremely high speed Internet access, generally they are unwilling to pay significantly higher monthly fees. To handle this situation DOCSIS was designed to share the bandwidth among a large number of users. In general, DOCSIS systems are deployed on HFC networks supporting many CATV channels. In addition, the data bandwidth used for DOCSIS generally is shared among multiple users using a time-division multiple-access (TDMA) process.

In the downstream direction the DOCSIS CMTS transmits to a plurality of cable modems that may share at least one downstream frequency. In effect the CMTS dynamically or statistically time-division multiplexes downstream data for a plurality of cable modems. In general, based on destination addresses the cable modems receive this traffic and forward the proper information to user PCs or hosts. In the upstream direction the plurality of cable modems generally contend for access to transmit at a certain time on an upstream frequency. This contention for upstream slots of time has the potential of causing collisions between the upstream transmissions of multiple cable modems. To resolve these and many other problems resulting from multiple users sharing an upstream frequency channel to minimize costs for residential users, DOCSIS implements a media access control (MAC) algorithm. The DOCSIS layer 2 MAC protocol is defined in the DOCSIS radio frequency interface (RFI) specifications, versions 1.0, 1.1, and/or 2.0. DOCSIS RFI 2.0 actually introduces a code division multiple access (CDMA) physical layer that may be used instead of or in addition to the TDMA functionality described in DOCSIS RFI 1.0 and/or 1.1.

However, the design of DOCSIS to provide a large enough revenue stream by deploying systems shared by a large number of residential customers has some drawbacks. First, the DOCSIS MAC is generally asymmetric with respect to bandwidth, with cable modems contending for upstream transmission and with the CMTS making downstream forwarding decisions. Also, though DOCSIS supports multiple frequency channels, it does not have mechanisms to quickly and efficiently allocate additional frequency channels to users in a dynamic frequency-division multiple access (FDMA) manner. Furthermore, while the data rates of DOCSIS are a vast improvement over analog dial-up V.90 modems and Basic Rate Interface (BRI) ISDN (integrated services digital network) lines, the speeds of DOCSIS cable modems are not significantly better than other services which are targeted at business users.

Because businesses generally place high value on the daily use of networking technologies, these commercial customers often are willing to pay higher fees in exchange for faster data services than are available through DOCSIS. The data service needs of businesses might be met by using all-fiber optic networks with their large bandwidth potential. However, in many cases fiber optic lines are not readily available between business locations. Often new installations of fiber optic lines, though technically feasible, are cost prohibitive based on factors such as having to dig up the street to place the lines. Also, in many cases the devices used in optical transmission (including, but not limited to, fiber optic lines) are relatively newer than the devices used in electrical transmission (including, but not limited to coax cable transmission lines). (Both electrical and optical transmission systems may use constrained media such as, but not limited to, electrical conductors, waveguides, and/or fiber as well as unconstrained media in wireless and/or free-space transmission.) As a result, generally more development time has been invested in simplifying and reducing the costs of devices used in electrical communication systems, such as but not limited to coax CATV systems, than the development time that has been invested in devices used in optical communication systems. Thus, although fiber optics certainly has the capability of offering high data rates, these issues tend to drive up the costs of fiber optic communication systems.

Furthermore, in deploying networks to support primarily residential access, the transmission lines of the MSOs generally run past many businesses. Thus, a technical solution that functions over existing HFC networks of the MSOs, that provides higher data rates than DOCSIS, and that has the capability of working in the future over all fiber networks is a distinct improvement over the prior art and has the capability of meeting the needs of a previously untapped market segment.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. The reference numbers in the drawings have at least three digits with the two rightmost digits being reference numbers within a figure. The digits to the left of those two digits are the number of the figure in which the item identified by the reference number first appears. For example, an item with reference number 211 first appears in FIG. 2.

FIG. 4 shows a block diagram of the architecture for integrating a transport modem termination system and a plurality of client transport modems into a system carrying other services.

FIG. 14 shows the IEEE 802.3/ethernet frame format.

FIG. 15 shows the control frame format.

FIG. 29 shows the header format for allocation map packets.

FIG. 30 shows the format of allocation map packets.

DETAILED DESCRIPTION

Figure 1:
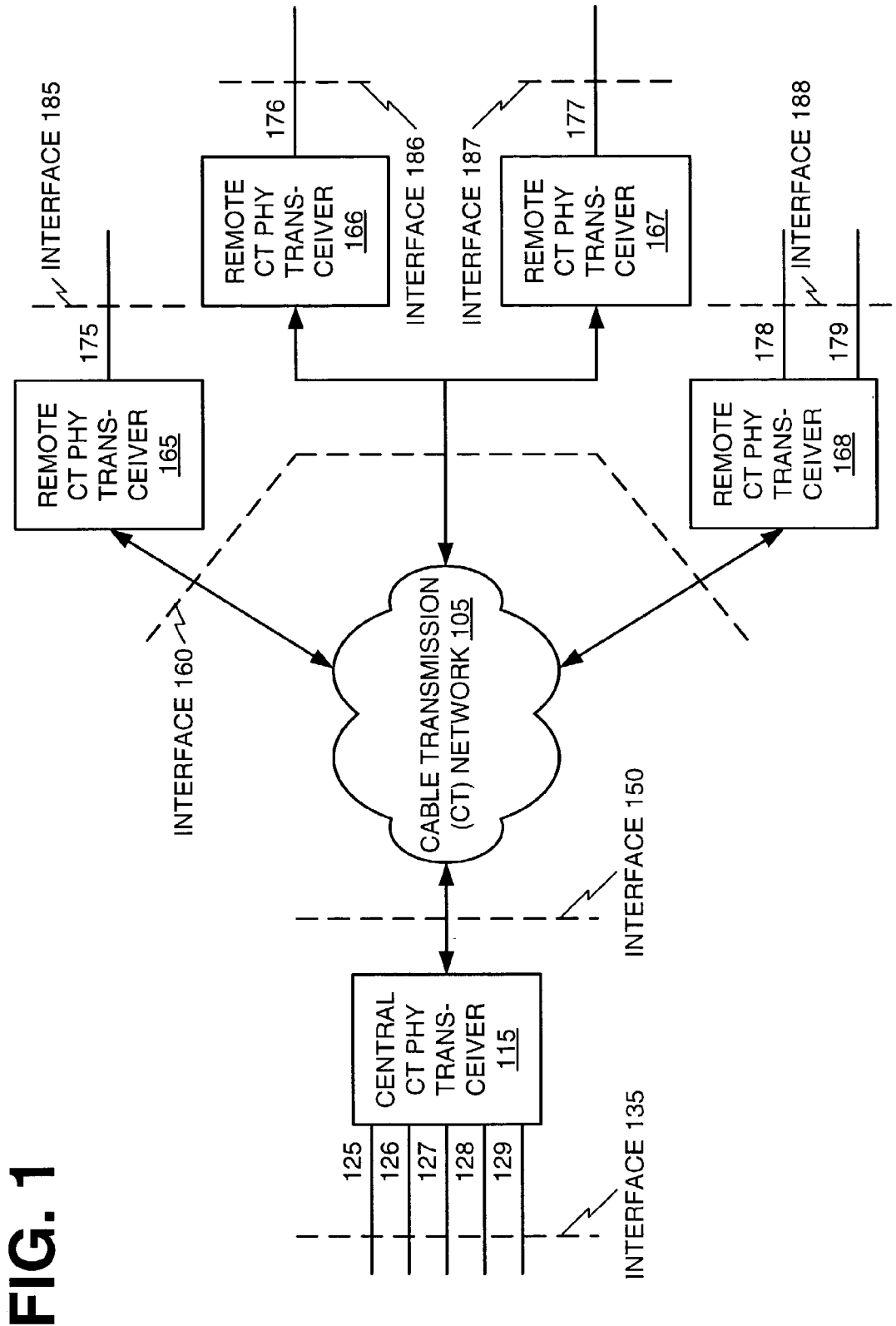
FIG. 1 shows a block diagram of central and remote transceivers connected to a cable transmission network.

In general, the seven-layer Open Systems Interconnect (OSI) model is a useful abstraction in analyzing and describing communication protocols and/or systems. The seven layers of the OSI model from lowest to highest are: 1) the physical layer, 2) the data link layer, 3) the network layer, 4) the transport layer, 5) the session layer, 6) the presentation layer, and 7) the application layer. This OSI model is well-known to those of ordinary skill in the art. Furthermore, the OSI model layers have often been broken down into sublayers in various contexts. For example, the level two, data link layer may be divided into a medium access control (MAC) sublayer and a logical link control (LLC) sublayer in the documentation of the IEEE (Institute for Electrical and Electronic Engineers) standard 802. Furthermore, some of the IEEE standards (such as for 100 Mbps fast ethernet and 1 Gbps gigabit ethernet) break level one (i.e., the physical layer) down into sublayers such as, but not limited to, the physical coding sublayer (PCS), the physical medium attachment layer (PMA), and the physical media dependent (PMD) sublayer. These sublayers are described more fully in the IEEE 802 specifications and more specifically in the IEEE 802.3/ethernet specifications. The specifications of IEEE 802 (including, but not limited to, IEEE 802.3) are incorporated by reference in their entirety herein.

In general, the preferred embodiments of the present invention comprise physical layer protocols that may be implemented in physical layer transceivers. The physical layer interfaces and/or protocols of the preferred embodiments of the present invention may be incorporated into other networking methods, devices, and/or systems to provide various types of additional functionality. Often the behavior and capabilities of networking devices are categorized based on the level of the OSI model at which the networking device operates.

Repeater, bridge, switch, router, and gateway are some commonly used terms for interconnection devices in networks. Though these terms are commonly used in networking their definition does vary from context to context, especially with respect to the term switch. However, a brief description of some of the terms generally associated with various types of networking devices may be useful. Repeaters generally operate at the physical layer of the OSI model. In general, digital repeaters interpret incoming digital signals and generate outgoing digital signals based on the interpreted incoming signals. Basically, repeaters act to repeat the signals and generally do not make many decisions as to which signals to forward. As a non-limiting example, most ethernet hubs are repeater devices. Hubs in some contexts are called layer one switches. In contrast to repeaters, bridges and/or layer-two switches generally operate at layer two of the OSI model and evaluate the data link layer or MAC layer (or sublayer) addresses in incoming frames. Bridges and/or layer two switches generally only forward frames that have destination addresses that are across the bridge. Basically, bridges or layer two switches generally are connected between two shared contention media using media access control (MAC) algorithms. In general, a bridge or layer two switch performs an instance of a MAC algorithm for each of its interfaces. In this way, bridges and/or layer two switches generally may be used to break shared or contention media into smaller collision domains.

Routers (and layer three switches) generally make forwarding decisions based at least upon the layer three network addresses of packets. Often routers modify the frames transversing the router by changing the source and/or destination data link, MAC, or hardware addresses when a packet is forwarded. Finally, the more modern usage of the term gateway refers to networking devices that generally make forwarding decisions based upon information above layer three, the network layer. (Some older Internet usage of the term gateway basically referred to devices performing a layer three routing function as gateways. This usage of the term gateway is now less common.)

One skilled in the art will be aware of these basic categories of networking devices. Furthermore, often actual networking devices incorporate functions that are hybrids of these basic categories. Generally, because the preferred embodiments of the present invention comprise a physical layer, the preferred embodiments of the present invention may be utilized in repeaters, bridges, switches, routers, gateways, hybrid devices and/or any other type of networking device that utilizes a physical layer interface. "Routing and Switching: Time of Convergence", which was published in 2002, by Rita Puzmanova and "Interconnections, Second Edition: Bridges, Router, Switches, and Internetworking Protocols", which was published in 2000, by Radia Perlman are two books describing some of the types of networking devices that might potentially utilize the preferred embodiments of the present invention. These two books are incorporated in their entirety by reference herein.

Overview

In general, the preferred embodiments of the present invention(s) involve many concepts. Because of the large number of concepts of the preferred embodiments of the present invention, to facilitate easy reading and comprehension of these concepts, the document is divided into sections with appropriate headings. None of these headings are intended to imply any limitations on the scope of the present invention(s). In general, the "Network Model" section at least partially covers the forwarding constructs of the preferred embodiments of the present invention(s). The section entitled "Integration Into Existing Cable Network Architectures" generally relates to utilization of the preferred embodiments of the present invention in cable network architectures. The "Protocol Models" section describes a non-limiting abstract model that might be used to facilitate understanding of the preferred embodiments of the present invention(s). The "Frame Management Sublayer (FMS) Data Flows" section describes the formation of FMS data flows. The section entitled "MPEG Packets" describes the format of MPEG packets as utilized in the preferred embodiments of the present invention(s). The "Network Clocking" section generally covers distribution of network clock.

The "Downstream Multiplexing" section generally covers the downstream multiplexing using MPEG packets in the preferred embodiments of the present invention(s). The "Upstream Multiplexing" section generally relates to upstream multiplexing across one or more active tones. The section entitled "Division of Upstream Data" generally relates to the division of data into blocks for forward error correction (FEC) processing and to the formation of superframes lasting 2048 symbol clock periods. The next section is entitled "Upstream Client Transport Modem (cTM) Inverse Multiplexing Sublayer (IMS)" and generally covers upstream multiplexing in a client transport modem. The section entitled "Upstream Transport Modem Termination System (TMTS) Inverse Multiplexing Sublayer (IMS)" and generally covers upstream multiplexing in a transport modem termination system.

In addition, the section entitled "Downstream Client Transport Modem (cTM) Demodulation and Physical Coding Sublayer (PCS)" generally relates to cTM downstream demodulation. The section entitled "Upstream Client Transport Modem (cTM) Modulation and Physical Coding Sublayer (PCS)" generally covers cTM upstream modulation. The next section is entitled "Upstream Transport Modem Termination System (TMTS) Demodulation and Physical Coding Sublayer (PCS)" and generally covers TMTS upstream demodulation. Also, the section entitled "Upstream Forward Error Correction (FEC) and Non-Limiting Example with Four Active Tones at 256 QAM, 64 QAM, 16 QAM, and QPSK Respectively" generally relates to forward error correction. Finally, the section entitled "Client Transport Modem (cTM) and Transport Modem Termination System (TMTS) Physical Medium Dependent (PMD) Sublayer" generally relates to physical medium dependent sublayer interfaces.

Network Model

FIG. 1 generally shows one preferred embodiment of the present invention. In general, the preferred embodiment of the present invention allows physical layer connectivity over a cable transmission network 105. One skilled in the art will be aware of the types of technologies and devices used in a cable transmission (CT) network 105. Furthermore, many of the devices and technologies are described in "Modern Cable Television Technology: Video, Voice, and Data Communications", which was published in 1999, by Walter Ciciora, James Farmer, and David Large. CT network 105 generally has evolved from the networks designed to allow service providers to deliver community antenna television (CATV, also known as cable TV) to customers or subscribers. However, the networking technologies in CATV may be used by other environments.

Often the terms service provider and subscriber or customer are used to reference various parts of CATV networks and to provide reference points in describing the interfaces found in CATV networks. Usually, the CATV network may be divided into service provider and subscriber or customer portions based on the demarcation of physical ownership of the equipment and/or transmission facilities. Though some of the industry terms used herein may refer to service provider and/or subscriber reference points and/or interfaces, one of ordinary skill in the art will be aware that the preferred embodiments of the present invention still apply to networks regardless of the legal ownership of specific devices and/or transmission facilities in the network. Thus, although cable transmission (CT) network 105 may be a CATV network that is primarily owned by cable service providers or multiple system operators (MSOs) with an interface at the customer or subscriber premises, one skilled in the art will be aware that the preferred embodiments of the present invention will work even if ownership of all or portions of cable transmission (CT) network 105 is different than the ownership commonly found in the industry. Thus, cable transmission (CT) network 105 may be privately owned.

As one skilled in the art will be aware, cable transmission (CT) network 105 generally is designed for connecting service providers with subscribers or customers. However, the terms service provider and subscriber or customer generally are just used to describe the relative relationship of various interfaces and functions associated with CT network 105. Often the service-provider-side of CT network 105 is located at a central site, and there are a plurality of subscriber-side interfaces located at various remote sites. The terms central and remote also are just used to refer to the relative relationship of the interfaces to cable transmission (CT) network 105. Normally, a headend and/or distribution hub is a central location where service provider equipment is concentrated to support a plurality of remote locations at subscriber or customer premises.

Given this relative relationship among equipment connected to cable transmission (CT) network 105, the preferred embodiment of the present invention may comprise a central cable transmission (CT) physical (PHY) layer transceiver 115. The central CT PHY transceiver (TX/RX) 115 generally may have at least one port on the central-side or service-provider-side of the transceiver 115. Ports 125, 126, 127, 128, and 129 are examples of the central-side ports of central CT PHY transceiver 115. In general, interface 135 may define the behavior of central CT PHY transceiver 115 with respect to at least one central-side port such as central-side ports 125, 126, 127, 128, and 129. Interface 135 for the central-side ports 125, 126, 127, 128, and 129 may represent separate hardware interfaces for each port of central CT PHY transceiver 115. However, interface 135 may be implemented using various technologies to share physical interfaces such that central-side ports 125, 126, 127, 128, and 129 may be only logical channels on a shared physical interface or media. These logical channels may use various multiplexing and/or media sharing techniques and algorithms. Furthermore, one skilled in the art will be aware that the central-side ports 125, 126, 127, 128, and 129 of central CT PHY transceiver 115 may be serial and/or parallel interfaces and/or buses.

Therefore, the preferred embodiments of the present invention are not limited to specific implementations of interface 135, and one skilled in the art will be aware of many possibilities. As a non-limiting example, although central CT PHY transceiver 115 generally is for use inside of networking devices, a serial-interface shared medium such as ethernet/802.3 could be used on each of the central-side ports 125, 126, 127, 128, and 129 inside of a networking device. Often the decision to use different technologies for interface 135 will vary based on costs and transmission line lengths.

Central CT PHY transceiver 115 further is connected through interface 150 to cable transmission (CT) network 105. In addition to the central-side or service-provider-side at interface 150 of cable transmission (CT) network 105, interface 160 generally is on the subscriber-side, customer-side, or remote-side of cable transmission (CT) network 105. Generally, at least one remote transceiver (such as remote cable transmission (CT) physical (PHY) transceivers 165, 166, 167, and 168) is connected to interface 160 on the subscriber-side or remote-side of CT network 105. Each remote CT PHY transceiver 165, 166, and 167 is associated with at least one remote-side port, 175, 176, and 177 respectively. Furthermore, remote CT PHY transceiver 168 also is associated with at least one remote-side port, with the two remote-side ports 178 and 179 actually being shown in FIG. 1. Each remote CT PHY transceiver 165, 166, 167, and 168 can be considered to have an interface 185, 186, 187, and 188, respectively, through which it receives information for upstream transmission and through which it delivers information from downstream reception.

In general, digital transceivers (such as central CT PHY transceiver 115 and remote CT PHY transceivers 165, 166, 167, and 168) comprise a transmitter and a receiver as are generally needed to support bi-directional applications. Although the preferred embodiments of the present invention generally are designed for bi-directional communication, the preferred embodiments of the present invention certainly could be used for uni-directional communications without one half of the transmitter/receiver pair in some of the transceivers. In general, digital transmitters basically are concerned with taking discrete units of information (or digital information) and forming the proper electromagnetic signals for transmission over networks such as cable transmission (CT) network 105. Digital receivers generally are concerned with recovering the digital information from the incoming electromagnetic signals. Thus, central CT PHY transceiver 115 and remote CT PHY transceivers 165, 166, 167, and 168 generally are concerned with communicating information between interface 135 and interfaces 185, 186, 187, and 188, respectively. Based on the theories of Claude Shannon, the minimum quanta of information is the base-two binary digit or bit. Therefore, the information communicated by digital transceivers often is represented as bits, though the preferred embodiments of the present invention are not necessarily limited to implementations designed to communicate information in base two bits.

The preferred embodiments of the present invention generally have a point-to-point configuration such that there generally is a one-to-one relationship between the central-side ports 125, 126, 127, 128, and 129 of the central CT PHY transceiver 115 and the remote-side ports 175, 176, 177, 178, and 179, respectively. Like interface 135 for a plurality of central-side ports 125, 126, 127, 128, and 129, interface 188 with a plurality of remote-side ports 178 and 179 may represent separate hardware interfaces for each port of remote CT PHY transceiver 168. However, interface 188 may be implemented using various technologies to share physical interfaces such that remote-side ports 178 and 179 may only be logical channels on a shared physical interface or media. These logical channels may use various multiplexing and/or media sharing techniques and algorithms. Furthermore, one skilled in the art will be aware that the remote-side ports 178 and 179 of remote CT PHY transceiver 168 may be serial and/or parallel interfaces and/or buses.

In general, the preferred embodiments of the present invention comprise a one-to-one or point-to-point relationship between active central-side ports and active remote-side ports such that central-side port 125 may be associated with remote-side port 175, central-side port 126 may be associated with remote-side port 176, central-side port 127 may be associated with remote-side port 177, central-side port 128 may be associated with remote-side port 178, and central-side port 129 may be associated with remote-side port 179. Though this relationship between active central-side ports and active remote-side ports is one-to-one or point-to-point, many technologies such as, but not limited to, multiplexing and/or switching may be used to carry the point-to-point communications between active central-side ports and active remote-side ports.

In general, active ports are allocated at least some bandwidth through cable transmission (CT) network 105. Normally, most dial-up modem phone calls through the public switched telephone network (PSTN) are considered to be point-to-point connections even though the phone call may go through various switches and/or multiplexers that often use time-division multiplexing (TDM). Establishment of an active phone call generally allocates bandwidth in the PSTN to carry the point-to-point communications through the PSTN. In a similar fashion, the preferred embodiments of the present invention generally provide point-to-point connectivity between active ports of the central CT PHY transceiver 115 and the active ports of remote CT PHY transceivers 165, 166, 167, and 168. However, the preferred embodiments of the present invention generally work over cable transmission (CT) network 105, which is not like the generally time-division multiplexed PSTN. (Note: references in this specification to point-to-point should not be limited to the Point-to-Point Protocol, PPP, which generally is only one specific protocol that may be used over point-to-point connections.)

Also, the use of five central-side ports 125, 126, 127, 128, and 129 is not intended to be limiting and is only shown for example purposes. In general, central CT PHY transceiver 115 may support at least one central-side port. In addition, the use of four remote CT PHY transceivers 165, 166, 167, and 168 is only for example purposes and is not intended to be limiting. In general, central CT PHY transceiver 115 might communicate with at least one remote CT PHY transceiver (such as 165, 166, 167, and 168). Also, each remote CT PHY transceiver 165, 166, 167, and 168 may have at least one remote side port, and remote CT PHY transceiver 168 is shown with a plurality of remote-side ports 178 and 179.

Figure 2A:
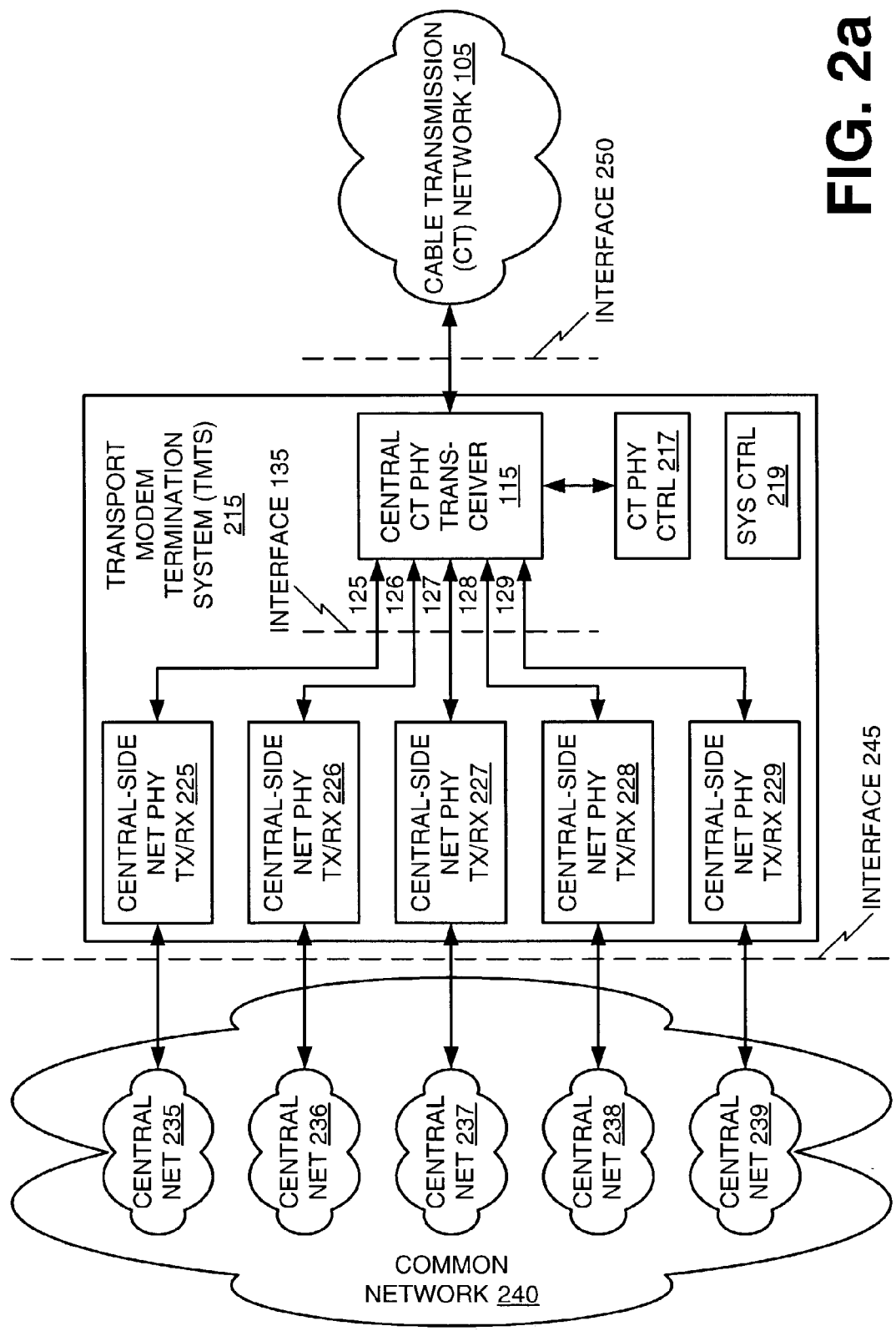
FIG. 2a shows a block diagram of a transport modem termination system connected to a cable transmission network.
Figure 2B:
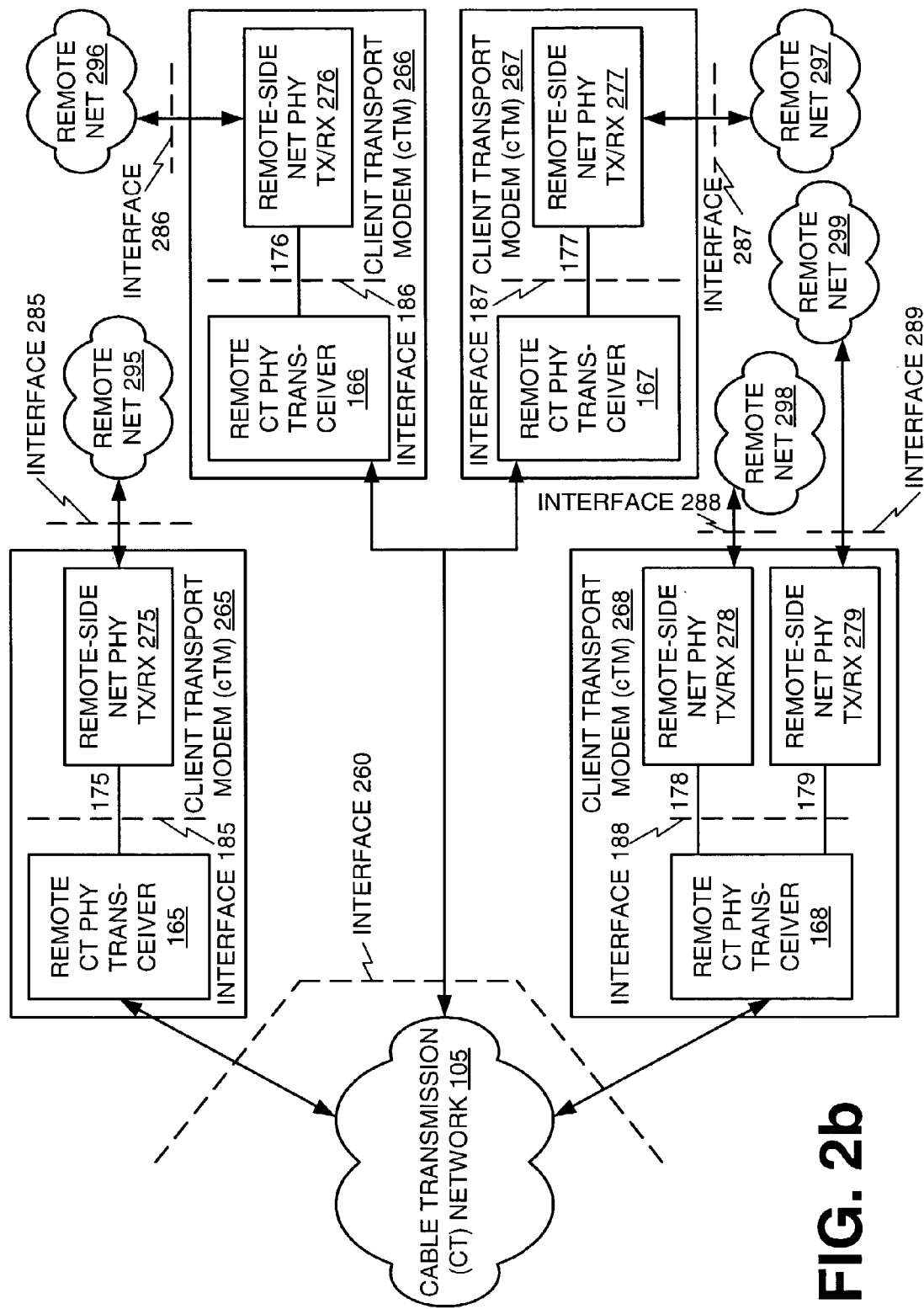
FIG. 2b shows a block diagram of a plurality of client transport modems connected to a cable transmission network.

FIGS. 2a and 2b show further detail on the use of central CT PHY transceiver 115 and remote CT PHY transceivers 165, 166, 167, and 168 in networking devices. As shown in FIG. 2a, central CT PHY transceiver 115 generally might be incorporated into a transport modem termination system (TMTS) 215. In addition to central CT PHY transceiver 115, TMTS 215 comprises cable transmission (CT) physical layer (PHY) control 217 and system control 219. In general, CT PHY control 217 is concerned with handling bandwidth allocations in cable transmission (CT) network 105, and system control 219 generally is concerned with TMTS management and/or configuration. Each one of the central-side ports 125, 126, 127, 128, and 129 of central CT PHY transceiver 115 may be connected over interface 135 to central-side network physical layer (PHY) transceivers (TX/RX) 225, 226, 227, 228, and 229, respectively. As discussed with respect to FIG. 1, interface 135 may actually be some sort of shared interface among the various central-side ports (125, 126, 127, 128, and 129) and central-side network physical (PHY) transceivers (225, 226, 227, 228, and 229).

Generally, most communication systems have transmitters and/or receivers (or transceivers) that handle transmitting and/or receiving signals on communication media. Often these transmitters and/or receivers (or transceivers) are responsible for converting between the electromagnetic signals used to convey information within a device (such as in baseband transistor-transistor logic (TTL) or complementary metal-oxide semiconductor (CMOS) signal levels) to electromagnetic signal levels that are suitable for transmission through external media that may be wired, wireless, waveguides, electrical, optical, etc. Although interface 135 is shown as individual connections between the central-side ports 125, 126, 127, 128, and 129 of central CT PHY transceiver 115 and central-side network PHY transceivers 225, 226, 227, 228, and 229, one skilled in the art will be aware that many possible implementations for interface 135 are possible including, but not limited to, serial interfaces, parallel interfaces, and/or buses that may use various technologies for multiplexing and or access control to share at least one physical communications medium at interface 135.

In general, central-side network physical interfaces 225, 226, 227, 228, and 229 are connected to central networks 235, 236, 237, 238, and 239, respectively. Based upon the policy decisions of the service provider (and/or the owners of the TMTS 215 and of the associated central-side network PHY transceivers 225, 226, 227, 228, and/or 229), central networks 235, 236, 237, 238, and 239 may be connected together into a common network 240. One skilled in the art will be aware that many different configurations for connecting central networks 235, 236, 237, 238, and 239 are possible based upon different policy decisions of the owners of the equipment and any customers paying for connectivity through the equipment.

Central-side network PHY transceivers 225, 226, 227, 228, and 229 generally are connected over interface 245 to central networks 235, 236, 237, 238, and 239, respectively. In the preferred embodiment of the present invention central-side network PHY transceivers 225, 226, 227, 228, and 229 are ethernet/802.3 interfaces, and each ethernet/802.3 interface may be connected to a separate central network. However, other connections for interface 245 are possible that allow one or more transmission media to be shared using various techniques and/or media access control algorithms the may perform various multiplexing strategies. Although one skilled in the art will be aware that various methods could be used to share communications media at interface 245, in general having separate ethernet/802.3 ports and/or separate T1 ports (i.e., N×56/64 ports) at interface 135 for each central-side network PHY transceiver 225, 226, 227, 228, and 229 offers maximum flexibility in allowing service providers or equipment owners to make policy decisions and also offers low cost based on the ubiquitous availability of ethernet/802.3 interfaces and equipment.

Furthermore, one skilled in the art will be aware that there are many data speeds and physical layer specifications for ethernet/802.3. In general, the preferred embodiments of the present invention will work with any of the ethernet/802.3 specifications. Thus, if central-side network physical (PHY) transceivers (TX/RX) 225, 226, 227, 228, and 228 are ethernet/802.3 interfaces, they may utilize any of the ethernet/802.3 speeds and/or physical layer interfaces. Also, each central-side PHY transceiver 225, 226, 227, 228, and 229 might use a different ethernet/802.3 speed and/or a physical layer specification from any of the other central-side network PHY transceivers 225, 226, 227, 228, and 229.

FIG. 2b generally shows the remote-side, customer-side, or subscriber-side equipment and connections, whereas FIG. 2a generally shows the central-side or service-provider-side equipment and connections. In FIG. 2b, cable transmission (CT) network 105 is repeated from FIG. 2a. In addition, FIG. 2a shows the four remote CT PHY transceivers 165, 166, 167, 168, and 169 as they might be used inside client transport modems (cTMs) 265, 266, 267, and 268, respectively.

Client transport modem 265 comprises remote CT PHY transceiver 165 that is connected through connection 175 across interface 185 to at least one remote-side network physical layer (PHY) transceiver (TX/RX) 275. Also, client transport modem 266 comprises remote CT PHY transceiver 166 that is connected through connection 176 across interface 186 to at least one remote-side network physical layer (PHY) transceiver (TX/RX) 276. In addition, client transport modem 267 comprises remote CT PHY transceiver 167 that is connected through connection 177 across interface 187 to at least one remote-side network physical layer (PHY) transceiver (TX/RX) 277. Finally, client transport modem 268 comprises remote CT PHY transceiver 168 that is connected through connection 178 across interface 188 to at least one remote-side network physical layer (PHY) transceiver (TX/RX) 278 and that is connected through connection 179 across interface 189 to at least one remote-side network physical layer (PHY) transceiver (TX/RX) 279.

In general, the use of four client transport modems (cTMs) 265, 266, 267, and 268 in FIG. 2b is only for illustrative purposes and is not meant to imply any limitations on the number of client transport modems (cTMs) that may be supported. Furthermore, one skilled in the art will be aware that based upon networking needs the capabilities of multiple client transport modems (cTMs) could be integrated into a single unit. Thus, a single unit connected to the customer-side, subscriber-side, or remote-side of the cable transmission (CT) network 105 could actually have a plurality of remote CT PHY transceivers.

In general, the remote-side network physical (PHY) transceivers (TX/RX) 275, 276, 277, 278, and 279 are connected across interfaces 285, 286, 287, 288, and 289 to remote networks 295, 296, 297, 298, and 299, respectively. In the preferred embodiment of the present invention interfaces 285, 286, 287, 288, and/or 289 are ethernet/802.3 interfaces. However, one skilled in the art will be aware that other interfaces and technologies might be used with the concepts disclosed in this specification. As a non-limiting example, an interface of a client transport modem (cTM) might be used to support circuit emulation services (CES) to carry N×56 kbps and/or N×64 kbps (where N is a positive integer) digital data streams. One skilled in the art will be aware that various N×56 and N×64 configurations are commonly designated as various digital speeds such as, but not limited to, DS0, DS1, DS3, etc. Also, one skilled in the art will be aware that the various N×56 and/or N×64 services are often delivered over plesiochronous digital hierarchy (PDH) interfaces such as, but not limited to, T1, T3, etc. and/or synchronous digital hierarchy (SDH) interfaces such as, but not limited to, Synchronous Transport Signal, Level 1 (STS-1), STS-3, etc. Often the STS frames are carried in a synchronous optical network (SONET) on optical carriers that are generally referred to as OC-1 (optical carrier 1), OC-3, etc. In addition, to these higher order multiplexing of multiple DS0s, interfaces such as switched 56/64 and basic rate interface (BRI) ISDN offer support for smaller numbers of 56/64 kbps DS0s.

One skilled in the art will be aware of these various N×56 and N×64 technologies and how they generally can be used to connect devices to networks such as the PSTN (public switched telephone network). In addition, one skilled in the art will be aware that such digital N×56 and N×64 kbps connections also may carry digitized voice generally using pulse code modulation (PCM) and various companding techniques such as, but not limited to, A-law and mu-law. Therefore, the remote-side network physical (PHY) transceivers (TX/RX) 275, 276, 277, 278, and 279 do not all have to use 802.3/ethernet. In at least one preferred embodiment of the present invention, a client transport modem (cTM) 268 with a plurality of remote-side network physical (PHY) transceivers (TX/RX) 278 and 279 may support different types of interfaces for each transceiver at interfaces 288 and 289. Thus, as a non-limiting example, remote-side network physical (PHY) transceiver 278 may use ethernet/802.3 to connect to an ethernet/802.3 remote network 298, and remote-side network physical (PHY) transceiver 279 may be a T1 interface to remote network 299. This non-limiting example configuration is expected to be common for many remote offices that need ethernet/802.3 connectivity to carry data and packetized real-time services such as voice or video and that also need T1 interfaces to connect to legacy circuit-switched voice for devices such as PBXs (Private Branch Exchanges).

Furthermore, one skilled in the art will be aware that there are many data speeds and physical layer specifications for ethernet/802.3. In general, the preferred embodiments of the present invention will work with any of the ethernet/802.3 specifications. Thus, if remote-side network physical (PHY) transceivers (TX/RX) 275, 276, 277, 278, and 279 are ethernet/802.3 interfaces, they may utilize any of the ethernet/802.3 speeds and/or physical layer interfaces. Also, each remote-side PHY transceiver 275, 276, 277, 278, and 279 might use a different ethernet/802.3 speed and/or physical layer specification from any of the other remote-side network PHY transceivers 275, 276, 277, 278, and 279.

In general, the preferred embodiments of the present invention might be considered as providing repeater functionality between the central-side network PHY transceivers 225, 226, 227, 228, and 229 and remote-side network PHY transceivers 275, 276, 277, 278, and 279, respectively. Generally, the repeater service may involve corresponding central-side and remote-side interfaces and transceivers having the same speeds. However, one skilled in the art will be aware that ethernet/802.3 hubs are repeaters and that some ethernet/802.3 hubs handle speed conversions such as between 10 Mbps ethernet/802.3 and 100 Mbps fast ethernet/802.3. Thus, one skilled in the art will be aware of using the techniques found in these multi-speed ethernet/802.3 hubs to support different speeds on the interfaces of corresponding central-side and remote-side network physical (PHY) transceivers (TX/RX) and generally still provide repeater functionality. Also, one skilled in the art will be aware that even if a central-side network physical transceiver (such as, but limited to, central-side network physical transceiver 225) and a corresponding remote-side network physical transceiver (such as, but limited to, remote-side network physical transceiver 275) operate at the same data rate, the transceivers may use different types of physical media and portions of the ethernet/802.3 specification such as, but not limited to, 100BaseTX on copper for a central-side network physical transceiver and 100BaseFX on fiber for a remote-side network physical transceiver.

Figure 3:
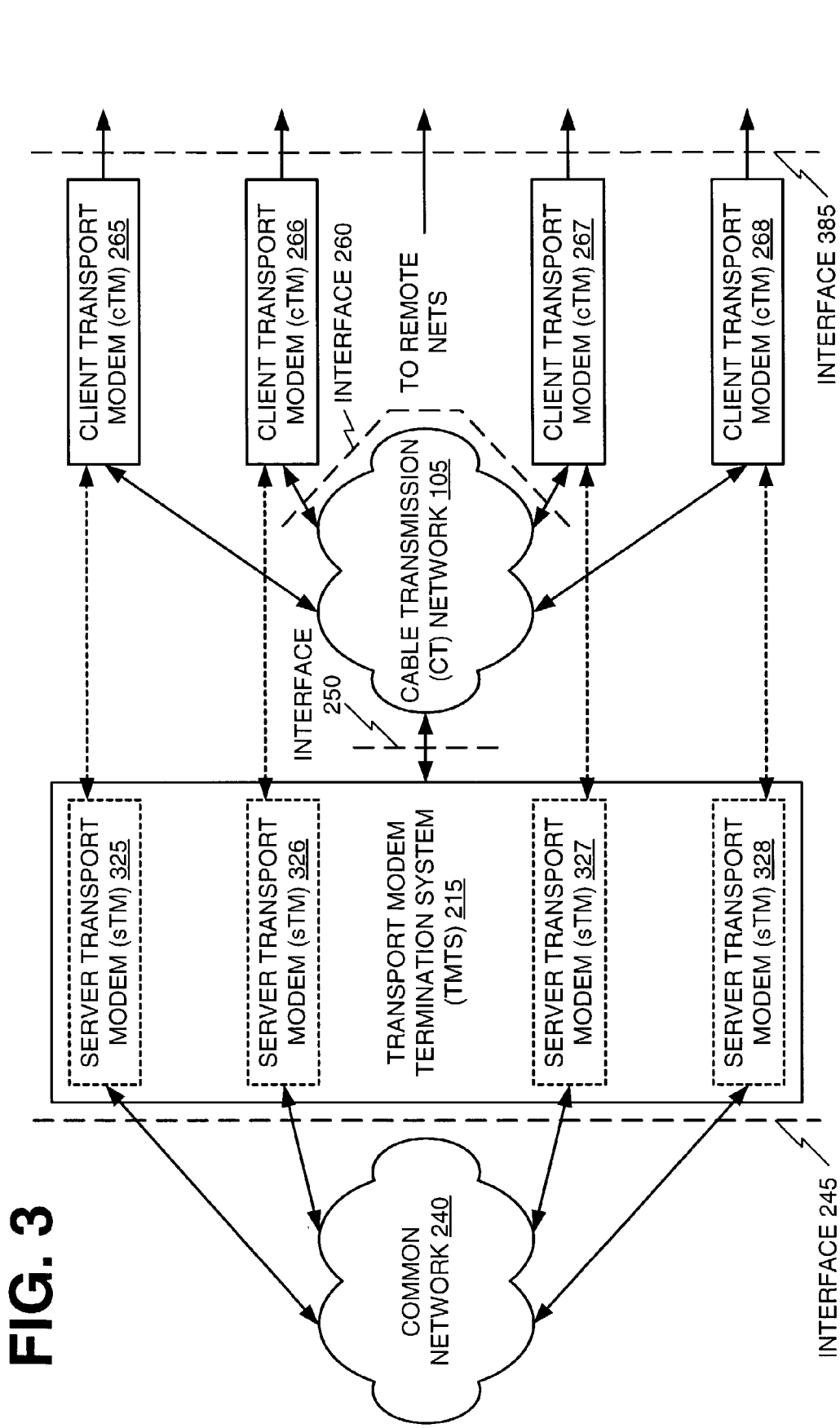
FIG. 3 shows a block diagram of the connection-oriented relationship between client transport modems and ports of a transport modem termination system.

Given the general point-to-point relationship between central-side network physical (PHY) transceivers (TX/RX) 225, 226, 227, 228, and 229 with the corresponding remote-side network physical (PHY) transceivers (TX/RX) 275, 276, 277, 278, and 279, respectively, the client transport modems (cTMs) 265, 266, 267, and 268 can each be thought of as having a corresponding server transport modem (sTM) 325, 326, 327, and 328, respectively, as shown in FIG. 3. In general, the server transport modems (sTMs) 325, 326, 327, and 328 may not be separate equipment, but may instead be implemented using shared hardware in TMTS 215 in the preferred embodiment of the present invention. Although to each client transport modem (cTM) 265, 266, 267, and 268 it may seem like there is a connection to a dedicated server transport modem (sTM), (such as sTMs 325, 326, 327, and 328, respectively), the server transport modems may not be actual individual hardware in the preferred embodiment of the present invention. Even though the preferred embodiments of the present invention may not use individual server transport modems, this does not preclude such implementations.

In the FIG. 3 representation of the preferred embodiments of the present invention, the server transport modems (sTMs) 325, 326, 327, and 328 as well as the corresponding connections to the client transport modems (cTMs) 265, 266, 267, and 268, respectively, are shown as small dashed lines to indicate the virtual nature of the relationship. The server transport modems (sTMs) 325, 326, 327, and 328 may be virtual in the preferred embodiments of the present invention because they generally may be implemented using shared hardware in TMTS 215.

In general, the preferred embodiments of the present invention may act to transparently repeat digital signals between interfaces 245 and 385. Interfaces 245 and/or 385 may have different types of technologies and/or media for the point-to-point connections between active ports on interface 245 and active ports on interface 385. Active ports generally are associated with point-to-point connections between TMTS 215 and a client transport modem 265, 266, 267, or 268, when the point-to-point connection is allocated bandwidth through cable transmission (CT) network 105. In general, TMTS 215 connects at interface 250 to the central-side or service-provider-side of cable transmission (CT) network 105, whereas client transport modems (cTMs) 265, 266, 267, and 268 connect at interface 260 to the remote-side, customer-side, or subscriber-side of cable transmission (CT) network 105. Furthermore, the client transport modems (cTMs) 265, 266, 267, and 268 may be connected to remote networks over interface 385 using various types of media and technologies. The transport modem termination system (TMTS) 215 connected at interface 245 may further be connected into a common network 240, although the technology of the preferred embodiments of the present invention allows other central network configurations based upon various policy decisions and network ownership requirements. Some of these considerations include, but are not limited to, privacy, security, cost, and/or connectivity.

Integration into Existing Cable Network Architectures

FIG. 4 shows a more detailed implementation of the preferred embodiment of the present invention from FIGS. 1 through 3 and its use in a cable network that may carry additional services over the cable transmission (CT) network 105. FIG. 4 shows TMTS 215 and cTMs 265, 266, 267, and 268 that were briefly described with respect to FIGS. 2a and 2b. As shown in FIG. 4, each cTM 265, 266, 267, and 268 has at least one ethernet/802.3 physical (PHY) transceiver 475, 476, 477, and 478, respectively. The ethernet/802.3 PHY transceivers 475, 476, 477, and 478 correspond to one non-limiting type of transceiver that may be used in the preferred embodiment of the present invention for remote-side network physical (PHY) transceivers (TX/RX) 275, 276, 277, 278, and 279 at the associated interfaces 285, 286, 287, 288, and 289 of FIG. 2b. Also each cTM 265, 266, 267, 268 may have one or a plurality of physical transceivers at interface 385. Each one of these transceivers may be an ethernet/802.3 physical interface or any other type of communications interface.

Furthermore, those skilled in the art will be aware of the relatively minor differences between IEEE 802.3 and the Digital-Intel-Xerox (DIX) 2.0 (or II) specification of ethernet and the possibility of carrying multiple frame formats such as, but not limited to, ethernet_II, 802.3 raw, 802.3/802.2 LLC (logical link control), and 802.3/802.2 SNAP (Sub-Network Access Protocol) on networks colloquially known as ethernet. In addition, the preferred embodiments of the present invention also are intended to cover other versions and variations of ethernet/802.3 including, but not limited to, DIX ethernet 1.0. References in this specification to ethernet and/or IEEE 802.3 generally are intended to refer to networks capable of carrying any combination of the various frame types generally carried on such ethernet/802.3 networks. Because the preferred embodiments of the present invention generally provide a physical layer interface that may be used for repeater service, the preferred embodiments of the present invention generally are transparent to the various types of ethernet/802.3 frames.

Although FIG. 4 shows four cTMs and four interfaces on TMTS 215, this is only for illustrative purposes, and the preferred embodiments of the present invention are not limited to providing connectivity to exactly four client transport modems. Instead the preferred embodiment of the present invention will work with at least one client transport modem and at least one corresponding interface on TMTS 215. In general, in FIG. 4 each one of the 802.3 physical (PHY) layer interfaces or transceivers 475, 476, 477, and 478 of the client transport modems (cTMs) generally is associated with a corresponding 802.3 physical layer interface and/or transceiver 425, 426, 427, and 428, respectively, in the TMTS 215. In general, 802.3 physical layer interfaces and/or transceivers 425, 426, 427, and 428 are one non-limiting example of the types of transceivers that may be used in the preferred embodiment of the present invention for central-side network physical (PHY) transceivers (TX/RX) 225, 226, 227, 228, and 229 at the associated interface 245 of FIG. 2a.

As shown in FIG. 4, the 802.3 PHY interfaces and/or transceivers 425, 426, 427, and 428 of the TMTS 215 are further connected to a headend networking device such as hub, switch, and/or router 430 with 802.3 PHY interfaces and/or transceivers 435, 436, 437, and 438, respectively. Those skilled in the art will be aware that this is only one of the many possible ways of connecting the ethernet/802.3 PHY interfaces and/or transceivers 425, 426, 427, and 428 of TMTS 215 to a service-provider common network 240 that may include a service provider backbone network (not shown in FIG. 4). Generally, based on service provider policies and equipment costs, various choices may be made for the specific device(s) to be connected to the 802.3 PHY interfaces and/or transceivers 225, 226, 227, and 228 of TMTS 215. As a non-limiting example, two of the 802.3 PHY interfaces and/or transceivers 225, 226, 227, and 228 may be associated with providing connectivity to two different remote offices of a particular company. That company may just want those two 802.3 PHY interfaces and/or transceivers of TMTS 215 to be directly connected (possibly using an ethernet cross-over cable that is known to one of skill in the art by crossing pins 1 and 3 as well as pins 2 and 6 of an RJ45 connector).

Therefore, the 802.3 PHY interfaces and/or transceivers 425, 426, 427, and 428 of TMTS 215 can be connected based on service provider policies and/or subscriber (or customer) demands. In addition, the present invention is not limited to a specific type of network device or link used to connect the 802.3 PHY interfaces port 225, 226, 227, and 228 of TMTS 215 to a service provider's network, which may be a common network 240 and may include a backbone network (not shown in FIG. 4). Thus, the at least one connection to headend hub/switch/router 430 over interface 245 is only one non-limiting example of how the TMTS 215 can be connected to a service provider backbone network.

Furthermore, as described with respect to FIGS. 1 through 3, the preferred embodiment of the present invention basically functions as a ethernet/802.3 repeater that transparently copies the bits from ethernet/802.3 frames between interfaces 245 and 385 of FIGS. 3 and 4. The transparent support of ethernet/802.3 generally allows the system to transparently carry ethernet/802.3 frames with virtual LAN or label-based multiplexing information such as, but not limited to, the information defined in IEEE 802.1Q (VLAN or Virtual LAN) and/or IEEE 802.17 (RPR or Resilient Packet Ring). Because of the transparency of the preferred embodiment of the present invention to various ethernet virtual LAN and/or tag/label information, service providers using the preferred embodiment of the present invention generally have the flexibility to specify policies for carrying, combining, and/or segregating the traffic of different subscribers based on the types of devices connected to interfaces 245 and 385. Also, subscribers or customers may choose to implement various mechanisms such as, but not limited to, 802.1Q VLAN and/or 802.17 RPR that might be used between two or more subscriber sites that are each connected to the preferred embodiment of the present invention. The transparency of the preferred embodiment of the present invention to this additional information in ethernet/802.3 frames provides versatility to the service provider and the subscriber in deciding on how to use various VLAN, tag, and/or label mechanisms that are capable of being carried with ethernet/802.3 frames.

In addition, FIG. 4 further shows how one client transport modem (cTM) 265 with at least one 802.3 PHY interface or transceiver 475 is connected over interface 385 to 802.3 PHY interface or transceiver 485. Ethernet/802.3 PHY interface 485 may be located in a subscriber hub/switch/router 480 that has more 802.3 PHY interfaces or transceivers 491, 492, and 493 into the customer or subscriber LANs or networks, which are non-limiting examples of portions of remote networks. The other client transport modems (cTMs) 266, 267, and 268 also would likely have connections over interface 385 to various devices of other customer or subscriber LANs, though these are not shown in FIG. 4. Much like headend hub/switch/router 430, the actual type of network device or connection for subscriber hub/switch/router 480 is not limited by the preferred embodiment of the present invention. The preferred embodiment of the present invention generally provides transparent ethernet repeater capability over a cable transmission network 105. In FIG. 4, the interfaces 250 and 260 generally correspond to the central-side or service-provider-side and to the remote-side, customer-side, or subscriber-side, respectively, of cable transmission (CT) network 105. These reference interfaces 250 and 260 in FIG. 4 were shown in FIGS. 2a, 2b, and 3 as the interfaces of cable transmission (CT) network 105.

Those skilled in the art will be aware of the devices and technologies that generally make up cable transmission networks 105. At least some of this cable transmission technology is described in "Modern Cable Television Technology: Video, Voice, and Data Communications" by Walter Ciciora, James Farmer, and David Large, which is incorporated by reference in its entirety herein. In general, the cable transmission networks 105 may carry other services in addition to those of the preferred embodiment of the present invention. For instance, as known by one skilled in the art, a cable transmission network 105 may carry analog video, digital video, DOCSIS data, and/or cable telephony in addition to the information associated with the preferred embodiment of the present invention. Each one of these services generally has equipment located at the service provider, such as analog video equipment 401, digital video equipment 402, DOCSIS data equipment 403, and cable telephony equipment 404 as well as equipment located at various customer or subscriber locations such as analog video equipment 411, digital video equipment 412, DOCSIS data equipment 413, and cable telephony equipment 414. Even though these other services in FIG. 4 are shown as if they are bi-directional, often some of the services such as analog video and digital video have historically been primarily unidirectional services that generally are broadcast from the headend to the subscribers.

In addition, FIG. 4 further shows some of the transmission equipment that might be used in a cable transmission network 105 (generally found between interfaces 250 and 260 in FIG. 4). For example, cable transmission networks 105 might include combiner 415 and splitter 416 to combine and split electromagnetic signals, respectively. As cable transmission network 105 may be a hybrid fiber-coax (HFC) network, it could contain devices for converting electromagnetic signals between electrical and optical formats. For example, downstream optical/electrical (O/E) interface device 417 may convert downstream electrical signals (primarily carried over coaxial cable) to downstream optical signals (primarily carried over fiber optic lines). Also, upstream optical/electrical (O/E) interface device 418 may convert upstream optical signals (primarily carried over fiber optic lines) to upstream electrical signals (primarily carried over coaxial cable). Downstream optical/electrical interface 417 and upstream optical/electrical interface 418 generally are connected to a subscriber or customer premises over at least one fiber optic connection to optical/electrical (O/E) interface 420. The downstream optical communications between downstream O/E interface 417 and O/E interface 420 might be carried on different optical fibers from the fibers carrying upstream optical communications between O/E interface 420 and upstream O/E interface 418. However, one skilled in the art will be aware that a variation on frequency-division multiplexing (FDM) known as wavelength division multiplexing (WDM) could be used to allow bi-directional duplex transmission of both the downstream and upstream optical communications on a single fiber optic link.

Generally, for an HFC system the interfaces at customer or subscriber premises are electrical coax connections. Thus, optical/electrical interface 420 may connect into a splitter/combiner 422 that divides and/or combines electrical signals associated with analog video device 411, digital video device 412, DOCSIS data device 413, and/or cable telephone device 413 that generally are located at the customer or subscriber premises. This description of the splitters, combiners, and optical electrical interfaces of HFC networks that may be used for cable transmission network 105 is basic and does not cover all the other types of equipment that may be used in a cable transmission network 105. Some non-limiting examples of other types of equipment used in a cable transmission network 105 include, but are not limited to, amplifiers and filters. Those skilled in the art will be aware of these as well as many other types of devices and equipment used in cable transmission networks.

Furthermore, one skilled in the art will be aware that the preferred embodiments of the present invention may be used on all-coax, all-fiber, and/or hybrid fiber-coax (HFC) such as cable transmission networks (CT) 105. In general, cable transmission (CT) network 105 generally is a radio frequency (RF) network that generally includes some frequency-division multiplexed (FDM) channels. Also, one skilled in the art will be aware that the preferred embodiments of the present invention may be used on a cable transmission (CT) network 105 that generally is not carrying information for other applications such as, but not limited to, analog video, digital video, DOCSIS data, and/or cable telephony. Alternatively, the preferred embodiments of the present invention may coexist on a cable transmission (CT) network 105 that is carrying information analog video, digital video, DOCSIS data, and/or cable telephony as well as various combinations and permutations thereof. Generally in the preferred embodiments of the present invention, the cable transmission (CT) network 105 is any type of network capable of providing frequency-division multiplexed (FDM) transport of communication signals such as but not limited to electrical and/or optical signals. The FDM transport includes the variation of FDM in optical networks which is generally called wavelength-division multiplexing (WDM).

In addition, the preferred embodiments of the present invention may use one or more MPEG PIDs for downstream transmission of MPEG packets carrying the traffic of Frame Management Sublayer (FMS) data flows. In addition, MPEG packets carrying the octets of one or more FMS data flows of the preferred embodiments of the present invention are capable of being multiplexed into the same frequency channel of a cable transmission network that also carries other MPEG packets that have different PID values and that generally are unrelated to the FMS data flows of the preferred embodiments of the present invention. Thus, not only are both the upstream and the downstream frequency channel usages of the preferred embodiments of the present invention easily integrated into the general frequency-division multiplexing (FDM) bandwidth allocation scheme commonly-found in cable transmission networks, but also the use of the MPEG frame format for downstream transmission in the preferred embodiments of the present invention allows easy integration into the PID-based time-division multiplexing (TDM) of MPEG 2 transport streams that also is commonly-found in cable transmission networks. Thus, one skilled in the art will be aware that the preferred embodiments of the present invention can be easily integrated into the frequency-division multiplexing (FDM) architecture of cable transmission networks.

As one skilled in the art will be aware, in North America cable transmission networks generally were first developed for carrying analog channels of NTSC (National Television Systems Committee) video that generally utilize 6 MHz of frequency bandwidth. Also, one skilled in the art will be aware that other parts of the world outside North America have developed other video coding standards with other cable transmission networks. In particular, Europe commonly utilizes the phase alternating line (PAL) analog video encoding that is generally carried on cable transmission networks in frequency channels with a little more bandwidth than the generally 6 MHz channels, which are commonly used in North American cable transmission networks. Because the frequency channels used in the preferred embodiments of the present invention will fit into the more narrow frequency bandwidth channels that were originally designed to carry analog NTSC video, the frequency channels used in the preferred embodiments of the present invention also will fit into larger frequency bandwidth channels designed for carrying analog PAL video.

In addition, although the preferred embodiments of the present invention are designed to fit within the 6 MHz channels commonly-used for analog NTSC signals and will also fit into cable transmission networks capable of carrying analog PAL signals, one skilled in the art will be aware that the multiplexing techniques utilized in the preferred embodiments of the present invention are general. Thus, the scope of the embodiments of the present invention is not to be limited to just cable transmission systems, which are designed for carrying NTSC and/or PAL signals. Instead, one skilled in the art will be aware that the concepts of the embodiments of the present invention generally apply to transmission facilities that use frequency division multiplexing (FDM) and have a one-to-many communication paradigm for one direction of communication as well as a many-to-one communication paradigm for the other direction of communication.

Furthermore, the preferred embodiments of the present invention generally communicate using signals with similar transmission characteristics to other signals commonly found in cable transmission networks. Thus, one skilled in the art will be aware that the signal transmission characteristics of the preferred embodiments of the present invention are designed to integrate into existing, already-deployed cable transmission networks that may be carrying other types of signals for other services such as, but not limited to, analog and/or digital video, analog and/or digital audio, and/or digital data. The preferred embodiments of the present invention are designed to be carried in the same communications medium that also may be carrying the other services without the preferred embodiments of the present invention introducing undesirable and unexpected interference on the other services. Furthermore, the preferred embodiments of the present invention will operate over various types of communication media including, but not limited to, coaxial (coax) cable, fiber, hybrid fiber-coax, as well as wireless. Because the preferred embodiments of the present invention generally are designed to conform to some of the historical legacy standards of cable networks, the preferred embodiments of the present invention can be used in many existing network infrastructures that are already carrying other services. Therefore, the preferred embodiments of the present invention peacefully coexist with existing historical legacy services. Also, the preferred embodiments of the present invention can be used in other environments that are not limited by historical legacy services (or services compatible with historical legacy standards).

Figure 5A:
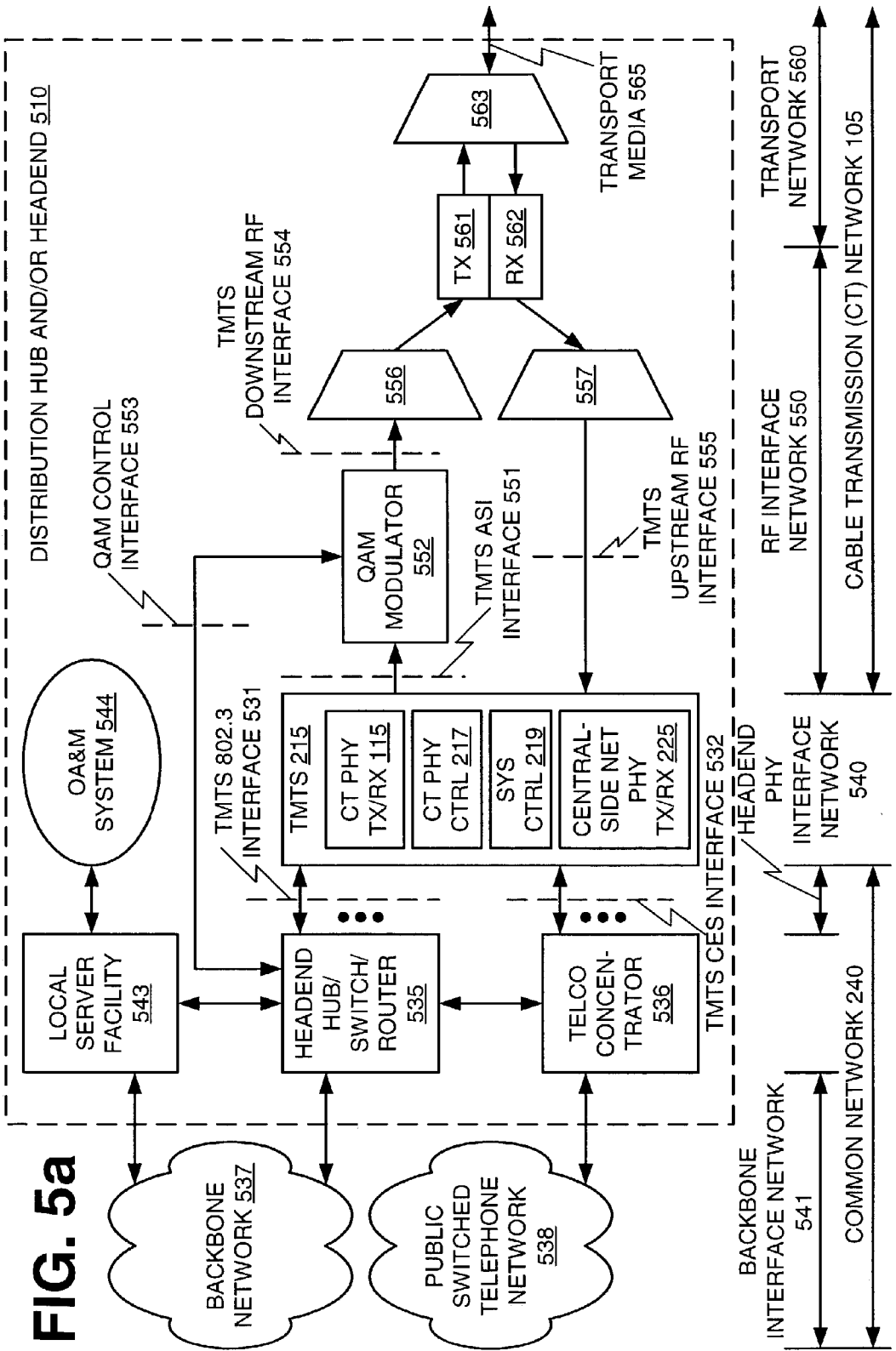
FIG. 5a shows a block diagram of a transport modem termination system connected in a headend.
Figure 5B:
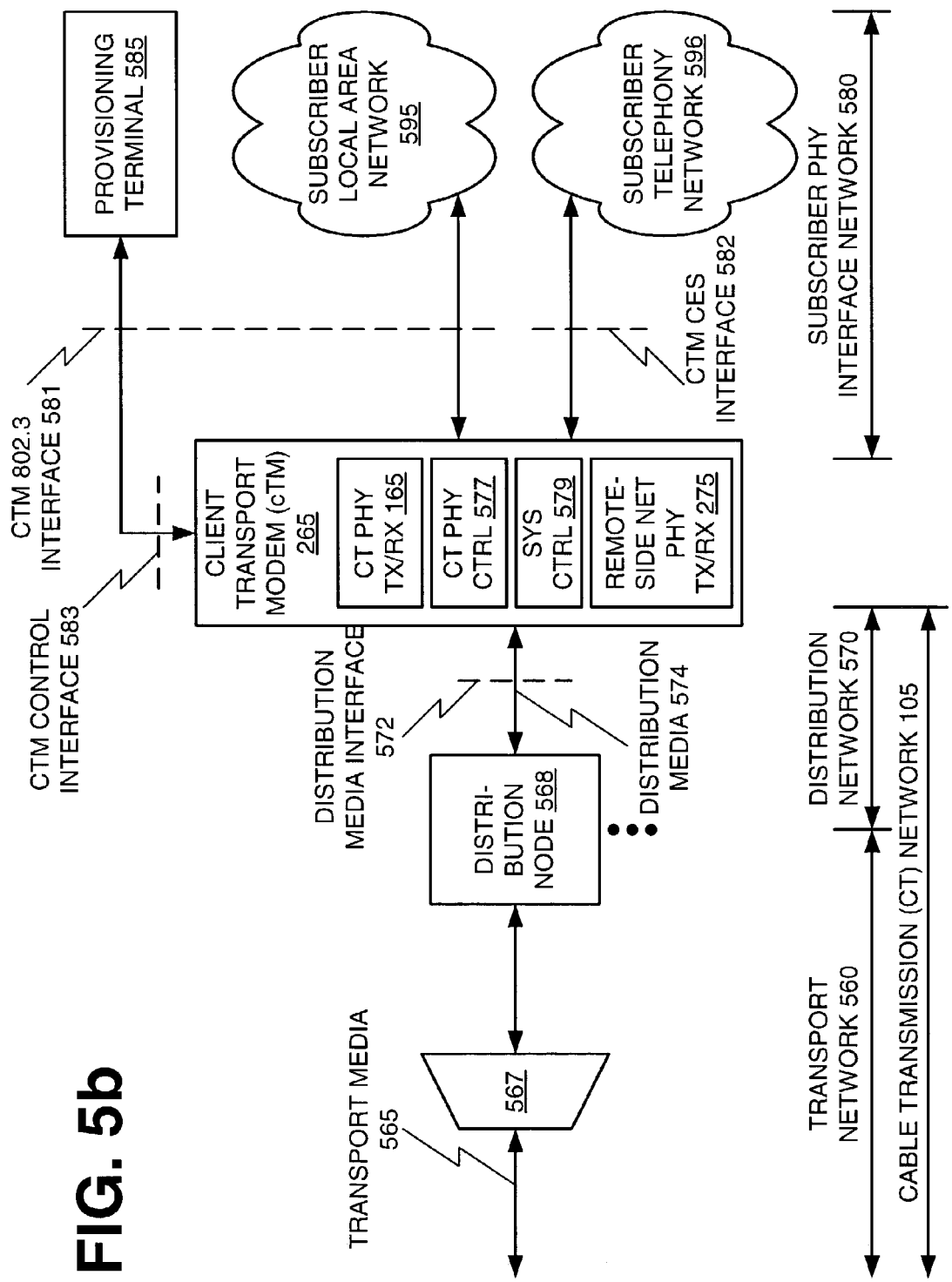
FIG. 5b shows a block diagram of a client transport modem connected to a cable transmission network.

FIGS. 5*a* and 5*b* generally show a more detailed system reference diagram for a communication system that might be using a preferred embodiment of the present invention. In general, FIG. 5*a* covers at least some of the equipment and connections commonly found on the central-side or service-provider-side in a system using the preferred embodiments of the present invention. In contrast, FIG. 5*b* generally covers at least some of the equipment and connections commonly found on the remote-side, customer-side, or subscriber-side of a system using the preferred embodiments of the present invention. Generally, the approximate demarcation of cable transmission network (CT) 105 network is shown across the FIGS. 5a and 5b. One skilled in the art will be aware that the devices shown in FIGS. 5a and 5b are non-limiting examples of the types of equipment generally found in RF cable networks. Thus, FIGS. 5a and 5b show only a preferred embodiment of the present invention and other embodiments are possible.

In general, the equipment for the central-side, service-provider side, and/or customer-side of the network generally may be located in a distribution hub and/or headend 510. FIG. 5a shows transport modem termination system (TMTS) 215 comprising at least one cable transmission (CT) physical (PHY) transceiver (TX/RX) 115, at least one cable transmission (CT) physical (PHY) control (CTRL) 217, at least system control (SYS CTRL) 219, and at least one central-side network physical (PHY) transceiver (TX/RX) 225. In the preferred embodiments of the present invention, TMTS 215 supports two types of interfaces to common network 240. In FIG. 5a these two types of interfaces are shown as TMTS 802.3 interface 531 and TMTS circuit emulation service (CES) interface 532. In general, there may be multiple instances of both TMTS 802.3 interface 531 and TMTS CES interface 532 that might be used to handle traffic for multiple remote-side network interfaces and/or transceivers on a single client transport modem (cTM) or for multiple remote-side network interfaces on a plurality of client transport modems (cTMs).

In the preferred embodiment of the present invention the at least one TMTS 802.3 interface 531 generally is capable of transparently conveying the information in ethernet/802.3 frames. Generally, at the most basic level, the preferred embodiments of the present invention are capable of acting as an ethernet/802.3 physical layer repeater. However, one skilled in the art will be aware that the generally physical layer concepts of the preferred embodiments of the present invention may be integrated into more complex communication devices and/or systems such as, but not limited to, bridges, switches, routers, and/or gateways.

Generally, at least one TMTS CES interface 532 provides circuit emulation capability that may be used to carry generally historical, legacy interfaces that are commonly associated with circuit-switched networks, such as the public switched telephone network (PSTN). Those skilled in the art will be aware of analog and/or digital interfaces to the PSTN that are commonly found in devices interfacing to the PSTN. In digital form, these interfaces often comprise integer multiples of a DS0 at 56 kbps (N×56) and/or 64 kbps (N×64). Also, a person skilled in the art will be aware of various common multiplexing technologies that may be used to aggregate the integer multiples of DS0s. These multiplexing technologies generally can be divided into the plesiochronous digital hierarchy (PDH) and the synchronous digital hierarchy (SDH) that are well-known to one of ordinary skill in the art.

In general, at least one TMTS 802.3 interface 531 may be connected into a headend hub, switch, or router 535 or any other networking device to implement various policy decisions for providing connectivity between the transport modem termination system 215 and the client transport modems (cTMs) 265. One skilled in the art generally will be aware of the various policy considerations in choosing different types of networking devices and/or connections for connecting to TMTS 802.3 interface 531.

Furthermore, at least one TMTS CES interface 532 might be connected to a telco concentrator that generally might be various switching and/or multiplexing equipment designed to interface to technologies generally used for carrying circuit-switched connections in the PSTN. Thus, telco concentrator 536 might connect to TMTS 215 using analog interfaces and/or digital interfaces that generally are integer multiples of DS0 (56 kbps or 64 kbps). Some non-limiting examples of analog interfaces that are commonly found in the industry are FXS/FXO (foreign exchange station/foreign exchange office) and E&M (ear & mouth). In addition to carrying the actual information related to CES emulation service between TMTS 215 and telco concentrator 536, TMTS CES interface 532 also may to carry various signaling information for establishing and releasing circuit-switched calls. One skilled in the art will be aware of many different signaling protocols to handle this function, including but not limited to, channel associated signaling using bit robbing, Q.931 D-channel signaling of ISDN, standard POTS signaling as well as many others.

In general, one or more devices at the headend, such as headend hub, switch, and/or router 535, generally provide connectivity between TMTS 215 and backbone network 537, which may provide connectivity to various types of network technology and/or services. Also, telco concentrator 536 may be further connected to the public switched telephone network (PSTN). In general, telco concentrator 536 might provide multiplexing and/or switching functionality for the circuit emulation services (CES) before connecting these services to the PSTN. Also, telco concentrator 536 could convert the circuit emulation services (CES) into packet-based services. For example, 64 kbps PCM voice (and associated signaling) carried across TMTS CES interface 532 might be converted into various forms of packetized voice (and associated signaling) that is carried on a connection between telco concentrator 536 and headend hub, switch, and/or router 535. In addition, the connection between telco concentrator 536 and headend hub, switch, and/or router 535 may carry network management, configuration, and/or control information associated with telco concentrator 536.

In general, TMTS 802.3 interface 531 and TMTS CES interface 532 may be considered to be at least part of the headend physical (PHY) interface network 540. Also, at least part of the common network 240 generally may be considered to be the backbone interface network 541. In addition to the systems and interfaces generally designed for transparently carrying information between the central-side networks (as represented at TMTS 802.3 interface 531 and TMTS CES interface 532) of the TMTS 215 and the remote-side networks of at least one cTM 265, the communication system generally has connections to local server facilities 543 and operations, administration, and maintenance system 544 that may both be part of common network 240. Network management, configuration, maintenance, control, and administration are capabilities that, although optional, are generally expected in many communication systems today. Though the preferred embodiments of the present invention might be implemented without such functions and/or capabilities, such an implementation generally would be less flexible and would probably be significantly more costly to support without some specialized network functions such as, but not limited to, operations, administration, and maintenance (OA&M) 544. Also, local server facility 543 may comprise servers running various protocols for functions such as, but not limited to, dynamic network address assignment (potentially using the dynamic host configuration protocol—DHCP) and/or software uploads as well as configuration file uploads and downloads (potentially using the trivial file transfer protocol—TFTP).

FIG. 5a further shows how cable transmission (CT) physical (PHY) transceiver (TX/RX) 115 in TMTS 215 might interface to RF interface network 550 in the preferred embodiment of the present invention. In an embodiment of the present invention, CT PHY transceiver 115 connects to a TMTS asynchronous serial interface (ASI) 551 for the downstream communication from TMTS 215 towards at least one client transport modem (cTM) 265. In a preferred embodiment of the present invention, the QAM (Quadrature Amplitude Modulation) modulator 552 is external to the TMTS 215. One skilled in the art will be aware that other embodiments of the present invention are possible that may incorporate the at least one QAM modulator 552 into the TMTS 215 for downstream communication. Furthermore, an ASI (asynchronous serial interface) interface is only one non-limiting example of a potential interface for the at least one QAM modulator 522. QAM modulators 552 with ASI interfaces are commonly used in cable transmission networks 105, and reuse of existing technology and/or systems may allow lower cost implementations of the preferred embodiments of the present invention. However, other embodiments using various internal and/or external interfaces to various kinds of modulators might be used in addition to or in place of the TMTS ASI interface 551 to at least one QAM modulator 552.

Because QAM modulators are used for many types of transmission in CATV networks, one skilled in the art will be aware of many interfaces (both internal and external) that might be used for connecting QAM modulator(s) 522 for downstream transmission. The TMTS ASI interface 551 is only one non-limiting example of an interface that is often used in the art and is well-known to one of ordinary skill in the art. As one skilled in the art will be aware, such QAM modulators have been used in CATV networks to support downstream transmission for commonly-deployed services such as, but not limited to, DOCSIS cable modems and digital TV using MPEG video. Due to the common usage of such QAM modulators for digital services and the large variety of external and internal interfaces used by many vendors' equipment, one skilled in the art will be aware that many types of interfaces may be used for transmitting the digital bit streams of a TMTS to QAM modulators for modulation followed by further downstream transmission over cable transmission networks. Thus, in addition to TMTS ASI interface 551, one skilled in the art will be aware of other standard and/or proprietary interfaces that may be internal or external to TMTS 215 and that might be used to communicate digital information to QAM modulator(s) 522 for downstream transmission. These other types of interfaces to QAM modulators are intended to be within the scope of the embodiments of the present invention.

In general, TMTS 215 controls the downstream modulation formats and configurations in the preferred embodiments of the present invention. Thus, when external modulators (such as QAM modulator 552) are used with TMTS 215, some form of control messaging generally exists between TMTS 215 and QAM modulator 552. This control messaging is shown in FIG. 5a as QAM control interface 553, which generally allows communication between at least one QAM modulator 552 and TMTS 215. In the preferred embodiment of the present invention, this communication between at least one QAM modulator 552 and TMTS 215 may go through headend hub, switch, and/or router 535 as well as over TMTS 802.3 interface 531.

Furthermore, modulators such as, but not limited to, at least one QAM modulator 552 often are designed to map information onto a set of physical phenomena or electromagnetic signals that generally are known as a signal space. Generally a signal space with M signal points is known as a M-ary signal space. In general, a signal space with M signal points may completely encode the floor of $\log_2 M$ bits or binary digits of information in each clock period or cycle. The floor of $\log_2 M$ is sometimes written as floor($\log_2 M$) or as $\lfloor \log_2 M \rfloor$. In general, the floor of $\log_2 M$ is the largest integer that is not greater than $\log_2 M$. When M is a power of two (i.e., the signal space has 2, 4, 8, 16, 32, 64, etc. signal points), then the floor of $\log_2 M$ generally is equal to $\log_2 M$, and $\log_2 M$ generally is known as the modulation index. Because the minimum quanta of information is the base-two binary digit or bit, the information to be mapped into a signal space generally is represented as strings of bits. However, one skilled in the art will be aware that the preferred embodiment of the present invention may work with representations of information in other number bases instead of or in addition to base two or binary.

As known to those of ordinary skill in the art, the demodulation process generally is somewhat the reverse of the modulation process and generally involves making best guess or maximum likelihood estimations of the originally transmitted information given that an electromagnetic signal or physical phenomena is received that may have been corrupted by various factors including, but not limited to, noise. In general, TMTS downstream radio frequency (RF) interface 554 carries signals that have been modulated for transmitting information downstream over an RF network. TMTS upstream radio frequency (RF) interface 555 generally carries signals that have to be demodulated to recover upstream information from an RF network. Although the preferred embodiments of the present invention generally use quadrature amplitude modulation (QAM), one skilled in the art will be aware of other possible modulation techniques. Furthermore, "Digital Communications, Fourth Edition" by John G. Proakis and "Digital Communications: Fundamentals and Applications, Second Edition" by Bernard Sklar are two common books on digital communications that describe at least some of the known modulation techniques. These two books by John G. Proakis and Bernard Sklar are incorporated by reference in their entirety herein.

Tables 1, 2, 3 and 4 generally show the transmission parameters used in the preferred embodiments of the present invention. One skilled in the art will be aware that other transmission characteristics and parameters could be used for alternative embodiments of the present invention. Table 1 specifies at least some of the preferred transmission parameters for downstream output from a TMTS. In addition, Table 2 specifies at least some of the preferred transmission parameters for downstream input into a cTM. Also, Table 3 specifies at least some of the preferred transmission parameters for upstream output from a cTM. Finally, Table 4 specifies at least some of the preferred transmission parameters for upstream input to a TMTS.

Furthermore, one skilled in the art will be aware that the concepts of the embodiments of the present invention could be used in different frequency ranges using optional frequency upconverters and/or downconverters. Therefore, although the preferred embodiments of the present invention may be designed to preferably work within the specified frequency ranges, the scope of the concepts of the present invention is also intended to include all variations of the present invention that generally involve frequency shifting the operational range of the upstream and/or downstream channels in a cable distribution network. Frequency shifting signals using upconverters and/or downconverters is known to one of ordinary skill in the art of cable networks.

TABLE 1

Downstream output from TMTS

| Parameter | Value |
|---|---|
| Channel Center Frequency (fc) | 54 MHz to 857 MHz ±30 kHz |
| Level | Adjustable over the range 50 to 61 dBmV |
| Modulation Type | 64 QAM and 256 QAM |
| Symbol Rate (nominal) | |
| 64 QAM | 5.056941 Msym/sec |
| 256 QAM | 5.360537 Msym/sec |
| Nominal Channel Spacing | 6 MHz |
| Frequency Response | |
| 64 QAM | ~18% Square Root Raised Cosine Shaping |
| 256 QAM | ~12% Square Root Raised Cosine Shaping |
| Output Impedance | 75 ohms |
| Output Return Loss | >14 dB within an output channel up to 750 MHz; >13 dB in an output channel above 750 MHz |
| Connector | F connector per [IPS-SP-406] |

±30 kHz includes an allowance of 25 kHz for the largest FCC frequency offset normally built into upconverters.

TABLE 2

Downstream input to cTM

| Parameter | Value |
|---|---|
| Center Frequency (fc) | 54 MHz to 857 MHz ±30 kHz |
| Level | −5 dBmV to +15 dBmV |
| Modulation Type | 64 QAM and 256 QAM |
| Symbol Rate (nominal) | |
| 64 QAM | 5.056941 Msym/sec |
| 256 QAM | 5.360537 Msym/sec |
| Bandwidth | |
| 64 QAM | 6 MHz with ~18% Square Root Raised Cosine Shaping |
| 256 QAM | 6 MHz with ~12% Square Root Raised Cosine Shaping |
| Total Input Power (40-900 MHz) | <30 dBmV |
| Input (load) Impedance | 75 ohms |
| Input Return Loss | >6 dB 54-860 MHz |
| Connector | F connector per [IPS-SP-406] (common with the output) |

TABLE 3

Upstream output from cTM

| Parameter | Value |
|---|---|
| Channel Center Frequency (fc) | |
| Sub-split | 5 MHz to 42 MHz |
| Data-split | 54 MHz to 246 MHz |
| Number of Channels | Up to 3 |
| Nominal Channel Spacing | 6 MHz |
| Channel composition | Up to 14 independently modulated tones |
| Tone Modulation Type | QPSK, 16 QAM, 64 QAM or 256 QAM |

TABLE 3-continued

Upstream output from cTM

| Parameter | Value |
|---|---|
| Symbol Rate (nominal) | 337500 symbols/s |
| Tone Level | Adjustable in 2 dB steps over a range of −1 dBmV to +49 dBmV per tone (+10.5 dBmV to +60.5 dBmV per fully loaded channel, i.e. all 14 tones present) |
| Tone Frequency Response | 25% Square Root Raised Cosine Shaping |
| Occupied Bandwidth per Tone | 421.875 kHz |
| Occupied Bandwidth per Channel | 5.90625 MHz |
| Output Impedance | 75 ohms |
| Output Return Loss | >14 dB |
| Connector | F connector per [IPS-SP-406] |

TABLE 4

Upstream input to TMTS

| Parameter | Value |
|---|---|
| Channel Center Frequency (fc) | |
| Subsplit | 5 MHz to 42 MHz |
| Data-split | 54 MHz to 246 MHz |
| Tone nominal level | +20 dBmV |
| Tone Modulation Type | QPSK, 16 QAM, 64 QAM or 256 QAM |
| Symbol Rate (nominal) | 337500 symbols/s |
| Tone Bandwidth | 421.875 kHz with 25% Square Root Raised Cosine Shaping |
| Total Input Power (5-246 MHz) | <30 dBmV |
| Input (load) Impedance | 75 ohms |
| Input Return Loss | >6 dB 5-246 MHz |
| Connector | F connector per [IPS-SP-406] |

Generally, the downstream signals associated with TMTS 215 may or may not be combined in downstream RF combiner 556 with other downstream RF signals from applications such as, but not limited to, analog video, digital video, DOCSIS data, and/or cable telephony. Upstream RF splitter 557 may split the upstream signals for TMTS 215 from upstream signals for other applications such as, but not limited to, analog video, digital video, DOCSIS data, and/or cable telephony. Also, the downstream RF combiner 556 and upstream RF splitter 557 might be used to carry the communications for multiple transport modem termination systems, such as TMTS 215, over a cable transmission (CT) network 105. The signals used in communication between a TMTS 215 and at least one client transport modem (cTM) 265 generally might be treated like any other RF signals for various applications that generally are multiplexed into cable transmission (CT) network 105 based upon 6 MHz frequency channels.

If cable transmission (CT) network 105 is a hybrid fiber-coax (HFC) network, then the transport network 560 may include transmitter 561 receiver 562 as optical/electrical (O/E) interfaces that convert the RF signals between coaxial cable and fiber optical lines. In addition, transport combiner 563 may handle combining the two directions of optical signals as well as other potential data streams for communication over at least one fiber using techniques such as, but not limited to, wavelength-division multiplexing (WDM). Thus, in a preferred embodiment of the present invention using HFC as at least part of cable transmission (CT) network 105, transport media 565 may be fiber optical communication lines.

FIG. 5b generally shows the continuation of cable transmission (CT) network 105, transport network 560, and transport media 565 in providing connectivity between TMTS 215 and at least one client transport modem (cTM) 265. In a preferred embodiment of the present invention that utilizes fiber optic lines as at least part of transport network 560, transport splitter 567 may provide wavelength division multiplexing (WDM) and demultiplexing to separate the signals carried in the upstream and downstream directions and possibly to multiplex other signals for other applications into the same at least one fiber. If transport network 560 is a fiber network and cable transmission (CT) network 105 is a hybrid fiber-coax network, then at least one distribution node 568 may comprise optical/electrical interfaces to convert between a fiber transport network 560 and a coaxial cable distribution network 570. In general, there may be a distribution media interface 572 and distribution media 574 that provide connectivity between at least one client transport modem (cTM) 265 and distribution node 568.

A client transport modem (cTM) 265 generally comprises a cable transmission physical (PHY) transceiver (TX/RX) 165 as well as a remote-side network physical (PHY) transceiver (TX/RX) 275. In addition, a client transport modem (cTM) 265 comprises cable transmission (CT) physical (PHY) control (CTRL) 577 and system control 579. In general, CT PHY control 577 is concerned with handling bandwidth allocations in cable transmission (CT) network 105, and system control 579 generally is concerned with cTM management and/or configuration.

In the preferred embodiment of the present invention a client transport modem (cTM) 265 generally interfaces with at least one subscriber physical (PHY) interface network 580. Interfaces such as interface 285 in FIG. 2b may comprise a cable transport modem (cTM) 802.3 interface 581 and/or a cTM circuit emulation service (CES) interface 582 in FIG. 5b. Thus, a cTM may have multiple interfaces to different remote-side networks, and the interfaces may use different interface types and/or technologies. Also, a cTM 265 may have a cTM control interface 583 that is used to allow at least one provisioning terminal 585 to perform various tasks such as, but not limited to, configuration, control, operations, administration, and/or maintenance. In the preferred embodiment of the present invention, the cTM control interface 583 may use ethernet/802.3, though other interface types and technologies could be used. Also, cTM control interface 583 could use a separate interface from interfaces used to connect to remote-side networks such as subscriber local area network 595. Based on various policy decisions and criteria, such as but not limited to security, the cTM control interface 583 may be carried over the same communications medium that connects to various remote-side networks or it may be carried over separate communications medium from that used in connecting to various remote-side networks. In the preferred embodiment of the present invention, the cTM control interface 583 is carried in a separate 802.3/ethernet medium for security.

Also, FIG. 5b shows client transport modem (cTM) 265 being connected over cTM circuit emulation service (CES) interface 582 to another remote-side network, the subscriber telephony network 596. Many remote or subscriber locations have legacy equipment and applications that use various interfaces commonly found in connections to the PSTN. The preferred embodiments of the present invention allow connection of these types of interfaces to the client transport modem (cTM) 265. Some non-limiting examples of these interfaces are analog POTS lines as well as various digital interfaces generally supporting N×56 and N×64 (where N is any positive integer). The digital interfaces may have a plurality of DS0s multiplexed into a larger stream of data using the plesiochronous digital hierarchy (PDH) and/or the synchronous digital hierarchy (PDH). In the preferred embodiments of the present invention, cTM CES interface 582 is a T1 line, which is part of the plesiochronous digital hierarchy (PDH).

Protocol Models

Figure 6:
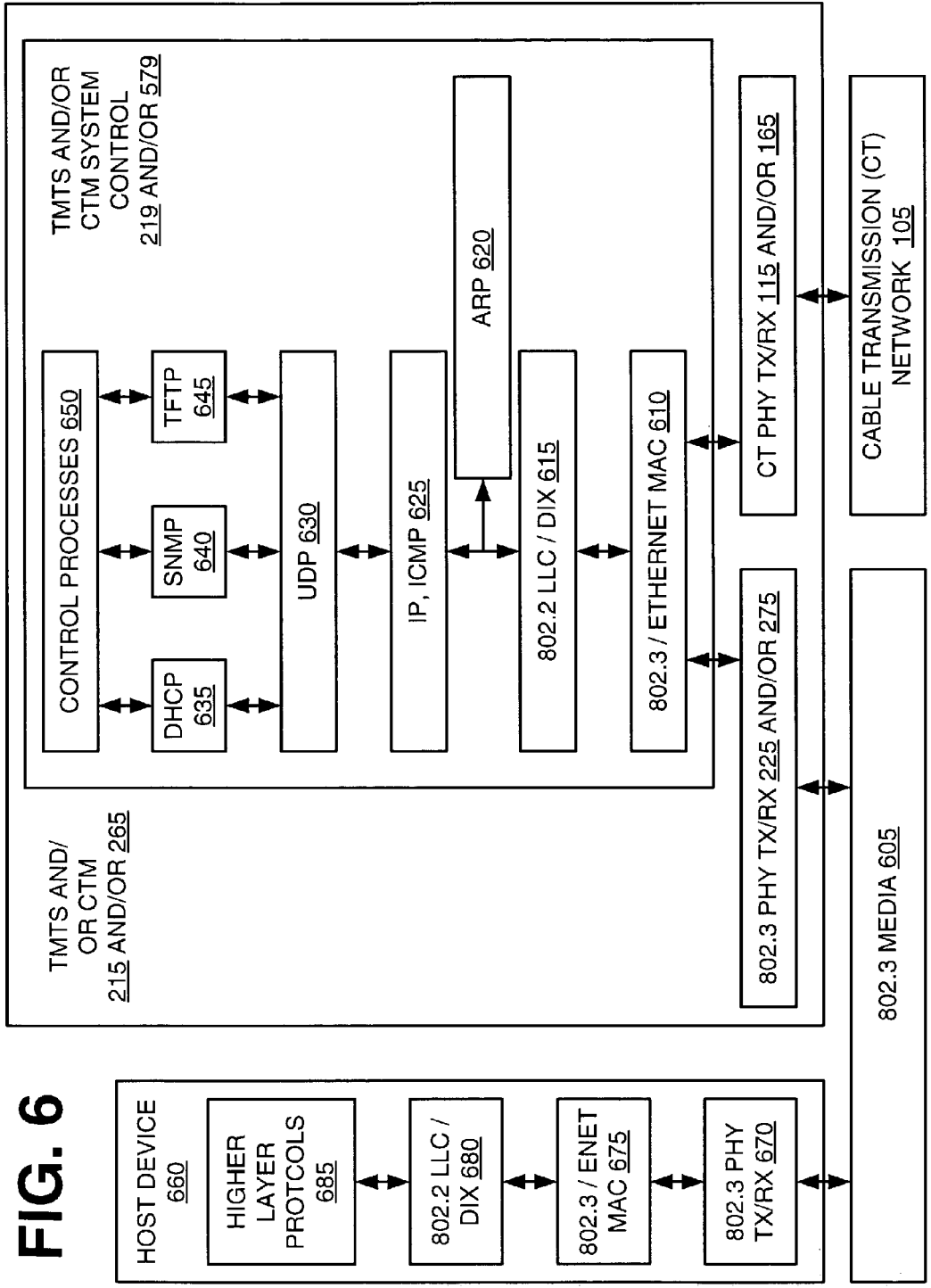
FIG. 6 shows a block diagram of some protocols that may be used in the system control of a transport modem termination system (TMTS) and/or a client transport modem (cTM).

FIG. 6 shows more detail of a preferred embodiment of a transport modem termination system (TMTS) 215 and/or a client transport modem (cTM) 265. In general, for various tasks such as, but not limited to, configuration, management, operations, administration, and/or maintenance, a TMTS 215 and/or a cTM 265 generally may have a capability of system control 219 and/or 579, respectively. In general, the system control 219 and/or 579 may have at least one cable transmission (CT) physical (PHY) transceiver (TX/RX) 115 and/or 165 as well as at least one interface for connecting to central-side and/or remote-side networks with ethernet/802.3 physical (PHY) transceiver 225 and/or 275 being the at least one type of connection to the central-side and/or remote-side networks in the preferred embodiment of the present invention. At least one cable transmission (CT) physical (PHY) transceiver (TX/RX) 115 and/or 165 generally is connected to at least one cable transmission (CT) network 105. Also, in the preferred embodiment of the present invention at least one ethernet/802.3 physical (PHY) transceiver 225 and/or 275 is connected to at least one ethernet/802.3 media 605.

In general, a single instance of a 802.3/ethernet media access control (MAC) algorithm could be used for both the 802.3 physical (PHY) transceiver (TX/RX) 225 and/or 275 as well as the cable transmission (CT) physical (PHY) transceiver (TX/RX) 115 and/or 165. In other embodiments multiple instances of a medium access control (MAC) algorithm may be used. In general, ethernet/802.3 uses a carrier sense multiple access with collision detection (CSMA/CD) MAC algorithm. Each instance of the algorithm generally is responsible for handling the carrier sensing, collision detection, and/or back-off behavior of in one MAC collision domain. The details of the 802.3 MAC are further defined in IEEE standard 802.3-2000, "Part 3: Carrier sense multiple access with collision detection (CSMA/CD) access method and physical layer", which was published in 2000, and is incorporated by reference in its entirety herein.

The preferred embodiment of the present invention generally functions as a physical layer repeater between at least one 802.3 media 605 and at least one cable transmission (CT) network 105. Although repeaters may support a particular MAC algorithm for management and control purposes, generally repeaters do not break up a network into different collision domains and/or into different layer three sub-networks. However, one skilled in the art will be aware that other embodiments are possible for devices such as, but not limited to, bridges, switches, routers, and/or gateways. These other embodiments may have multiple instances of the same and/or different MAC algorithms.

Furthermore, the CSMA/CD MAC algorithm as well as the physical layer signals that generally are considered part of the ethernet/802.3 specification may be used to carry different frame types. In the preferred embodiment of the present invention, because of the wide-spread availability of Internet Protocol (IP) technology, the system control 219 for TMTS 215 and/or the system control 579 for cTM 265 generally may use IP for various tasks such as, but not limited to, configuration, management, operations, administration, and/or maintenance. On ethernet/802.3 networks, IP datagrams commonly are carried in Digital-Intel-Xerox (DIX) 2.0 or ethernet_II frames. However, other frame types may be used to carry IP datagrams including, but not limited to, 802.3 frames with 802.2 logical link control (LLC) and a sub-network access protocol (SNAP). Thus, 802.2 LLC/DIX 615 handles the correct frame type information for the IP datagrams communicated to and/or from the system control 219 and/or 579 of TMTS 215 and/or cTM 265, respectively. Often network devices using the internet protocol (IP) are configurable for 802.2 LLC and/or ethernet_II frame types.

In general, for communications with IP devices a mapping should exist between logical network layer addresses (such as IP addresses) and hardware, data link, or MAC layer addresses (such as ethernet/802.3 addresses). One protocol for dynamically determining these mappings between IP addresses and ethernet/802.3 addresses on broadcast media is the address resolution protocol (ARP). ARP is commonly used in IP devices that are connected to broadcast media such as ethernet/802.3 media. Thus, the preferred embodiments of the present invention generally support ARP 620 to allow tasks such as, but not limited to, configuration, management, operations, administration, and/or maintenance of TMTS 215 and/or cTM 265.

In the preferred embodiments of the present invention, TMTS 215 and/or cTM 265 generally support management and/or configuration as IP devices. Thus, system control 219 and/or 579 generally has an IP layer 625 that may also optionally include support for ICMP. The internet control message protocol (ICMP) is commonly used for simple diagnostic tasks such as, but not limited to, echo requests and replies used in packet internet groper (PING) programs. Generally, various transport layer protocols such as, but not limited to, the user datagram protocol (UDP) 630 are carried within IP datagrams. UDP is a connectionless datagram protocol that is used in some basic functions in the TCP/IP (Transmission Control Protocol/Internet Protocol) suite. Generally, UDP 630 supports the dynamic host configuration protocol (DHCP) 635, which is an extension to the bootstrap protocol (BOOTP), the simple network management protocol (SNMP) 640, the trivial file transfer protocol (TFTP) 645, as well as many other protocols within the TCP/IP suite.

DHCP 635 is commonly used in IP devices to allow dynamic assignment of IP addresses to devices such as TMTS 215 and/or cTM 265. SNMP 640 generally supports "sets" to allow a network management system to assign values on the network devices, "gets" to allow a network management system to retrieve values from network devices, and/or "traps" to allow network devices to information a network management system of alarm conditions and events. TFTP 645 might be used to load a configuration from a file onto a network device, to save off a configuration of a network device to a file, and/or to load new code or program software onto a network device. These protocols of DHCP 635, SNMP 640, and TFTP 645 may be used in the preferred embodiment for control processes 650 in system control 219 and/or 579 of TMTS 219 and/or cTM 265, respectively.

Furthermore, one skilled in the art will be aware that many other interfaces are possible for tasks such as, but not limited to, configuration, management, operations, administration, and/or maintenance of TMTS 215 and/or cTM 265. For example, the system control 219 or 579 in TMTS 215 and/or cTM 265 may support the transmission control protocol (TCP) instead of or in addition to UDP 630. With TCP, control processes 650 could use other TCP/IP suite protocols such as, but not limited to, the file transfer protocol (FTP), the hyper text transfer protocol (HTTP), and the telnet protocol. One skilled in the art will be aware that other networking devices have used FTP for file transfer, HTTP for web browser user interfaces, and telnet for terminal user interfaces. Also, other common use interfaces on network equipment include, but are not limited to, serial ports, such as RS-232 console interfaces, as well as LCD (Liquid Crystal Display) and/or LED (Light Emitting Diode) command panels. Although the preferred embodiments of the present invention may use DHCP 635, SNMP 640, and/or TFTP 645, other embodiments using these other types of interfaces are possible for tasks such as, but not limited to, configuration, management, operations, administration, and/or maintenance of TMTS 215 and/or cTM 265.

In the preferred embodiments of the present invention, the local server facility 543 and/or the OA&M system 544 of FIG. 5a as well as the provisioning terminal 585 of FIG. 5b are at least one host device 660 that communicated with control processes 650 of TMTS 215 and/or cTM 265. In general, at least one host device 660 may be connected to 802.3 media 605 through 802.3 physical (PHY) transceiver (TX/RX) 670. Host device 660 may have an 802.3/ethernet (ENET) media access control (MAC) layer 675, an 802.2 LLC/DIX layer 680, and higher layer protocols 685. Although FIG. 6 shows host device 660 directly connected to the same 802.3 media 605 as TMTS 215 or cTM 265, in general there may be any type of connectivity between host device 660 and TMTS 215 and/or cTM 265. This connectivity may include networking devices such as, but not limited to, repeaters, bridges, switches, routers, and/or gateways. Furthermore, host device 660 does not necessarily have to have the same type of MAC interface as TMTS 215 and/or cTM 265. Instead, host device 660 generally is any type of IP host that has some type of connectivity to TMTS 215 and/or cTM 265 and that supports the proper IP protocols and/or applications for tasks such as, but not limited to, configuration, management, operations, administration, and/or maintenance.

Figure 7:
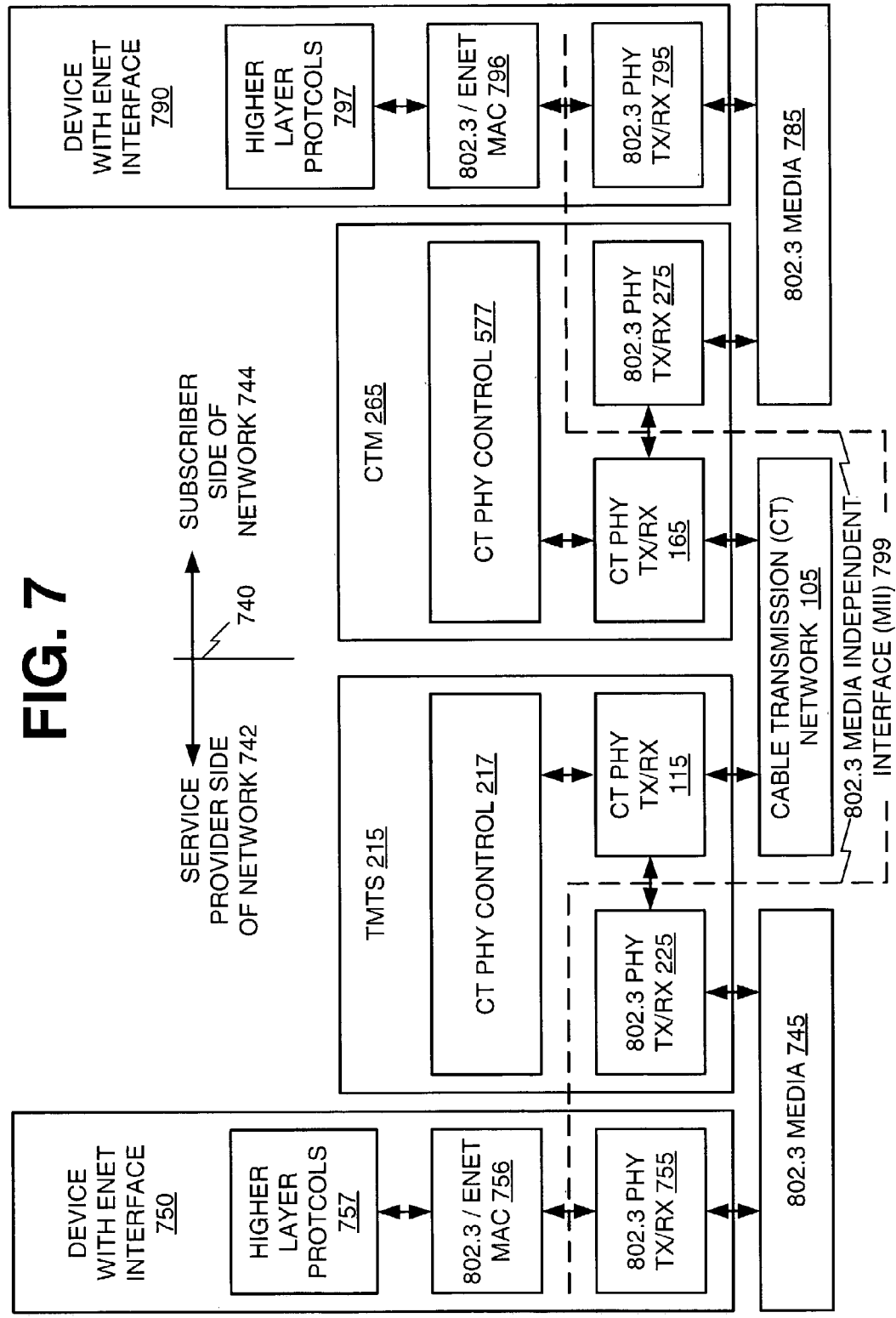
FIG. 7 shows a block diagram of a TMTS and a cTM providing physical layer repeater service.

FIG. 7 shows a more detailed breakdown of how TMTS 215 and cTM 265 might provide communication over cable transmission network 105. The preferred embodiments of the present invention might be used in a network generally divided at point 740 into a service-provider-side (or central-side) of the network 742 as well as a subscriber-side, customer-side, or remote-side of the network 744. In general, TMTS 215 would be more towards the central-side or service-provider-side of the network 742 relative to cTM 265, which would be more towards the subscriber-side, customer-side, or remote-side of the network 744 relative to the TMTS 215. As was shown in FIGS. 5a and 5b, and is shown again in FIG. 7, TMTS 215 may comprise a cable transmission (CT) physical (PHY) transceiver (TX/RX) 115, an ethernet/802.3 physical (PHY) transceiver (TX/RX) 225, and a cable transmission (CT) physical (PHY) control 217. Also, cTM 265 may comprise a cable transmission (CT) physical (PHY) transceiver (TX/RX) 165, an ethernet/802.3 physical (PHY) transceiver (TX/RX) 275, and a cable transmission (CT) physical (PHY) control 577.

In the preferred embodiment of the present invention, TMTS 215 and cTM 265 generally provide layer one, physical level repeater service between ethernet/802.3 physical (PHY) transceiver (TX/RX) 225 and ethernet/802.3 physical (PHY) transceiver (TX/RX) 275. Furthermore, cable transmission (CT) physical (PHY) control 217 in TMTS 215 generally communicates with cable transmission (CT) physical (PHY) control 577 in cTM 265 to allocate and/or assign bandwidth. In addition to allocating and/or assigning bandwidth, cable transmission (CT) physical control 217 and cable transmission (CT) physical control 577 generally may include mechanisms to request and release bandwidth as well as to inform the corresponding cable transmission (CT) physical (PHY) control of the bandwidth allocations. Also, cable transmission (CT) physical control 217 and cable transmission (CT) physical control 577 generally may communicate to negotiate cTM radio frequency (RF) power levels so that the TMTS receives an appropriate signal level.

In the preferred embodiments of the present invention, the TMTS 215 and the cTM 265 generally are transparent to ethernet/802.3 frames communicated between ethernet/802.3 physical (PHY) transceiver (TX/RX) 225 and ethernet/802.3 physical (PHY) transceiver 275. To maintain this transparency, the communication between cable transmission (CT) physical (PHY) control 217 and cable transmission (CT) physical (PHY) control 577 generally do not significantly modify and/or disturb the ethernet frames communicated between 802.3/ethernet physical (PHY) transceiver (TX/RX) 225 and 802.3/ethernet physical (PHY) transceiver (TX/RX) 275. There are many possible ways of communicating between cable transmission (CT) physical (PHY) control 217 and cable transmission (CT) physical (PHY) control 577 of TMTS 215 and cTM 265, respectively, while still maintaining transparency for the 802.3 physical transceivers 225 and/or 275. In the preferred embodiments of the present invention, the traffic between cable transmission (CT) physical (PHY) control 217 and 577 of TMTS 215 and cTM 265, respectively, is multiplexed into the same data stream with 802.3/ethernet traffic between 802.3 physical (PHY) transceivers 225 and 275 of TMTS 215 and cTM 265, respectively. However, the control traffic generally uses a different frame than standard ethernet/802.3 traffic.

Ethernet/802.3 frames generally begin with seven octets of preamble followed by a start frame delimiter of 10101011 binary or AB hexadecimal. (In reality ethernet DIX 2.0 has an eight octet preamble, and IEEE 802.3 has a seven octet preamble followed by a start frame delimiter (SFD). In either case, these initial eight octets are generally the same for both ethernet DIX 2.0 and IEEE 802.3.) To differentiate control frames between cable transmission (CT) physical (PHY) control 217 and 577 from ethernet frames between 802.3 physical (PHY) transceivers (TX/RX) 225 and 275, a different value for the eighth octet (i.e., the start frame delimiter) may be used on the control frames. Because most devices with ethernet/802.3 interfaces would consider a frame with a start frame delimiter (SFD) to be in error, these control frames generally are not propagated through 802.3 physical (PHY) transceivers (TX/RX) 225 and/or 275. This solution offers the advantage of the control frames that communicate bandwidth allocations being generally inaccessible to devices on directly connected 802.3 media. This lack of direct accessibility to the control frames may provide some security for communications about bandwidth allocations, which may be related to various billing policies. Because cable transmission (CT) physical (PHY) control 217 and 577 generally does not generate 802.3 or ethernet frames in the preferred embodiment of the present invention, FIG. 7 shows cable transmission (CT) physical (PHY) control 217 and 577 generally connected to cable transmission (CT) physical (PHY) transceivers (TX/RX) 115 and 165, respectively, and generally not connected to 802.3/ethernet physical (PHY) transceivers (TX/RX) 225 and 275, respectively.

As shown in FIG. 7, ethernet/802.3 physical (PHY) transceiver (TX/RX) 225 in TMTS 215 generally is connected to 802.3/ethernet media 745, which is further connected to at least one device with an ethernet interface 750. Device with ethernet interface 750 may further comprise an 802.3/ethernet physical (PHY) transceiver (TX/RX) 755, an 802.3/ethernet medium access control layer 756, as well as other higher layer protocols 757. Also, ethernet/802.3 physical (PHY) transceiver (TX/RX) 275 in cTM 265 generally is connected to 802.3/ethernet media 785, which is further connected to at least one device with an ethernet interface 790. Device with ethernet interface 790 may further comprise an 802.3/ethernet physical (PHY) transceiver (TX/RX) 795, an 802.3/ethernet medium access control layer 796, as well as other higher layer protocols 797.

In general, the preferred embodiments of the present invention provide transparent physical layer repeater capability that may carry information between device with ethernet interface 750 and device with ethernet interface 790. As a non-limiting example, device with ethernet interface 750 may have information from a higher layer protocol such as, but not limited to, an IP datagram. In FIG. 7, this IP datagram is formed in the higher layer protocols block 757 and is passed down to 802.3/ethernet MAC layer 756, which adds data link information to form an ethernet frame. Then 802.3 physical (PHY) transceiver (TX/RX) 755 handles generating the proper electromagnetic signals to propagate the information over 802.3/ethernet media 745. In the preferred embodiments of the present invention, TMTS 215 functions as a repeater that copies bits (or other forms of information) received from 802.3/ethernet media 745 by 802.3/ethernet physical (PHY) transceiver (TX/RX) 225. The bits are copied over to cable transmission (CT) physical (PHY) transceiver (TX/RX) 115, which generates the proper signals to communicate the information over cable transmission network 105. (Note: in some embodiments some portions of the signal generation may be performed externally to the TMTS 215 as in at least one external QAM modulator 552.)

After propagating through cable transmission (CT) network 105, the bits (or other forms of information) are received in cable transmission (CT) physical (PHY) transceiver (TX/RX) 165 of cTM 265. In the preferred embodiments of the present invention, cTM 265 functions as a repeater that copies bits (or other forms of information) received from cable transmission network 105 by cable transmission (CT) physical (PHY) transceiver (TX/RX) 165. The bits are copied over to 802.3/ethernet physical (PHY) transceiver (TX/RX) 275, which generates the proper signals to communicate the information over 802.3/ethernet media 785.

In device with ethernet interface 790, 802.3/ethernet physical (PHY) transceiver (TX/RX) 795 receives the electromagnetic signals on 802.3/ethernet media 785 and recovers the bits (or other forms of information) from the electromagnetic signals. Next, 802.3/ethernet media access control (MAC) 796 generally checks the ethernet/802.3 framing and verifies the frame check sequence (FCS) or cyclic redundancy code (CRC). Finally, the IP datagram is passed up to higher layer protocols 797. Generally, a reverse process is followed for communications in the opposite direction.

Furthermore, it is to be understood that embodiments of the present invention are capable of providing similar connectivity over cable transmission (CT) network 105 to devices (such as device with ethernet interface 750 and device with ethernet interface 790), which may be directly connected to 802.3/ethernet media 745 and/or 785 as well as other devices that are not directly connected to 802.3/ethernet media 745 and/or 785. Thus, other devices which are indirectly connected to 802.3/ethernet media through other media, links, and/or networking devices may also utilize the connectivity provided by the preferred embodiments of the present invention.

In the preferred embodiments of the present invention, TMTS 215 can be thought of as providing level one, physical layer repeater service between 802.3/ethernet physical (PHY) transceiver (TX/RX) 225 and cable transmission (CT)

physical (PHY) transceiver (TX/RX) 115. Also in the preferred embodiments of the present invention, cTM 265 can be thought of as providing level one, physical layer repeater service between 802.3/ethernet physical (PHY) transceiver (TX/RX) 275 and cable transmission (CT) physical (PHY) transceiver (TX/RX) 165. In addition in the preferred embodiments of the present invention, TMTS 215 and cTM 265 together can be thought of as providing level one, physical layer repeater service between 802.3/ethernet physical (PHY) transceiver (TX/RX) 225 and 802.3/ethernet physical (PHY) transceiver (TX/RX) 275. In providing level one, physical layer repeater service between 802.3/ethernet physical (PHY) transceiver (TX/RX) 225 and 802.3/ethernet physical (PHY) transceiver (TX/RX) 275, TMTS 215 and cTM 265 each may be thought of as half-repeaters of a repeater pair.

In general, networking devices connecting local area networks (or LANs such as, but not limited to, ethernet/802.3 media 745 and 785) over a wide-area network (or WAN such as, but not limited to, cable transmission network 105) may be viewed using at least two abstractions or models. First, the two devices at each end of the WAN may be viewed as independent networking devices each acting as a repeater, bridge, switch, router, gateway, or other type of networking device connecting the LAN and the WAN. Alternatively, a pair of networking devices on each end of a WAN could be viewed based on each networking device providing one half of the service provided over the WAN. Thus, each networking device at the end of a WAN could be thought of as a half-repeater, half-bridge, half-switch, half-router, half-gateway, etc. for a pair of networking devices providing connectivity across a WAN. In addition, one skilled in the art will be aware that the networking devices on each end of a connection may actually perform according to different forwarding constructs or models (such as, but not limited to, repeater, bridge, switch, router, and/or gateway). Thus, one skilled in the art will be aware that one of the networking devices (either the TMTS 215 or a cTM 265) connected to cable transmission network may provide services such as, but not limited to, repeater, bridge, switch, router, and/or gateway while the other networking device (either a cTM 265 or the TMTS 215, respectively) may provide the same or different services such as, but not limited to, repeater, bridge, switch, router, and/or gateway. Furthermore, each networking device could provide different services or forwarding constructs for different protocols.

Therefore, even though the preferred embodiments of the present invention have a repeater service or forwarding construct for both a TMTS 215 and a cTM 265 as well as a TMTS 215 and a cTM 265 jointly, one skilled in the art will be aware that other embodiments of the present invention are possible in which the forwarding construct for a TMTS 215 and/or a cTM may be independently chosen. Furthermore, the forwarding construct could be different for each client transport modem 265, 266, 267, and 268 connected to the same TMTS 215. Also, transport modem termination systems 215 may have different forwarding behavior or forwarding constructs for each port. In addition, multiple TMTS 215 devices might utilize different forwarding constructs but still be connected to the same cable transmission network 105. Also, one skilled in the art will be aware of hybrid forwarding constructs in addition to the general layer one repeater service, layer two bridge service, and/or layer three routing service. Any hybrid type of forwarding construct also might be used as alternative embodiments of the present invention. Therefore, one skilled in the art will be aware that alternative embodiments exist utilizing other forwarding constructs in addition to the layer one, repeater service of the preferred embodiment of the present invention.

FIG. 7 further shows an 802.3/ethernet media independent interface (MIT) 799 as a dashed line intersecting connections to various 802.3/ethernet physical layer interfaces or transceivers (755, 225, 275, and 795). In general, the IEEE 802.3 standards defined a media independent interface for 100 Mbps ethernet and a Gigabit media independent interface (GMII) for 1000 Mbps ethernet. References in the figures and description to MII and/or GMII are meant to include both MII and GMII. Generally, the MII and GMII interfaces allow 802.3 interfaces to be made that can be interfaced with different physical cables. As a non-limiting example, 100BaseT4, 100BaseTX, and 1000BaseFX are three different types of physical cables/optical lines that can be used in the IEEE 802.3 ethernet standards covering 100 Mbps or fast ethernet. 100BaseTX is designed for twisted pair cables, whereas 100BaseFX is designed for fiber optic cables. The media independent interface (MII) provides a standard interface for communicating with devices designed to form and interpret the physical electrical and/or optical signals of different types of media.

Figure 8:
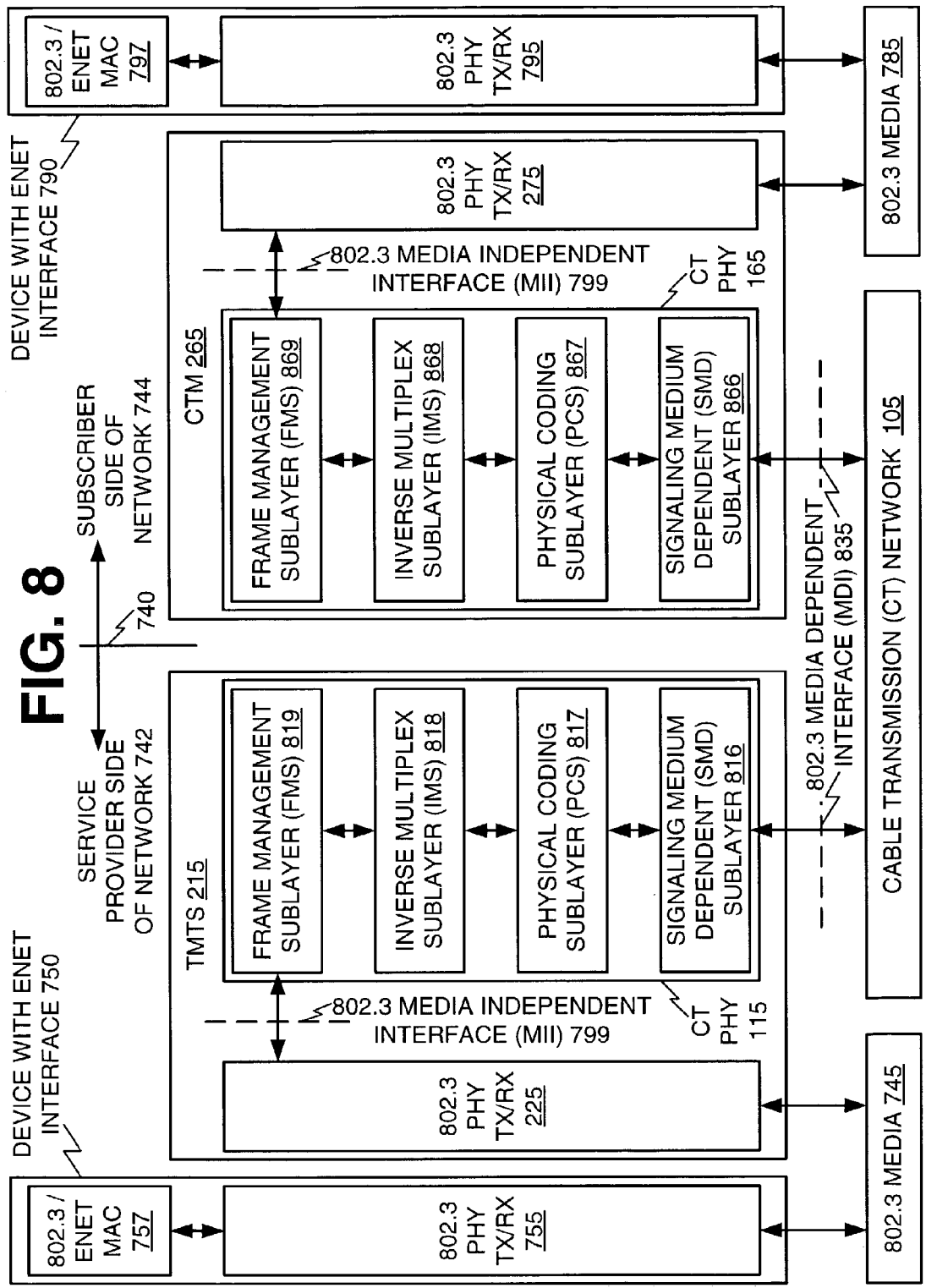
FIG. 8 shows an expanded block diagram of the protocol sublayers within the physical layer of the TMTS and the cTM.

FIG. 8. shows a more detailed diagram for connecting ethernet devices through a transport modem termination system (TMTS) 215 and a client transport modem (cTM) 265. FIG. 8 further divides the cable transmission (CT) physical (PHY) transceiver (TX/RX) 115 and 165. MTS 215 comprises CT PHY 115, which further comprises signaling medium dependent (SMD) sublayer 816, physical coding sublayer (PCS) 817, inverse multiplex sublayer (IMS) 818, and frame management sublayer (FMS) 819. FMS 819 connects to 802.3/ethernet physical transceiver 225 through 802.3/ethernet media interface (MII) 799. SMD sublayer 816 communicates through cable transmission (CT) network 105 across 802.3/ethernet media dependent interface (MDI) 835.

Also client transport modem 265 has a cable transmission physical transceiver 165 that comprises signaling medium dependent (SMD) sublayer 866, physical coding sublayer (PCS) 867, inverse multiplex sublayer (IMS) 868, and frame management sublayer (FMS) 869. SMD sublayer 866 communicates through cable transmission network 105 across 802.3 media dependent interface (MDI) 835. FMS 869 provides an 802.3 media independent interface (MI) 799, which may be connected to an 802.3 ethernet physical transceiver 275.

In general, FMS 819 and 869 provide management functions that allow control traffic to be combined with and separated from data traffic. A frame management sublayer (such as FMS 819 and/or 869) may support a plurality of 802.X interfaces. Each active 802.X port of FMS 869 in client transport modem 265 generally has a one-to-one relationship with an associated active 802.X port in a transport modem termination system 215. Generally FMS 819 within TMTS 215 has similar behavior to FMS 869 in cTM 265. However, as TMTS 215 generally is a concentrator that may support a plurality of client transport modems, such as cTM 265, FMS 819 of TMTS 215 usually has more 802.X interfaces than FMS 869 of cTM 265.

The inverse multiplex sublayer of IMS 818 and IMS 868 generally is responsible for multiplexing and inverse multiplexing data streams of FMS 819 and 869 across multiple frequency-division multiplexed (FDM) carriers. The asymmetrical differences in cable transmission networks between one-to-many downstream broadcast and many-to-one upstream transmission generally lead to different techniques for downstream multiplexing than the techniques for upstream multiplexing. In the preferred embodiment of the present invention downstream multiplexing utilizes streams of MPEG (Moving Picture Experts Group) frames on shared frequencies of relatively larger bandwidth allocations, while upstream multiplexing utilizes non-shared frequencies of relatively smaller bandwidth allocations. Even though the upstream and downstream bandwidth allocation techniques of the inverse multiplexing sublayer (IMS) are different, the preferred embodiments of the present invention are still capable of providing symmetrical upstream and downstream data rates (as well as asymmetrical data rates). Furthermore, the inverse multiplexing sublayer (IMS) splits the incoming sequential octets of FMS data flows (i.e., flows of data from and/or to FMS ports) for parallel transmission across a cable transmission network utilizing a plurality of frequency bands in parallel. This parallel transmission of data flows will tend to have lower latency than serial transmission.

The physical coding sublayer (such as PCS 817 and 867) generally is responsible for handling forward error correction (FEC) and quadrature amplitude modulation (QAM) coding and decoding of the information communicated between IMS sublayer peer entities (such as IMS 818 and IMS 868). The signaling medium dependent (SMD) sublayer (such as the SMD peer entities 816 and 866) generally is responsible for communicating the encoded and modulated information from the physical coding sublayer onto a cable transmission network 105 at the proper frequency ranges and in the proper optical and/or electrical carrier waves.

Figure 9:
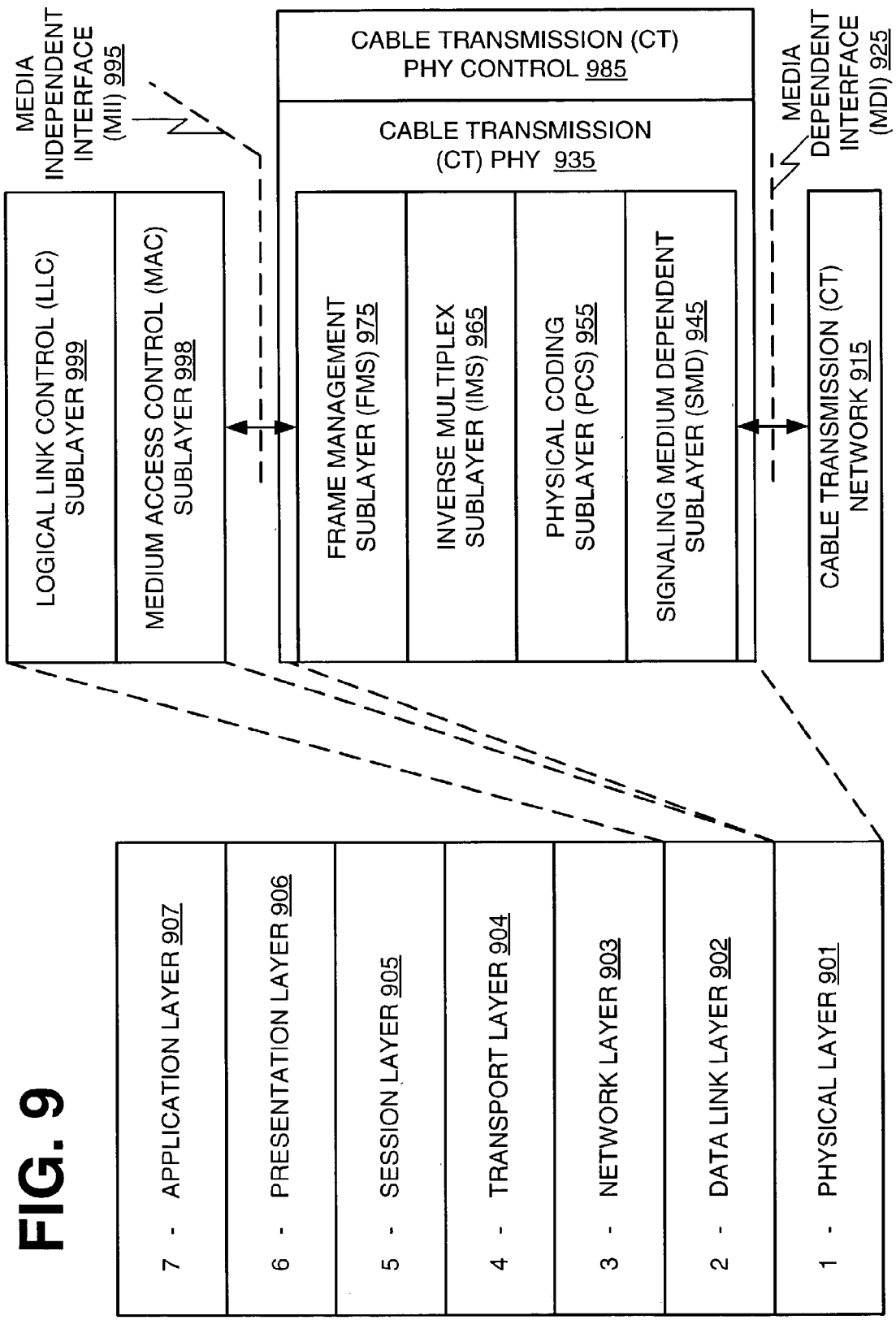
FIG. 9 shows how a cable transmission physical layer fits in the OSI model.

FIG. 9 shows the open systems interconnect (OSI) seven-layer model, which is known to one of skill in the art, as well as the relationship of the OSI model to the physical layer specification of the preferred embodiments of the present invention and to some portions of the IEEE 802.X standards. In OSI terminology corresponding layers (such as the layer 3 Internet Protocol) of two communicating devices (such as IP hosts) are known as peer entities. The OSI model comprises the level 1 physical layer 901, the level 2 data link layer 902, the level 3 network layer 903, the level 4 transport layer 904, the level 5 session layer 905, the level 6 presentation layer 906, and the level 7 application layer 907. The preferred embodiments of the present invention generally operate over communication media that function as cable transmission network 915. Although cable transmission network 915 certainly comprises hybrid fiber-coax (HFC) cable plants, CT network 915 more generally also comprises all coax and all fiber transmission plants. Furthermore, cable transmission network 915 even more generally comprises any communication medium using frequency-division multiplexing (FDM) and/or the optical variation of frequency division multiplexing known as wavelength division multiplexing (WDM).

The cable transmission network 915 communicates information across a media dependent interface (MDI) 925 with cable transmission physical layer 935. FIG. 9 shows that cable transmission physical layer 935 is associated with the physical layer 901 of the OSI model. Similarly to FIG. 8, cable transmission PHY 935 is shown in FIG. 9 with the four sublayers of the signaling medium dependent sublayer (SMD) 945, physical coding sublayer (PCS) 955, inverse multiplex sublayer (IMS) 965, and frame management sublayer (FMS) 975. The SMD 945, PCS 955, IMS 965, and FMS 975 sublayers form a user plane that generally is concerned with communicating user data. In addition, cable transmission PHY control 985 provides functions generally associated with management and/or control of communications through cable transmission physical layer 935 and the corresponding four sublayers (945, 955, 965, and 975).

FIG. 9 further shows how data link layer 902 is divided into medium access control sublayer (MAC) 998 and logical link control sublayer (LLC) 999 that are generally described in the IEEE 802 standards. IEEE 802.3 generally describes the carrier sense multiple access with collision detection (CSMA/CD) medium access control (MAC) protocol, while IEEE 802.2 generally describes the logical link control (LLC) protocol. Cable transmission physical layer 935 generally has a media independent interface (MII) 995 that provides connectivity between FMS 975 and an IEEE 802.3 MAC. Furthermore, one skilled in the art will be aware that the OSI model as well as other communication models are only abstractions that are useful in describing the functionality, behavior, and/or interrelationships among various portions of communication systems and the corresponding protocols. Thus, portions of hardware and/or software of actual networkable devices and the associated protocols may not perfectly match the abstractions of various communication models. Often when multi-layer abstract models of communication systems are mapped onto actual hardware and/or software the dividing line between one layer (or sublayer) and an adjacent layer (or sublayer) becomes somewhat blurred as to which hardware and/or software elements are part of which abstract layer. Furthermore, it is often efficient to used shared portions of hardware and/or software to implement interfaces between the abstract layers. However, the abstract models are useful in describing the characteristics, behavior, and/or functionality of communication systems.

Figure 10:
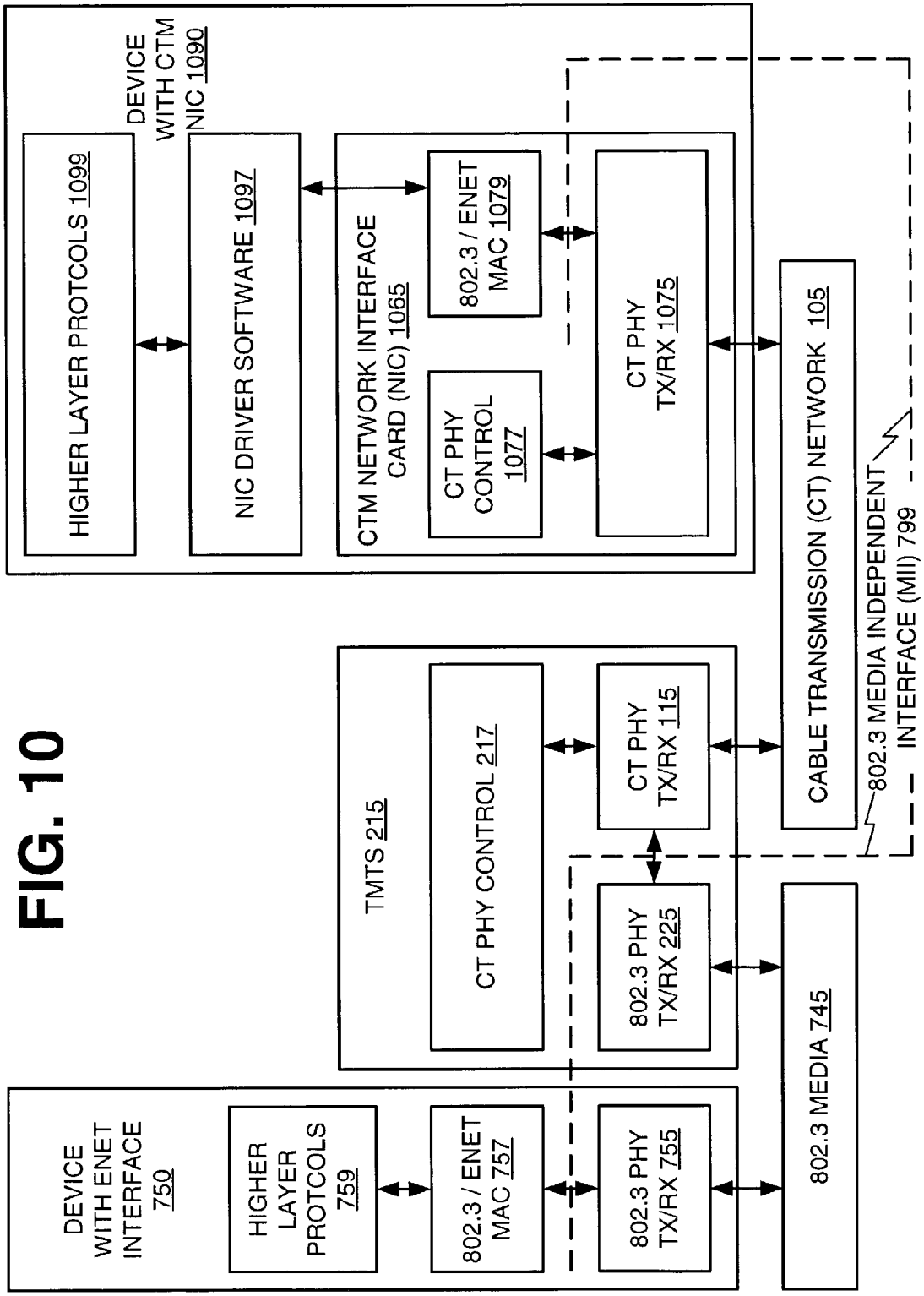
FIG. 10 shows a cable transmission physical layer that is part of a network interface card.

Much like peer entities of OSI protocol layers, there can also be peer entities of protocol sublayers. Thus, corresponding FMS, IMS, PCS, and/or SMD sublayers in communicating devices could be considered peer entities. Given this peer entity relationship, one of many alternative embodiments of the present invention is shown in FIG. 10. TMTS 215 and device with ethernet interface 750 are shown again in FIG. 10 but this time TMTS 215 transfers information with a client transport modem network interface card (NIC) 1065. CTM NIC 1065 comprises a CT physical layer transceiver (TX/RX) 1075 that is a peer entity of CT physical layer transceiver 115 of TMTS 215. Also, cTM NIC 1065 further comprises CT physical layer control 1077 that is a peer entity of CT physical layer control 217 of TMTS 215. Also, cTM NIC 1065 comprises 802.3/ethernet MAC 1079 that is a peer entity of 802.3/ethernet MAC 757 in device with ethernet interface 750.

Figure 11:
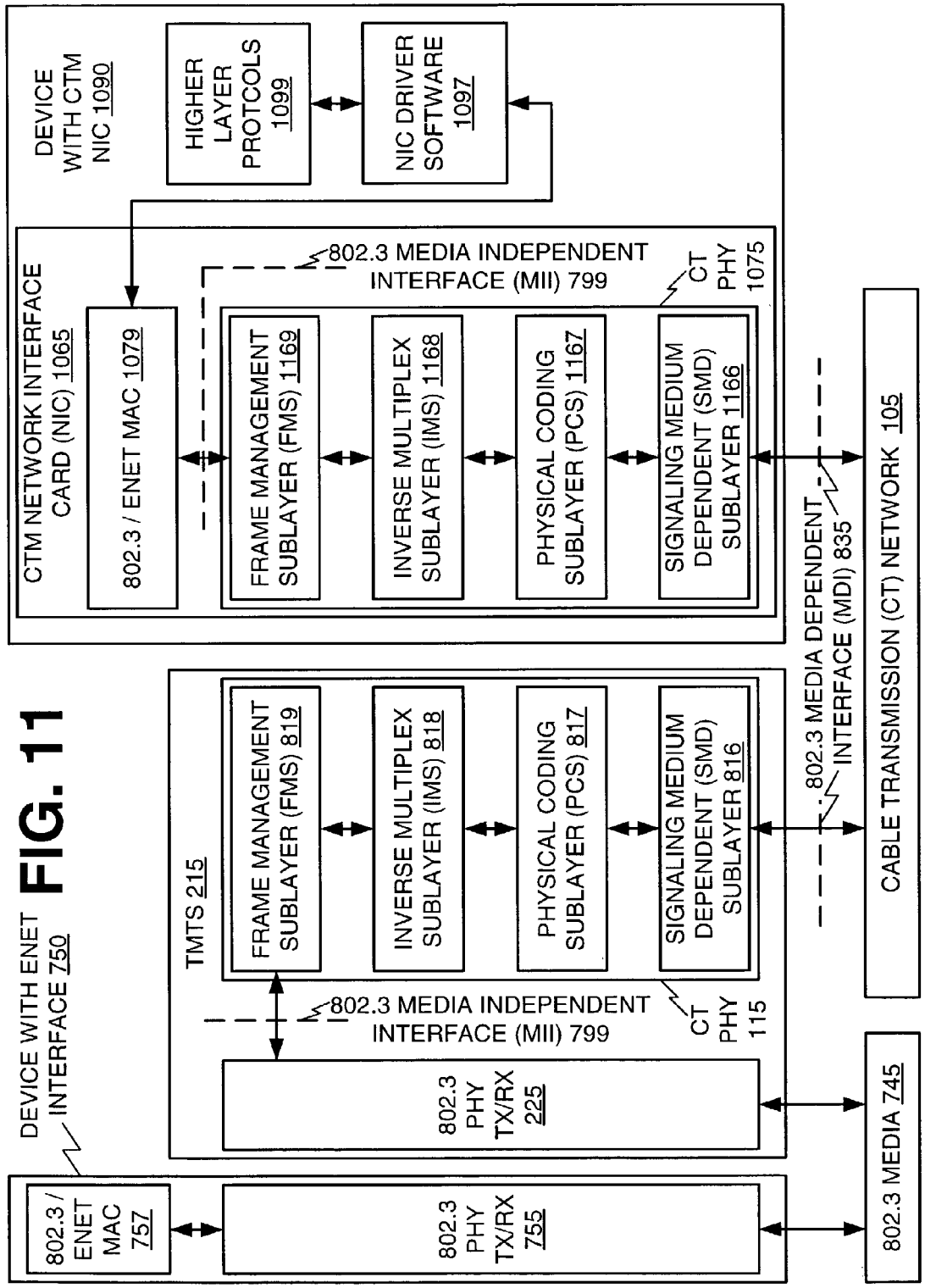
FIG. 11 shows an expansion of the cable transmission physical layer expanded into four sublayers in a network interface card.

Client transport modem NIC 1065 is shown within device with cTM NIC 1090, which further contains NIC driver software 1097 and higher layer protocols 1099. If device with cTM NIC 1090 is a personal computer, then NIC driver software 1097 might conform to one of the driver specifications, such as but not limited to, NDIS (Network Driver Interface Specification), ODI (Open Data-Link Interface), and/or the Clarkson packet drivers. Usually a network interface card plugs into a bus card slot and then uses driver software to interface with higher layer protocols. One skilled in the art will be aware that the cable transmission physical layer of the preferred embodiment of the present invention could be implemented in any type of networkable device in addition to PCs and workstations. Some non-limiting examples of networkable devices include computers, gateways, routers, switches, bridges, and repeaters. Sometimes these devices have expansion card buses that could be used to interface to logic implementing the cable transmission physical layer 1075 of the preferred embodiments of the present invention. Alternatively, the preferred embodiments of the present invention could be directly integrated into the base units of networkable devices. FIG. 11 further expands cable transmission physical layer 1075 (and the associated physical layer transceiver) into SMD sublayer 1166, PCS sublayer 1167, IMS sublayer 1168, and frame management sublayer 1169.

Frame Management Sublayer (FMS) Data Flows

Figure 12:
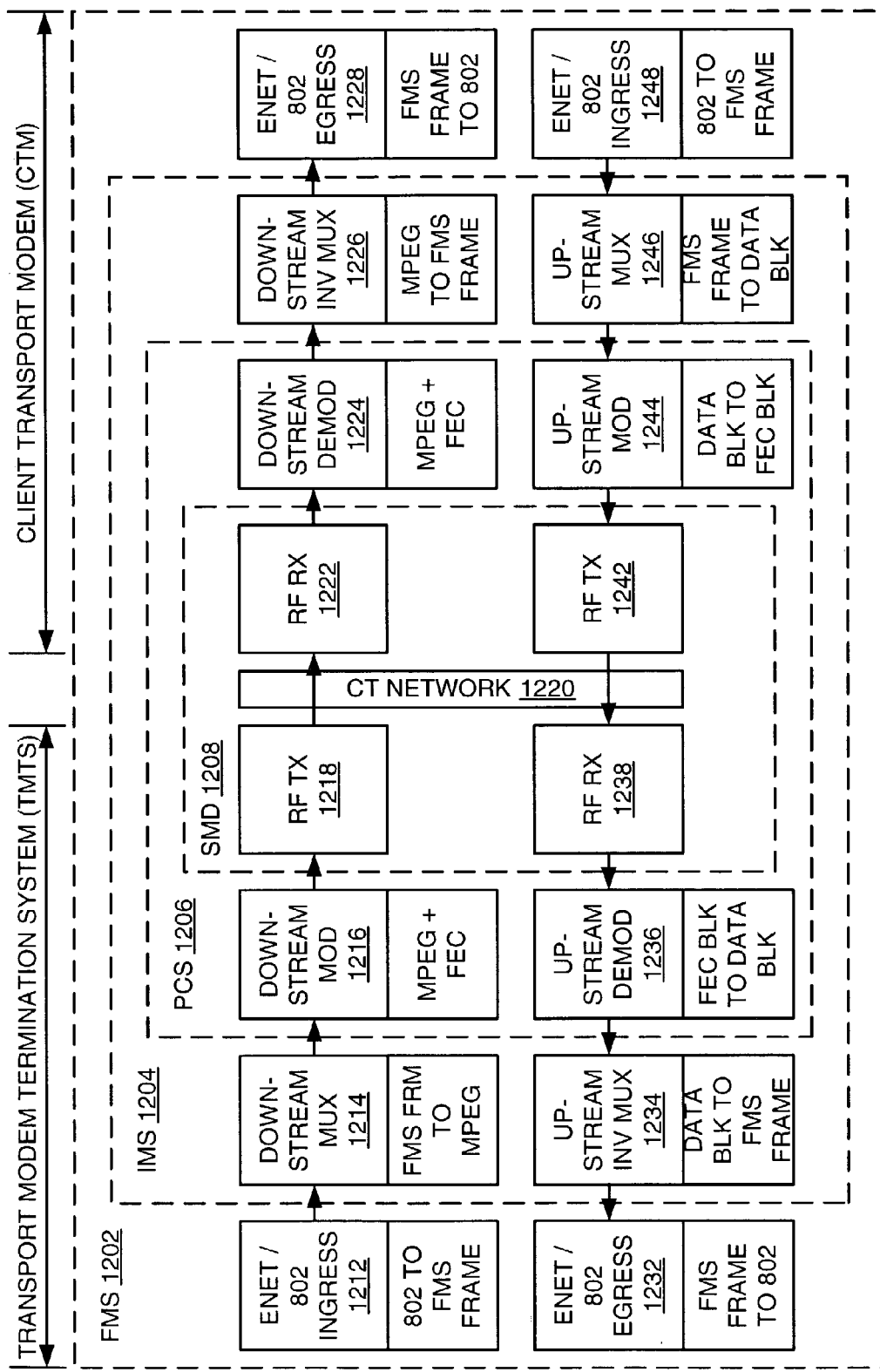
FIG. 12 shows a reference diagram of the downstream and upstream functions of the four sublayers.

FIG. 12 shows a system diagram using the physical layer of the preferred embodiment of the present invention for communication between a transport modem termination system and a client transport. The four sublayers (FMS 1202, IMS 1204, PCS 1206, and SMD 1208) are shown within dashed boxes. The upper portion of FIG. 12 shows downstream communication from a TMTS to a cTM, while the lower portion of FIG. 12 shows upstream communication from a cTM to a TMTS.

In the downstream communication ethernet/802 packets ingress into a cable transmission physical layer of the preferred embodiments of the present invention at ethernet/802 ingress 1212, which performs a conversion from ethernet/802 packets to FMS frames. FMS frames are then communicated to downstream multiplexer 1214 which converts the octets in FMS frames to octets in MPEG frames. MPEG headers and MPEG forward error correction (FEC) coding, which generally is a Reed-Solomon code, generally are added for communication to downstream modulator(s) 1216. The output of downstream modulator(s) 1216 is passed through radio frequency (RF) transmitter (TX) 1218, which generates the electrical and/or optical signals in the proper frequencies. These signals are communicated over cable transmitter network 1220 into RF receiver (RX) 1222. The incoming information in the electrical and/or optical signals generally is recovered into the MPEG frames in downstream demodulator 1224. The downstream MPEG frames are then passed to downstream inverse multiplexer 1226, which extracts the proper octets from MPEG frames to recover frame management sublayer (FMS) frames. The FMS frames then are converted back to ethernet/802 frames and complete downstream conveyance at ethernet/802 egress 1228.

Upstream communication of ethernet/802 packets ingress into a physical layer of the preferred embodiments of the present invention at ethernet/802 ingress 1248 which converts the ethernet/802 frames into frame management sublayer (FMS) frames. The FMS frames are converted into blocks of data in preparation for forward error correction coding in upstream multiplexer 1246. These upstream blocks of data may carry the octets of ethernet/802 frames over multiple carrier frequencies. In the preferred embodiment of the present invention a turbo product code forward error correction technique is utilized on the upstream blocks of data. One skilled in the art will be aware of the techniques of turbo product codes as well as alternative coding techniques for error detection and/or forward error correction. Upstream modulator 1244 modulates the information of the forward error correction blocks and passes the resulting modulating information to RF transmitter 1242, which generates the electrical and/or optical signals in the proper frequency ranges for communication over cable transmission network 1220. The upstream electrical and/or optical signals are received in RF receiver 1238. Upstream demodulator 1236 then handles recovering the forward error correction blocks of data. Also, upstream demodulator 1236 converts the forward error correction blocks back to the original blocks of data that were prepared in upstream multiplexer 1246. The octets of the data blocks are placed back into the proper FMS frames in upstream inverse multiplexer 1234. These FMS frames are then further converted back to ethernet/802 frames and leave the physical layer at ethernet/802 egress 1232.

Figure 13:
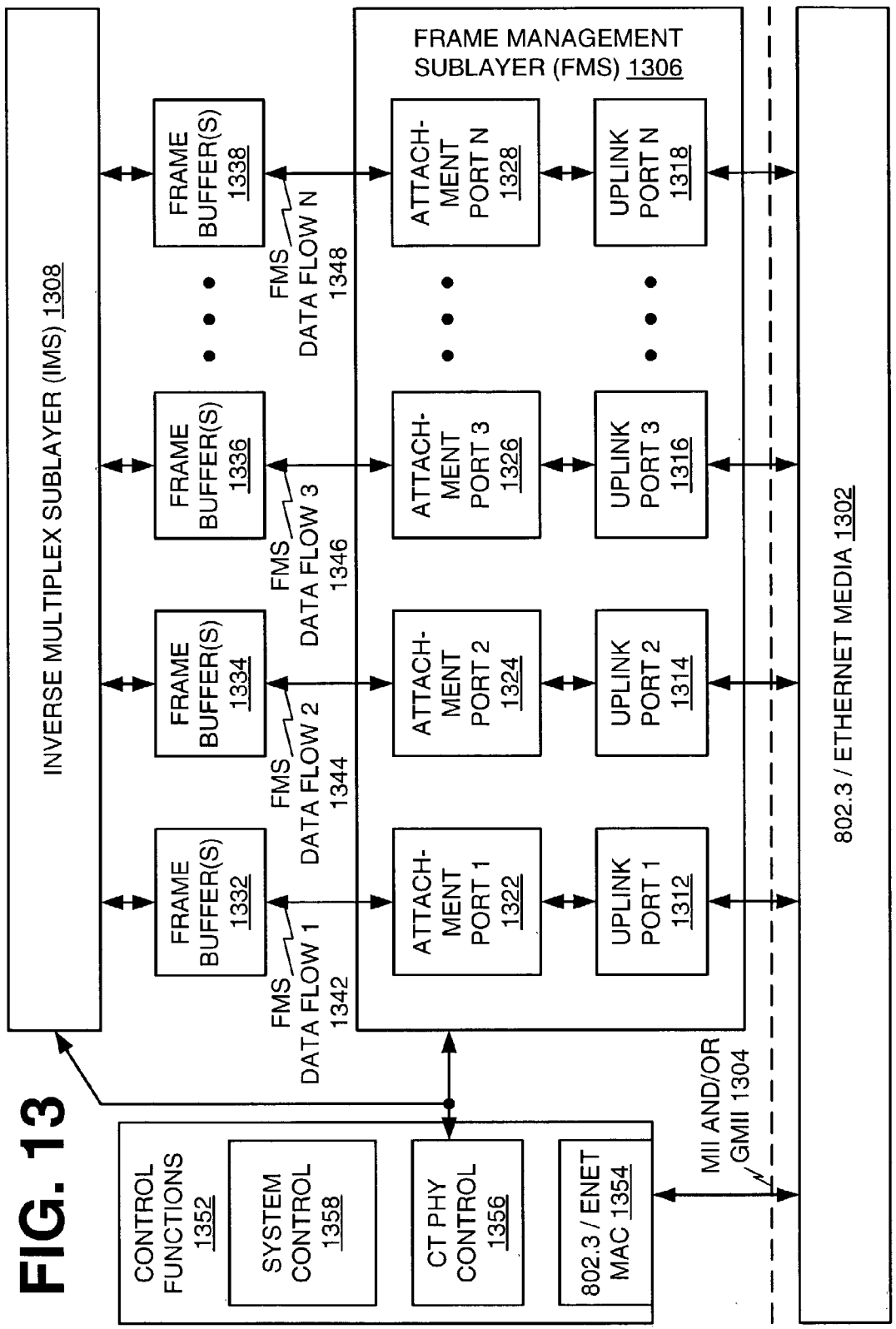
FIG. 13 shows the relationship among 802.3/ethernet media, the frame management sublayer, and the inverse multiplex sublayer.

FIG. 13 shows a more detailed diagram of the frame management sublayer (FMS). In FIG. 13 802.3/ethernet media 1302 is connected across media independent interface (MII) and/or gigabit media independent interface (GMII) 1304 to frame management sublayer (FMS) 1306, which is further connected to inverse multiplex sublayer (IMS) 1308. The connections of FMS 1306 to 802.3/ethernet media 1302 are known as uplink ports 1 through N (1312, 1314, 1316, and 1318). While the connections of FMS 1306 leading to IMS 1308 generally are known as attachment ports 1 through N (1322, 1324, 1326, and 1328). Each attachment port (1322, 1324, 1326, and 1328) is connected to its own set of at least one frame buffer (1332, 1334, 1336, and 1338, respectively) that provides at least part of the interface between FMS 1306 and IMS 1308. Frame buffer(s) (1332, 1334, 1336, and 1338) provide bi-directional communication of FMS data flows (1342, 1344, 1346, and 1348, respectively) between FMS 1306 and IMS 1308. In general, each active FMS data flow of a frame management sublayer in one device is associated one-to-one with an active data flow of a peer entity frame management sublayer in another device. Generally, each FMS data flow provides bi-directional connection-oriented communication between frame management sublayer peer entities in the associated devices. Thus, an FMS data flow generally provides bi-directional point-to-point connectivity between a pair of FMS peer entities.

FIG. 13 further shows various control functions 1352, which comprise 802.3/ethernet medium access control (MAC) interface 1354, cable transmission physical layer control 1356, and system control 1358. CT PHY 1356 generally handles control of the cable transmission physical layer, which includes the sublayers of FMS 1306 and IMS 1308 that are shown in FIG. 13. System control 1358 includes many of the network management, software download, and/or configuration setting file download and/or upload capabilities that generally utilize protocols from the TCP/IP suite for administering network devices.

Basically the frame management layer (FMS) 1306 is responsible for framing ethernet data into the proper frames for communications using the preferred embodiments of the present invention. Furthermore, control flows are communicated between cable transmission physical control 1356 and a corresponding peer entity cable transmission physical control in another device. These control flows are not part of the user data, and thus are not communicated through FMS 1306 to the uplink ports (1312, 1314, 1316, and 1318) that carry information to 802.3/ethernet media 1302. The control frames of control flows may be multiplexed with data frames by utilizing different start frame delimiters to indicate ethernet data frames and control frames.

FIG. 14 shows a general format for an 802.3/ethernet frame as is known by one of ordinary skill in the art. In general, an ethernet frame comprises a preamble 1402 that is used to synchronize the transmitter and receiver in 802.3/ethernet media. After the preamble, start frame delimiter 1404 is used to indicate the beginning of the 802.3/ethernet frame. In IEEE 802.3 and ethernet, this start frame delimiter is the one octet value of 0xAB (in hexadecimal). Following the start frame delimiter (SFD) 1402, 802.3/ethernet frames generally have a header 1406 that includes six octets of destination address, six octets of source address, and other information depending on whether the frame type is IEEE 802.3 raw, ethernet_II, IEEE 802.3 with an 802.2 LLC, or IEEE 802.3 with an 802.2 LLC and a Sub-Network Access Protocol (SNAP). In addition, one skilled in the art will be aware of various techniques for tagging or labeling ethernet/802.3 frames, such as but not limited to, Multi-Protocol Label Switching (MPLS), Resilient Packet Ring (RPR), and/or Virtual LAN (VLAN). After the labeling or tagging information and the 802.3/ethernet header 1406, data 1408 generally is carried in a variable length payload. At the end of 802.3/ethernet packets, a frame check sum (FCS) 1410 error detecting code (usually using a cyclic redundancy check (CRC)) is computed.

To allow all the ethernet/802.3 frame types and various labeling and/or tagging protocols to be transparently communicated using the preferred embodiments of the present invention, the start frame delimiter is used as a field for multiplexing control frames with ethernet/802.3 data frames. Normally, ethernet/802.3 frames do not use the start frame delimiter (SFD) field 1404 for multiplexing because the SFD octet is responsible for providing proper frame alignment in ethernet/802.3 networks. FIG. 15 shows the frame format for control frames in the preferred embodiment of the present invention. In some ways, control frames are similar to ethernet II and 802.3 raw frames with a preamble 1502, a start frame delimiter (SFD) 1504, a six octet destination address 1505, a six octet source address 1506, a two octet length and/or type field 1507, a variable length payload 1508 for carrying control information, and a four octet frame check sequence (FCS) or cyclic redundancy code (CRC) 1510.

However, in comparing the prior art ethernet/802.3 data frame of FIG. 14 with the control frame of FIG. 15 utilized in communication systems using the preferred embodiments of the present invention, the start frame delimiter fields 1404 and 1504 are different. For ethernet/802.3 data frames in FIG. 14, the start frame delimiter has a value of 0xAB in hexadecimal, while for control frames in FIG. 15 the start frame delimiter has a value of 0xAE in hexadecimal. This difference in the octet of the start frame delimiter (SFD) allows data frames and control frames to be multiplexed together without affecting the transparency of the communication system to all types of ethernet/802.3 frame variations. Control frames transmitted by cable transmission physical control (such as 1356) are multiplexed with the data of an FMS data flow (such as 1342, 1344, 1346, and/or 1348) that is destined for the same location as the data of that FMS data flow.

Figure 16:
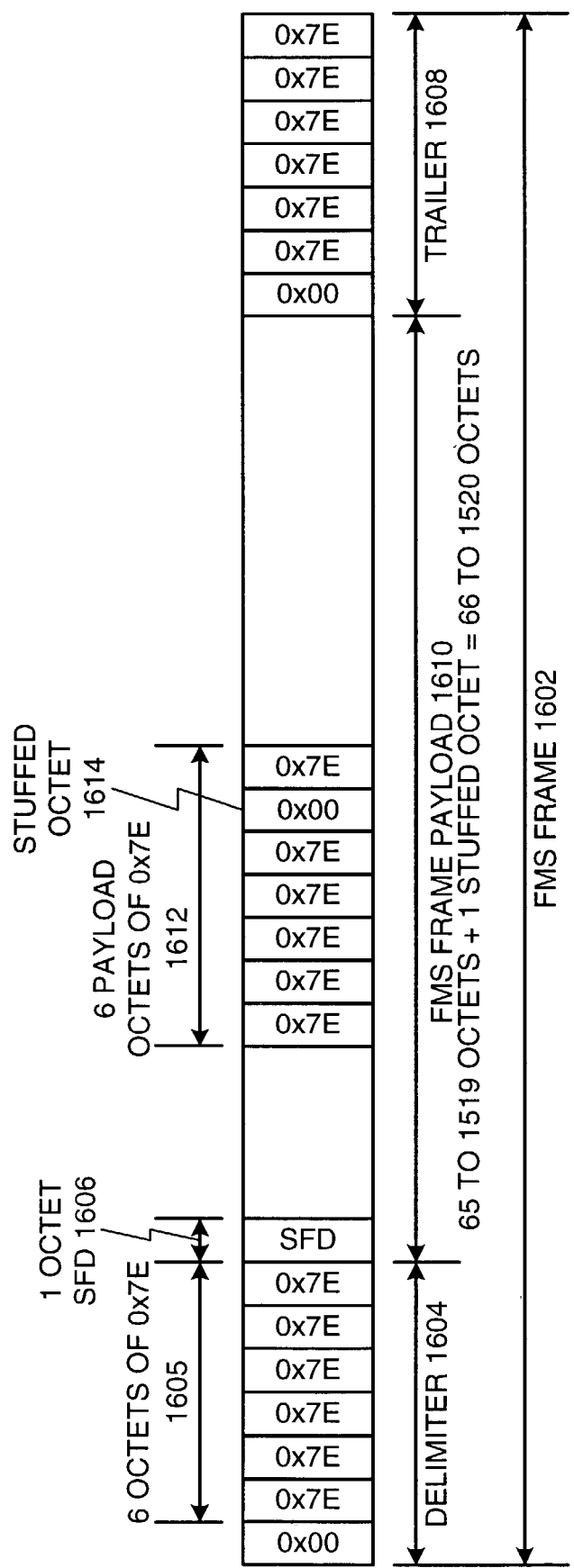
FIG. 16 shows the frame management sublayer (FMS) frame format.

In addition, FIG. 16 shows the FMS frames 1602 communicated between FMS peer entities in a system utilizing the preferred embodiments of the present invention. In general, because of the one-to-one or point-to-point, non-shared relationship of connection-oriented communications between active FMS attachment ports and associated active peer entity FMS attachment ports, bits may be continuously transmitted to maintain synchronization. In the absence of any data frames or control frames to transmit, the system continuously communicates an octet of 0x7E hexadecimal, which functions similarly to the continuous communication of HDLC (High-level Data-Link Control) flags in many point-to-point synchronous connections. Furthermore, as shown in FIG. 16, the delimiter 1604 for an FMS frame 1602 is one octet of 0x00 followed by six octets of 0x7E hexadecimal 1605. The frame delimiter of an FMS frame 1602 is followed by a one octet start frame delimiter (SFD) 1606 that contains the value 0xAB hexadecimal for ethernet/802.3 data frames and that contains the value 0xAE hexadecimal for control frames as shown in FIG. 15. FMS frame 1602 generally has a frame trailer 1608 and a payload 1610. When two FMS frames are transmitted immediately after each other, only one octet of 0x00 and six octets of 0x7E 1605 are needed between the two FMS frames. In other words, there is no need to transmit both a trailer 1608 for a first FMS frame 1602 and a starting delimiter 1604 for a second FMS frame 1602 when the second FMS frame is transmitted immediately after the first FMS frame. Thus, when a second FMS frame is transmitted immediately after a first FMS frame, either the trailer 1608 of the first FMS frame or the starting delimiter 1604 of the second FMS frame may be omitted.

In general, the payload 1610 of an FMS frame 1602 generally may carry an ethernet/802.3 frame or a control frame beginning with the SFD octets of 0xAB and 0xAE, respectively, and continuing through the frame check sequence (FCS) 1410 or 1510. Because one hexadecimal octet (or a consecutive sequence of a plurality of hexadecimal octets) with the value of 0x7E may appear in ethernet/802.3 and/or control frames, an octet stuffing technique is used to ensure that the information in an FMS frame payload 1610 is communicated transparently and that the FMS frame 1602 boundaries can be detected by a starting FMS delimiter 1604 and an FMS trailer 1608 (i.e., a trailing FMS delimiter). The FMS sublayer handles this process of framing ethernet and control frames using the FMS frame delimiters of one octet of 0x00 followed by six octets of 0x7E. In addition, byte or octet stuffing allows a payload containing octet or byte values that might cause misinterpretations of starting delimiter 1604 or trailing delimiter 1608 to be communicated transparently. Various techniques for byte, octet, and/or character stuffing in byte-oriented protocols as well as bit stuffing in bit-oriented protocols are known by one of ordinary skill in the art, and one technique is described in Andrew S. Tanenbaum's Second and Third Editions of "Computer Networks", which are both incorporated by reference in their entirety herein. Furthermore, the HDLC formatted frames communicated using an asynchronous, byte- or octet-oriented version of the Point-to-Point Protocol (PPP) generally use another octet-stuffing procedure to maintain transparency. This, octet stuffing procedure is described in Internet Request For Comments (RFC) 1662, which is entitled "PPP in HDLC Framing" and is incorporated in its entirety by reference herein.

In general, octet stuffing involves adding additional octets to a frame whenever a pattern in the frame might cause an ambiguity in a receiver trying to determine frame boundaries. For example, six payload octets of 0x7E at 1612 in FIG. 16 could have an extra octet of 0x00 added as a stuffed octet 1614. The additional stuffed octets generally increase the size of the payload. One or more stuffed octets 1614 may be added to a payload to handle each situation where a receiver might have had some ambiguity in determining correct frame boundaries based on the patterns in the payload data matching or overlapping with the bit patterns used to specify frame boundaries.

Figure 17:
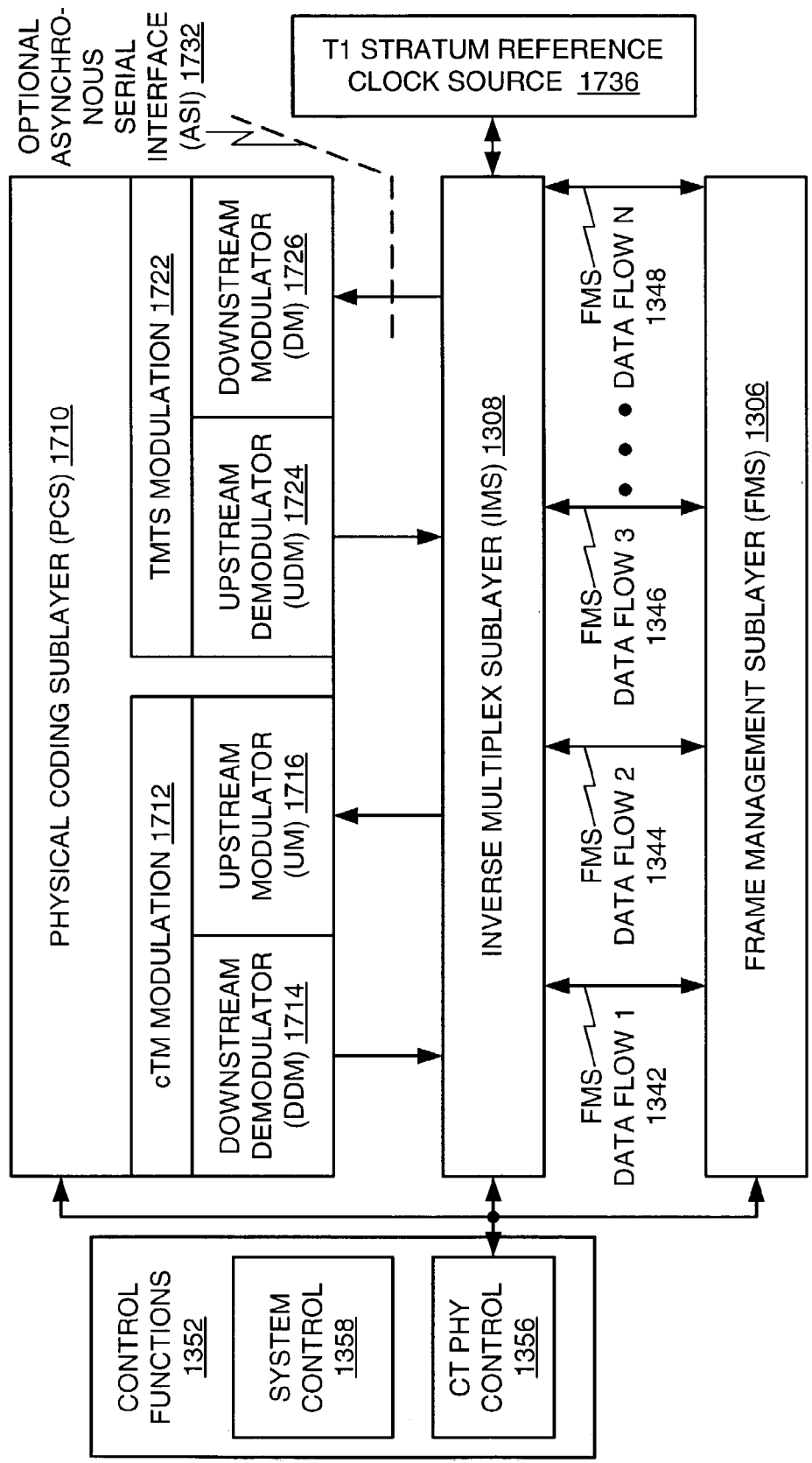
FIG. 17 shows the relationship among the frame management sublayer (FMS), the inverse multiplex sublayer (IMS), and the physical coding sublayer (PCS).

FIG. 17 shows the relationships of inverse multiplex sublayer 1308 to frame management sublayer 1306 and physical coding sublayer 1710. Several of the items from FIG. 13 have been repeated including control functions 1352, systems control 1358, CT PHY control 1356 as well as FMS data flows 1 through N (1342, 1344, 1346, and 1348). The frame buffers between FMS 1306 and IMS 1308 have been omitted for simplicity of the discussion of FIG. 17. Physical coding sublayer 1710 varies depending on whether client transport modem modulation 1712 or transport modem termination system modulation 1722 is being used. Client transport modem modulation comprises a downstream demodulator 1714 that provides input into IMS 1308 and further comprises upstream modulator 1716 that receives the output of an inverse multiplex sublayer 1308. In contrast to the cTM modulation 1712, the TMTS modulation 1722 comprises upstream demodulator 1724 that provides input to an IMS 1308 and further comprises downstream modulator 1726 that receives input from IMS 1308. The IMS 1308 performs different multiplexing/demultiplexing functions depending on whether the direction of communication is upstream or downstream. As discussed previously the downstream modulator 1726 of a transport modem termination system may include integrated QAM modulators. Alternatively, the downstream MPEG packets and/or frames may be communicated over an optional asynchronous serial interface (ASI) 1732 to an external QAM modulator. One skilled in the art is aware of many mechanisms and devices that are commonly used in communicating MPEG frames over ASI interfaces to QAM modulators. Furthermore, because the downstream communication of IMS 1308 utilizes MPEG streams that can carry clock information, IMS 1308 is connected to a T1 stratum reference clock source 1736 or another clock source commonly used for various N×64 and/or N×56 digital telephone company services that may involve plesiochronous digital hierarchy (PDH) or synchronous digital hierarchy (SDH) multiplexing. On the TMTS-side, T1 stratum reference clock source 1736 (or another clock source as would be known by someone of ordinary skill in the art) generally is an input to IMS 1308 in a TMTS. In contrast on the cTM-side, T1 stratum reference clock source 1736 (or another clock source as would be known by someone of ordinary skill in the art) generally is an output that is driven by the IMS 1308 in a cTM.

MPEG Packets

Figure 18:
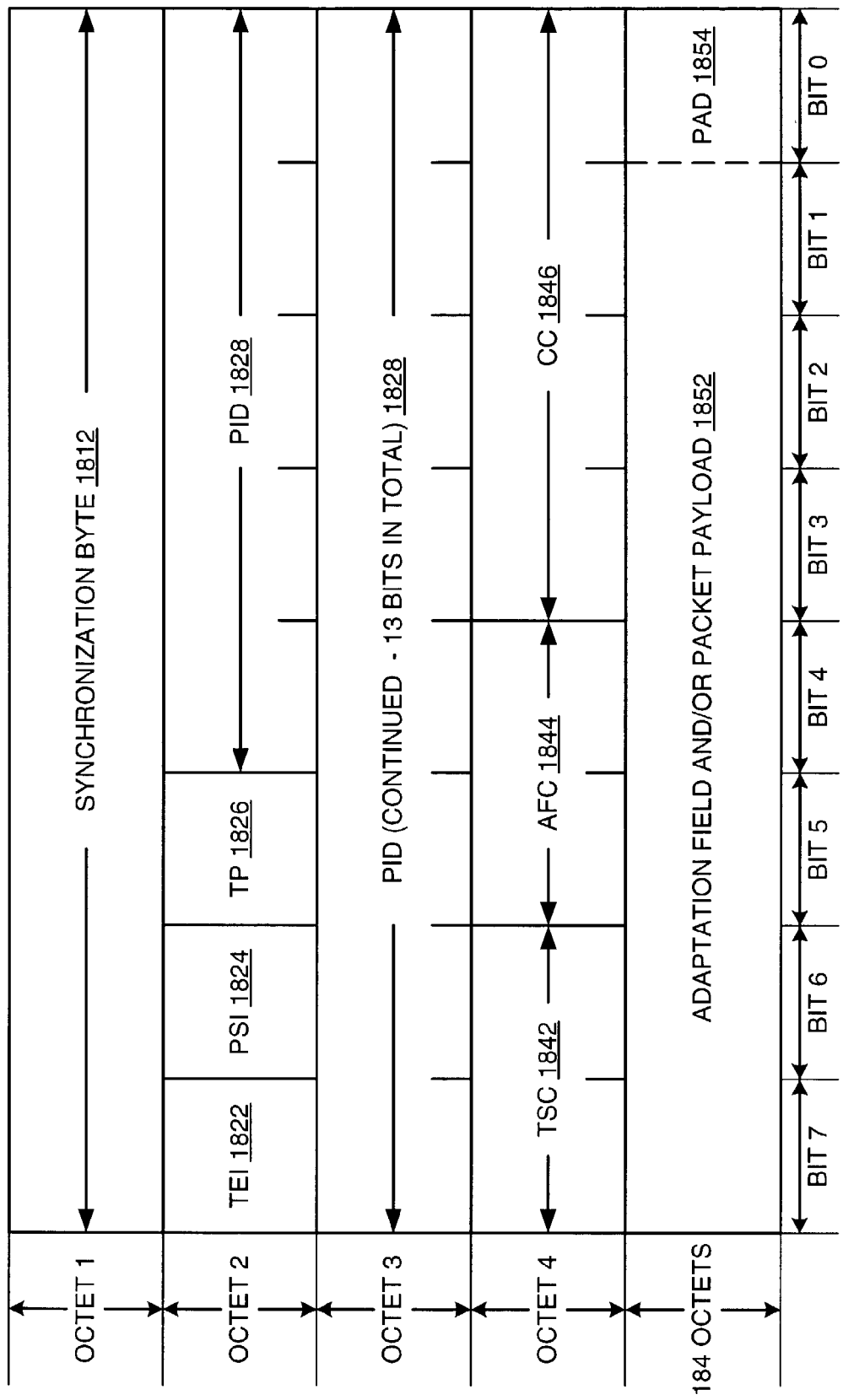
FIG. 18 shows the MPEG frame format.

FIG. 18 shows the layout of an MPEG frame that is known to one of skill in the art and is described in ITU-T H.222.0 entitled "Audiovisual and Multimedia Systems" and ITU-T J.83 entitled "Transmission of Television, Sound Program and Other Multimedia Signals", which are both incorporated by reference in their entirety herein. Synchronization Byte (SB) 1812 contains the eight bit value 0x47 hexadecimal. The transport error indicator (TEI) 1822 is set in a communication system using the preferred embodiments of the present invention to indicate frame decoding errors of MPEG packets to an 802.3 MII interface connected to a frame management sublayer. The cable transmission physical layer (including the four sublayers of FMS, IMS, PCS, and SMD) in a communication system utilizing the preferred embodiments of the present invention generally does not utilize payload start indicator (PSI) 1824, transport priority (TP) bit 1826, and the transport scrambling control (TSC) bits 1842.

The cable transmission physical (CT PHY) layer of a communication system utilizing the preferred embodiments of the present invention does utilize the thirteen bit packet identifier (PID) field to specify various streams of MPEG packets. In general, the PID numbers 0x0000 through 0x000F are not used to carry the cable transmission physical (CT PHY) layer communications in a system operating with the preferred embodiments of the present invention. These PIDs of 0x0000 through 0x0000F are utilized for other MPEG functions such as but not, limited to, program association table (PAT), conditional access table (CAT), and transport stream description table that are known to one of skill in the art. In addition, the preferred embodiments of the present invention do not utilize the PIDs of 0x1FFF, which indicates the null packet, and 0x1FFE, which indicates DOCSIS downstream communications. PIDs in the range of 0x0010 through 0x0FFF are utilized to carry the cable transmission physical layer (CT PHY) information in a communication system using the preferred embodiments of the present invention. The PIDs are allocated for carrying the information of FMS data flows by starting at 0x1FFD and working downward.

The four bits of the continuity counter (CC) 1846 increment sequentially for each packet that belongs to the same PID. The IMS downstream communication of MPEG packets are generated contemporaneously in parallel with the same value for the continuity counter (CC) 1846 across all the parallel packets. The continuity counter 1846 is incremented in unison across all the MPEG stream to help ensure that inverse multiplexing operations across multiple MPEG streams are performed utilizing the correctly aligned set of packet payloads.

The two bits of the adaptation field control (AFC) 1844 specifies whether the payload contains a packet payload only, an adaptation field only, or a packet payload and an adaptation field. The 184 octets of an MPEG packet or frame after the four octet header may contain an adaptation field and/or a packet payload 1852, and is padded to the fixed size of 184 octets with pad 1854. In general, the preferred embodiments of the present invention do not generate MPEG packets containing both adaptation fields and other payload information. However, one skilled in the art will be aware that other implementations are possible using various combinations of adaptation fields and payload information in MPEG packets.

Figure 19:
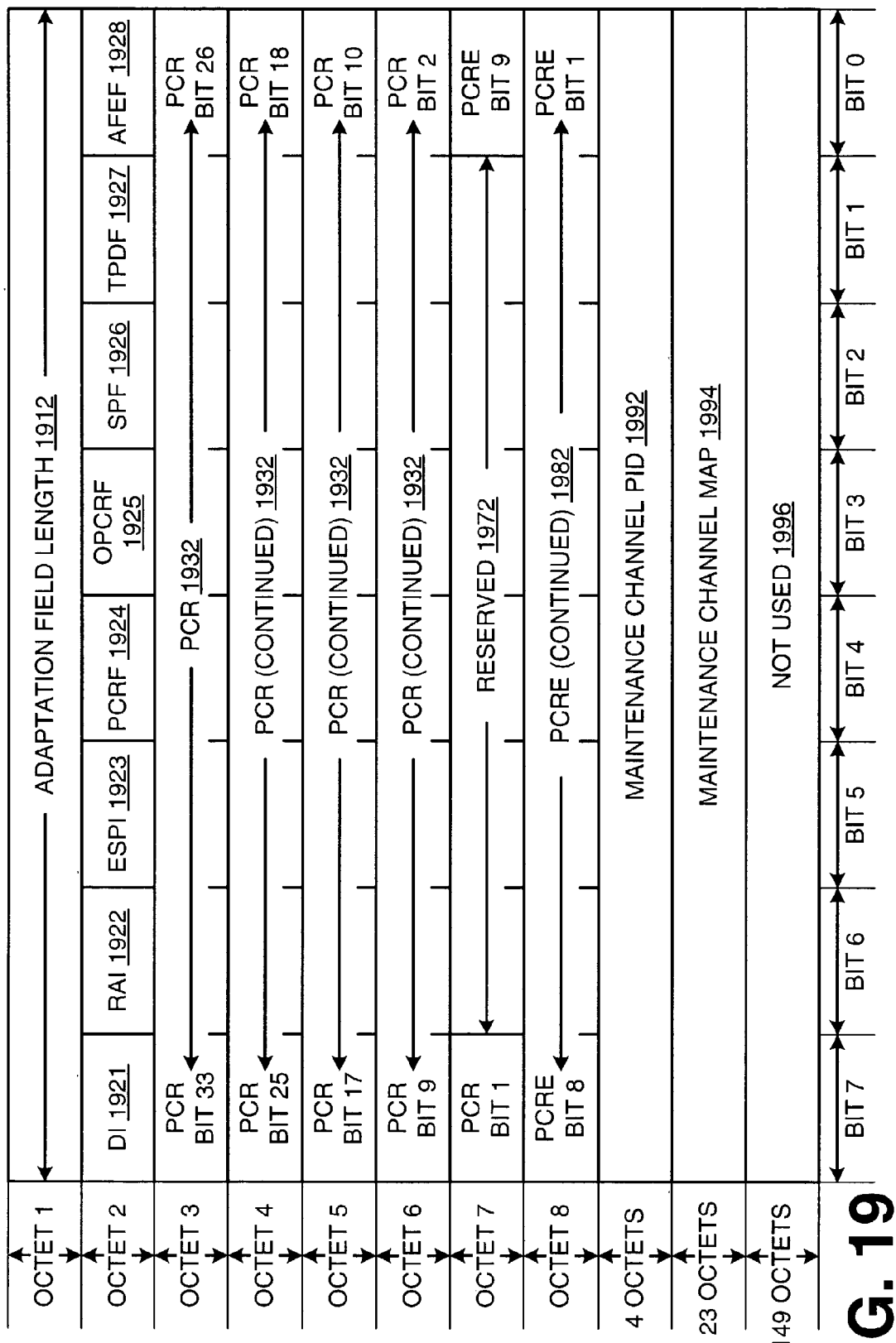
FIG. 19 shows the MPEG adaptation field format.

FIG. 19 further shows an MPEG adaptation field that has been slightly modified from the standard MPEG adaptation field known to one of ordinary skill in the art. The cable transmission physical layer (CT PHY) of a communication system using the preferred embodiments of the present invention generally does not utilize the MPEG adaptation field bits of the discontinuity indicator (DI) 1921, the random access indicator (RAI) 1922, the elementary stream priority indicator (ESPI) 1923, the original program clock reference flag (OPCRF) 1925, the splice point flag (SPF) 1926, the transport private data flag (TPDF) 1927, and the adaptation field extension flag (AFEF) 1928.

The adaptation field length 1912 comprises eight bits that specify the number of octets in an adaptation field after the adaptation field length itself. In the preferred embodiments of the present invention, if an MPEG packet includes an adaptation field, the adaptation field length (AFL) 1912 may range from 0 to 182 octets (with the count starting at the first octet after the AFL octet 1912). The MPEG packets generated by the preferred embodiments of the present invention that carry an adaptation field generally have the program clock reference flag (PCRF) set to 1 to indicate that a program clock reference is carried in the adaptation field. The thirty-three bit program clock reference (PCR) 1932 and the nine bit program clock reference extension (PCRE) 1982 are concatenated into a forty-two bit counter with the PCRE being the least significant bits of the counter. The forty-two bit counter generally is used to indicate the intended time of arrival of the octet containing the last bit of the program clock reference (PCR) at the input to an inverse multiplex sublayer (IMS) of a client transport modem (cTM). Also, the reserved bits 1972 are not utilized in the preferred embodiments of the present invention.

The maintenance channel PID (MC PID) 1992 is used to allow a client transport modem (cTM) to startup and establish communications with a transport modem termination system (TMTS) to begin a registration process. Initially, the cTM listens to at least one low bandwidth maintenance channel established by the TMTS. The TMTS continuously broadcasts maintenance-oriented information on at least one low bandwidth maintenance channel that is specified by at least one MC PID 1992. The maintenance information includes multiplexing maps as well as other registration information. The client transport modem determines the maintenance channel PID 1992 by listening to downstream MPEG packets containing the adaptation field. Based on the value of the MC PID 1992, the client transport modem will know which downstream MPEG packets contain maintenance channel information. Furthermore, the maintenance channel map (MC-MAP) 1994 comprises twenty-three octets or 23×8=184 bits that specify the octets in the downstream MPEG packets with a PID equal to MC-PID 1992. Each bit in the MC-MAP represents one octet in the 184 octet MPEG payload of the MPEG packets with a PID value equal to MC-PID. This map of bits (MC-MAP) and the PID value (MC-PID) allow a client transport modem to select and inverse multiplex through the IMS sublayer the information of the low bandwidth downstream maintenance channel.

Network Clocking

Although most of the description of the preferred embodiments of the present invention has related to communication of ethernet/802.3 frames between cable transmission physical (CT PHY) layer peer entities, the preferred embodiments of the present invention also allow communication of circuit emulation services (CES) that generally are associated with the N×56 and N×64 interfaces of telephone company service providers. Despite the increasing deployment of packetized voice connectivity, many communication systems still utilize these various N×56 and N×64 services and will continue to do so for the foreseeable future. Thus, offering a T1 or other type of N×56/64 interface allows customers to easily connect their existing voice networking equipment to a client transport modem. This allows the preferred embodiments of the present invention to support remote offices with packetized service of ethernet for data as well as circuit emulation service for legacy voice applications.

However, most customer oriented N×56 and N×64 equipment such as, but not limited to, a PBX (private branch exchange) with a T1 interface usually expects the T1 line from the service provider to supply the necessary network clocking. To be able to replace current T1 services of a customer, the preferred embodiments of the present invention generally should also be able to supply the necessary network clocking to customer premises equipment (CPE) such as a PBX. Because more accurate clocks such as atomic clocks are more expensive, the more expensive central office and/or service provider equipment (such as a central office switch or exchange) generally has a more accurate clock than the less expensive customer premises equipment (such as a private branch exchange). Thus, equipment primarily designed for use at a customer premises as opposed to in a service provider network generally is designed to use the clock derived from the clock delivered over service provider transmission lines or loops. One skilled in the art will be aware that these network clocking issues apply to all networking equipment and not just the limited example of PBXs and central office switches. These clocking issues for 8 kHz clocks are particularly relevant for equipment designed to utilize N×56/64 services (i.e., services based on multiples of a DS0).

Figure 20:
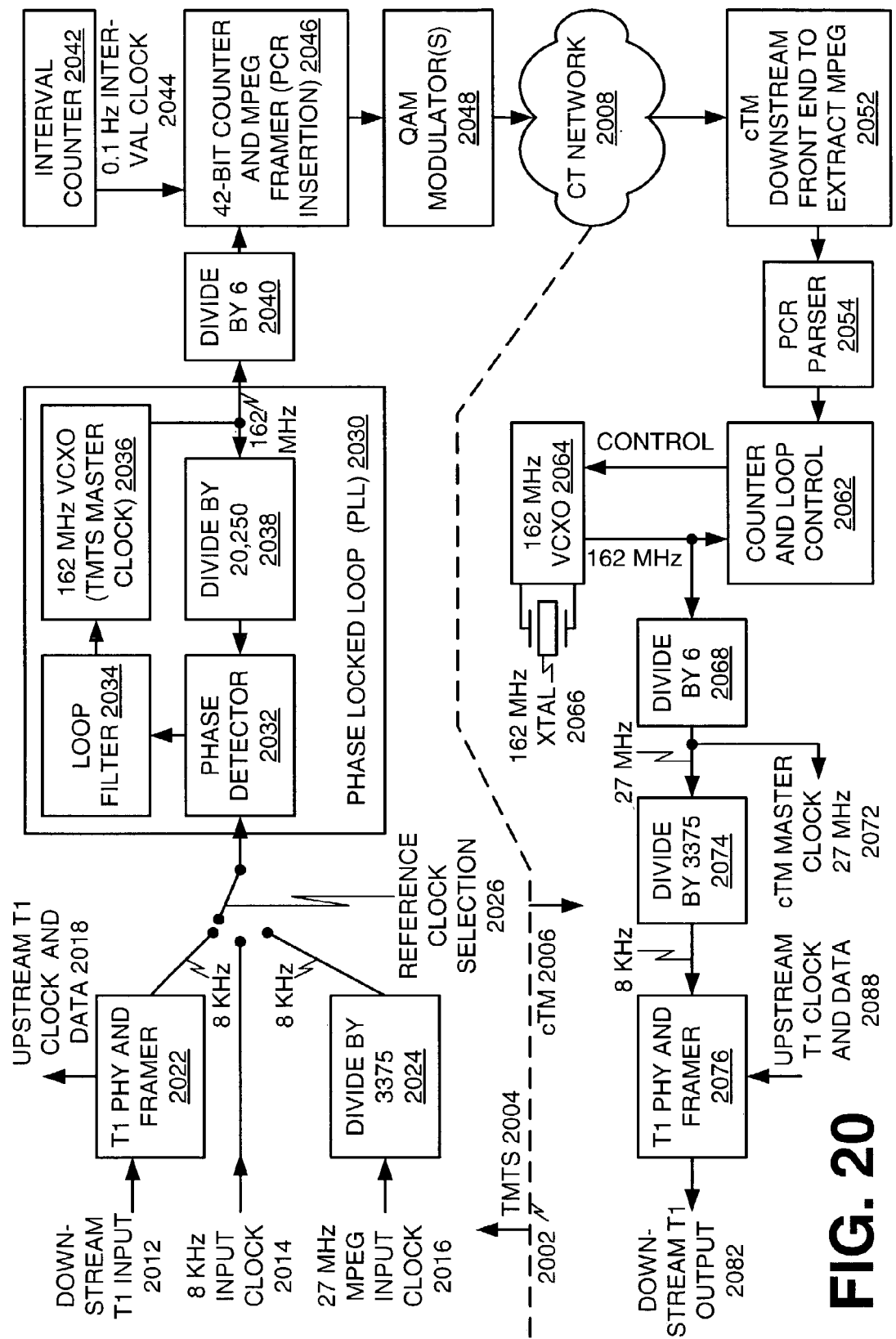
FIG. 20 shows clock distribution from a TMTS to a cTM.

FIG. 20 shows a way of delivering the proper clocking to customer premises equipment using a transport modem termination system and a client transport modem. Dashed line 2002 generally divides FIG. 20 between TMTS 2004 and cTM 2006. Both TMTS 2004 and cTM 2006 are connected into cable transmission network 2008. Furthermore, TMTS 2004 comprises various potential clock inputs including, but not limited to, downstream T1 input 2012, 8 kHz input clock 2014, as well as 27 MHz MPEG input clock 2016. These clock inputs are expected to be commonly found in the headend and/or distribution hub of cable service providers.

Generally, the 8 kHz clock 2014 is related to the N×56 kbps and N×64 kbps services. 8 kHz is the Nyquist sampling rate to be able to properly sample a 0 to 4 kHz analog POTS (Plain Old Telephone Service) voice frequency channel. With each sample having eight bits (or one octet), eight bits transmitted at 8 kHz (or 8000 cycles per second) yields a 8×8000=64,000 bits per second or 64 kbps. Many higher order PDH and SDH multiplexing techniques are based on multiples of this DS0 speed of 64 kbps or 56 kbps. Thus, an 8 kHz clock with a ⅛ kHz or 125 microsecond period is commonly available at N×56/64 interfaces to the public switched telephone network (PSTN).

Downstream T1 input 2012 generally also has a corresponding upstream T1 clock and data 2018 because T1 services are bi-directional. However, the service provider (or in this case downstream) clock generally is considered to be the master reference. Customer equipment clocking generally is derived from reference clocking of service provider or downstream services. As further shown in FIG. 20, the downstream T1 input 2012 and upstream T1 clock and data 2018 generally are connected in the TMTS to a T1 physical layer and framer (2022). One skilled in the art will be aware of various issues in T1 framing including various framing issues such as extended superframe (ESF) and D4 framing, synchronization based on the 193rd bit, as well as various physical layer technologies such as, but not limited to, alternate mark inversion (AMI) and 2B1Q of HDSL (High bit rate Digital Subscriber Line) for carrying the 1.536 Mbps (or 1.544 Mbps) T1 service. In addition, though the preferred embodiments of the present invention generally are described with respect to North American T1 service, European N×56/64 services such as E1 also could be used. The output of T1 physical (PHY) layer interface and framer 2022 comprises an 8 kHz clock source.

In addition, because a TMTS using the preferred embodiments of the present invention generally is expected to be often deployed at cable headends and/or distribution hubs, a 27 MHz MPEG input clock 2016 is expected to be available based on the ubiquitous deployment of MPEG in digital cable television (CATV) networks. An 8 kHz reference clock may be derived from the 27 MHz clock by dividing by 3375 at item 2024. The 27 MHz MPEG clock, which generally is used for digital movies, turns out to be an exact multiple of 3375 times the 8 kHz clock, which generally is used for N×56/64 services associated with the PSTN. The three input clocks from MPEG, T1, and an 8 kHz reference are converted to 8 kHz clocks. Reference clock selection 2026 may be a switch that selects among the various 8 kHz reference clocks. As would be known by one of skill in the art, this clock selection switching could be implemented by mechanisms such as, but not limited to, software controlled switches, manual physical switches, and/or jumpers.

The selected 8 kHz clock reference is then input into phase locked loop (PLL) 2030, which further comprises phase detector 2032, loop filter 2034, a 162 MHz voltage controlled crystal oscillator (VCXO) of TMTS master clock 2036. The 162 MHz output of TMTS master clock 2036 is divided by 20,250 at item 2038 and fed back into phase detector 2032. As a result, phase locked loop (PLL) provides a loop that is used for locking the relative phases of the 8 kHz clock relative to the 162 MHz TMTS master clock 2036. Phase locked loops are known to one of skill in the art.

The 162 MHz master clock 2036 is divided by 6 at item 2040 to generate a 27 MHz clock before being input into a 42-bit counter and MPEG framer 2046 that performs the function of inserting the program clock reference into MPEG frames. Interval counter 2042 generates a 0.1 Hz interval clock 2044 that generally determines that rate at which snapshots of the 42 bit counter are sent downstream as the program clock reference (PCR) in the adaptation field of MPEG packets. The MPEG frames are communicated downstream to client transport modem 2006 using QAM modulator(s) 2048, which may be integrated into TMTS 2004 or could be external to TMTS 2004.

On the downstream side the client transport modem (cTM) 2006 includes the hardware and/or software to properly extract the MPEG frames and interpret the fields. These functions might be performed in cTM downstream front end to extract MPEG 2052 and program clock reference parser 2054. Based on the PCR value extracted from MPEG adaptation fields, the client transport modem 2006 determines how much the cTM master clock has drifted relative to the TMTS master clock. Counter and loop control 2062 determines the amount and direction of the relative clock drifts between the cTM and the TMTS and sends control signals to the cTM oscillator to correct the relative clock drift. Thus, the counter and loop control 2062 regulates the cTM clock to ensure the proper relationship relative the TMTS master clock 2036.

In the preferred embodiment of the present invention, the cTM utilizes a 162 MHz voltage controlled crystal oscillator (VCXO) 2064 that operates based on a 162 MHz crystal (XTAL) 2066. The 162 MHz clock is divided by 6 at item 2068 to result in a 27 MHz clock that is the cTM master clock 2072. This 27 MHz cTM master clock has been generally locked to the TMTS master clock 2036, which was further locked to the 8 kHz reference source in phase locked loop (2030) of TMTS 2004. After dividing the 27 MHz cTM master clock 2072 by 3375 in item 2074, an 8 kHz clock is recovered that generally is locked to the 8 kHz reference clocks of TMTS 2004. As a result the 8 kHz clock of cTM 2006 generally can be used similarly to a service provider master clock for N×56/64 services such as, but not limited to, T1. The 8 kHz clock is an input into T1 physical layer interface and framer 2076 which provide downstream T1 output 2082 that can be used as a network service provider clock by other CPE (such as but not limited to a PBX). In addition, the upstream T1 clock and data from CPE such as, but not limited to a PBX, provides the bi-directional communication generally associated with T1. However, the clock associated with upstream T1 clock and data 2088 from a PBX or other CPE generally is not a master clock, but a derived clock based on the downstream T1 output 2082, that is based on the master clock of a service provider.

In general, the downstream delivery of MPEG packets with PCR information is used as a network clock distribution mechanism to clock transfers of information in the opposite direction to distribution of the clock. Normally, MPEG PCR information in downstream MPEG packets is used to clock downstream flows of audio/visual information. However, in the preferred embodiments of the present invention, the downstream delivery of MPEG PCR clock information is used to provide a stratum clock to lock the upstream transmissions of circuit emulation services (CES) or N×56/N×64 services to the downstream network clock normally provided by service providers. Also, in the preferred embodiments of the present invention, the downstream distribution of MPEG packet containing PCR information is used to synchronoize the upstream transmissions over multiple tones from a plurality of cTMs to a TMTS. Thus, the PCR information contained in MPEG packets is used to provide network clocking for communication that is in the opposite direction from the direction that MPEG packets are propagated.

Figure 21:
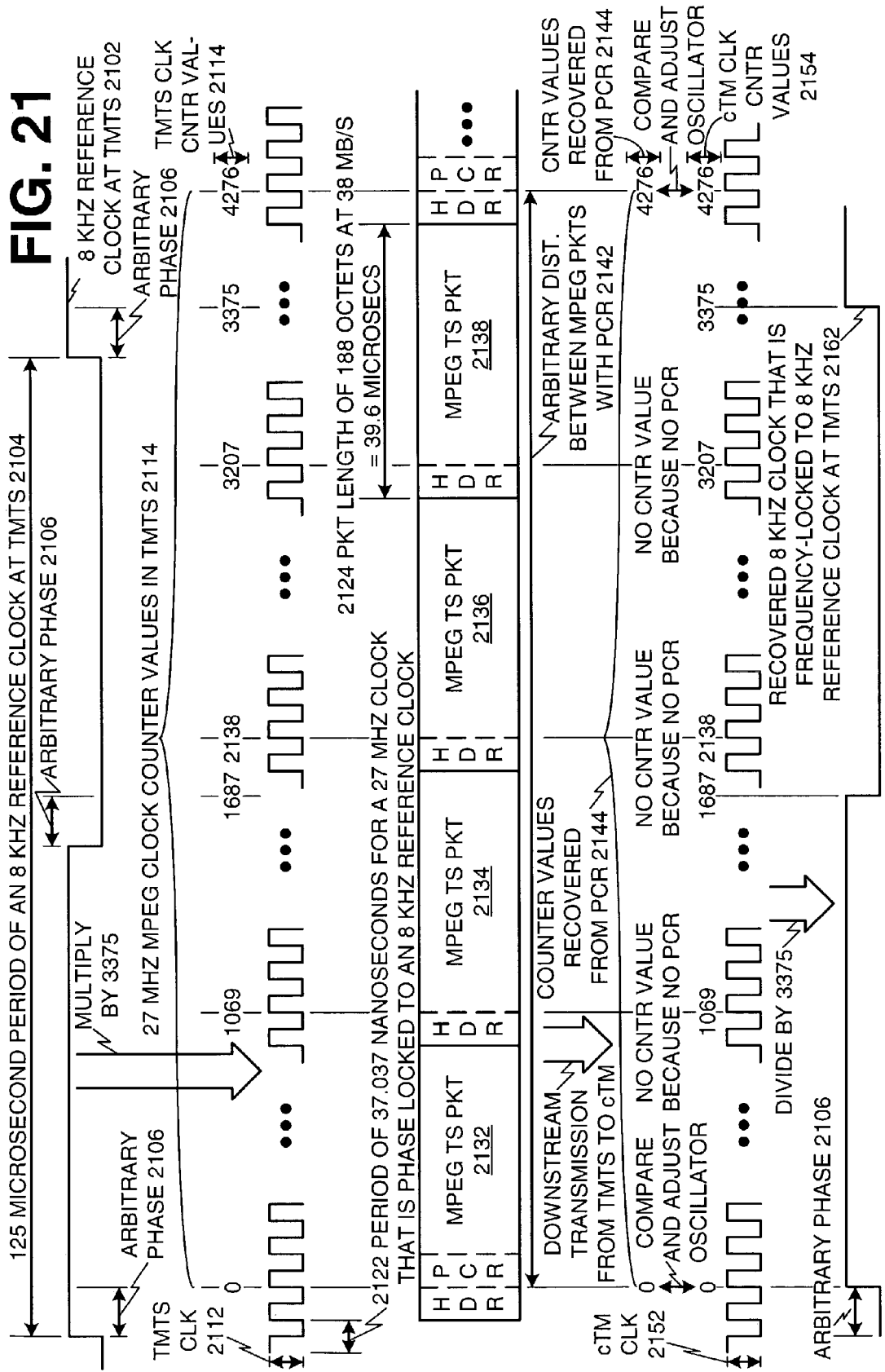
FIG. 21 shows a clock timing diagram for the TMTS and the cTM.

FIG. 21 shows a timing diagram of delivering an 8 kHz clock from a TMTS to a cTM using MPEG packets carrying program clock references (PCR). The timing diagram includes an 8 kHz reference clock 2102 that generally is associated with N×56/64 kbps services. An 8 kHz reference clock 2102 has a 125 microsecond period 2104. Normally, MPEG has a 27 MHz clock 2112 that has a period 2122 of approximately 37.037 nanoseconds. In general, the 8 kHz reference clock 2102 and the 27 MHz reference clock 2112 will have an arbitrary relative phase difference 2106. However, the relative phase difference 2106 between the 8 kHz clock 2102 and the 27 MHz clock 2114 is not significant so long as the clocks can be controlled so that they do not significantly drift relative to each other. In 6 MHz cable transmission frequency channels, MPEG packets may be transmitted at 38 Mbps. Given a 188 octet fixed length MPEG packet, this packet can be transmitted in approximately (188 octets×8 bits/octet)/38 Mbps=39.6 microseconds as illustrated at item 2124. A 27 MHz MPEG clock generally will complete approximately 1069 clock ticks in the 39.6 microseconds needed to transmit an MPEG packet of 188 octets at 38 Mbps on a 6 MHz frequency channel ((188 octets×8 bits/octet)/38 Mbps)/(1/27 MHz clock rate)). Moreover, two 188 octet MPEG packets can be transmitted in 2×1069=2138 clock ticks of a 27 MHz clock; three 188 octet MPEG packets can be transmitted in 3×1069=3207 clock ticks of a 27 MHz clock; and four 188 octet MPEG packets can be transmitted in 4×1069=4276 clock ticks of a 27 MHz clock. Also, 27 MHz/8 kHz=3375 clock ticks of the MPEG 27 MHz clock 2112 occur in one clock tick of an 8 kHz clock 2102 with a 125 microsecond period 2104. The 8 kHz clock 2102 has a transition in 125 microseconds/2=62.5 microseconds, which is associated with 3375/2=1687 clock ticks of the 27 MHz MPEG clock 2112. These relevant clock counts are shown in FIG. 21 as 27 MHz TMTS clock counter values 2114.

The four MPEG packets (or MPEG transport stream (TS) packets) shown in FIG. 21 are labeled as 2132, 2134, 2136, and 2128. Although all the MPEG packets have headers (HDR) only some of the MPEG packets (namely MPEG packet 2132 and the MPEG packet following MPEG packet 2138) contain program clock reference (PCR) values. The time distance between MPEG packets containing PCR values generally is arbitrary as shown at item 2142. However, the preferred embodiments of the present invention generally should send PCR update values often enough to keep the TMTS and cTM clocks aligned to the desired level of accuracy. Item 2144 in FIG. 21 shows the counter values that are recovered from the MPEG PCR information received at a client transport modem (cTM). Because some of the MPEG packets received by a cTM generally will not contain PCR values (e.g., MPEG packets 2134, 2136, and 2138), a cTM generally will not recover a clock counter value from those MPEG packets.

As shown in FIG. 21, MPEG PCR values 2144 can be used in the client transport modem (cTM) to compare and adjust the client transport modem clock 2152 using a voltage controlled crystal oscillator (VCXO) to keep it in sync with the transport modem termination system (TMTS) clock 2112. Basically, the counter values recovered from the PCR 2144 are compared with client transport modem (cTM) counter values 2154 to allow adjustment of the cTM clock 2152. The 27 MHz client transport modem (cTM) clock 2152 can then be used to generate a recovered 8 kHz stratum clock 2162 by dividing by 3375. In general, the recovered 8 kHz clock 2162 at a cTM will have the same frequency as the 8 kHz reference clock 2102 at the TMTS. However, because the TMTS clock counter 2114 may start at an arbitrary phase difference 2106 from a reference 8 kHz clock 2102 at the TMTS, the 8 kHz clock 2162 recovered at a cTM will have an arbitrary (but generally fixed) phase difference 2106 from the 8 kHz reference clock 2102 at a TMTS.

Furthermore, because the MPEG packets carrying PCR values are delivered to one or more cTMs and because the propagation delay on the cable distribution network may be different to each cTM, the 8 kHz clock 2162 recovered at any cTM generally will have an arbitrary (but basically fixed)

phase difference 2106 from the 8 kHz reference clock 2102 of the TMTS and an arbitrary (but basically fixed) phase difference 2106 from each of the other 8 kHz recovered clocks 2162 at the other cTMs. Although the recovered 8 kHz clock 2162 at a cTM will have an arbitrary phase difference 2106 from the 8 kHz input reference clock 2102 of the TMTS, this clock phase difference 2106 is not a problem. Generally, the phase of a reference clock at a telephone company central office is different from the phase of the clock delivered to customer premises equipment due at least to the propagation delays in the transmission lines between the service provider and the customer premises. However, it generally is important to synchronize the frequency of the service provider clock and the customer premises clocks so that the clocks do not significantly drift relative to each other. The recovered 8 kHz clock 2162 at the cTM is frequency-locked to the 8 kHz reference stratum clock 2102 at the TMTS (i.e., the clocks do not significantly drift relative to each other).

By frequency-locking each cTM clock to the TMTS clock, frequency stability of the poorly regulated cTM clocks is ensured. In addition, the multi-tone upstream frequency division multiplexing receiver in the TMTS generally performs optimally when the frequency error of the transmissions of different cTMs is small. Significant frequency differences in cTM clocks as well as the TMTS clock may create problems in selecting the correct carrier frequency of the upstream multi-tone frequency-division multiplexing. Thus, the downstream delivery of PCR information allows a plurality of client transport modems to properly set their respective oscillation clocks that are used in generating the frequency carrier signals. In this way each cTM can ensure that it is accurately transmitting in the right upstream frequency range for a tone instead of slightly interfering with an adjacent tone.

Downstream Multiplexing

The preferred embodiments of the present invention generally involve providing a frequency-division multiple access (FDMA) architecture to transparently carry frames of data between customer premises equipment and service provider equipment. The preferred embodiments of the present invention will function over not only hybrid fiber-coax systems but also over all fiber systems. Furthermore, the preferred embodiments of the present invention will work over cable distribution networks in a sub-split configuration that may be carrying legacy CATV video channels. Additionally, the preferred embodiments will work over bandwidth-split configurations.

In the downstream direction the preferred embodiments of the present invention support a point-to-multi-point configuration where a single 6 MHz channel provides one direction of traffic flow for one or more customer premises devices known as client transport modems (cTM). Downstream traffic in a 6 MHz channel may be shared by more than one cTM with each cTM being allocated a certain number of bits from the downstream modulators. To provide synchronization that allows a cTM to properly select the correct downstream bits and ignore the downstream bits destined for other cTMs, a framing method is used.

The MPEG 2 (Moving Picture Experts Group) transport stream is one non-limiting way of handling this framing functionality. Advantageously, MPEG 2 transport already is commonly used in CATV networks to deliver digital video and audio. Furthermore, MPEG 2 transport already includes synchronization mechanisms that can be used to align the clocks of cTMs. Also, MPEG 2 transport is a multiplexing mechanism that allows the high speed data of the preferred embodiments of the present invention to be potentially multiplexed with other MPEG 2 data in CATV networks.

In the upstream direction the standard 6 MHz channels of RF cable networks may be subdivided into multiple tones to allow frequency allocations to be managed at a much smaller granularity. Each one of these tones can be allocated to a different cTM. The preferred embodiments of the present invention avoid all the problems of DOCSIS in ranging and contention resolution (or media access control) by limiting the allocation of an upstream tone to one cTM at any particular time. Thus, the upstream direction generally represents a point-to-point architecture with one cTM communicating with one server transport modem (sTM) function. A plurality of these server transport modems may be implemented in a central-site concentrator known as a transport modem termination system (TMTS).

Figure 22:
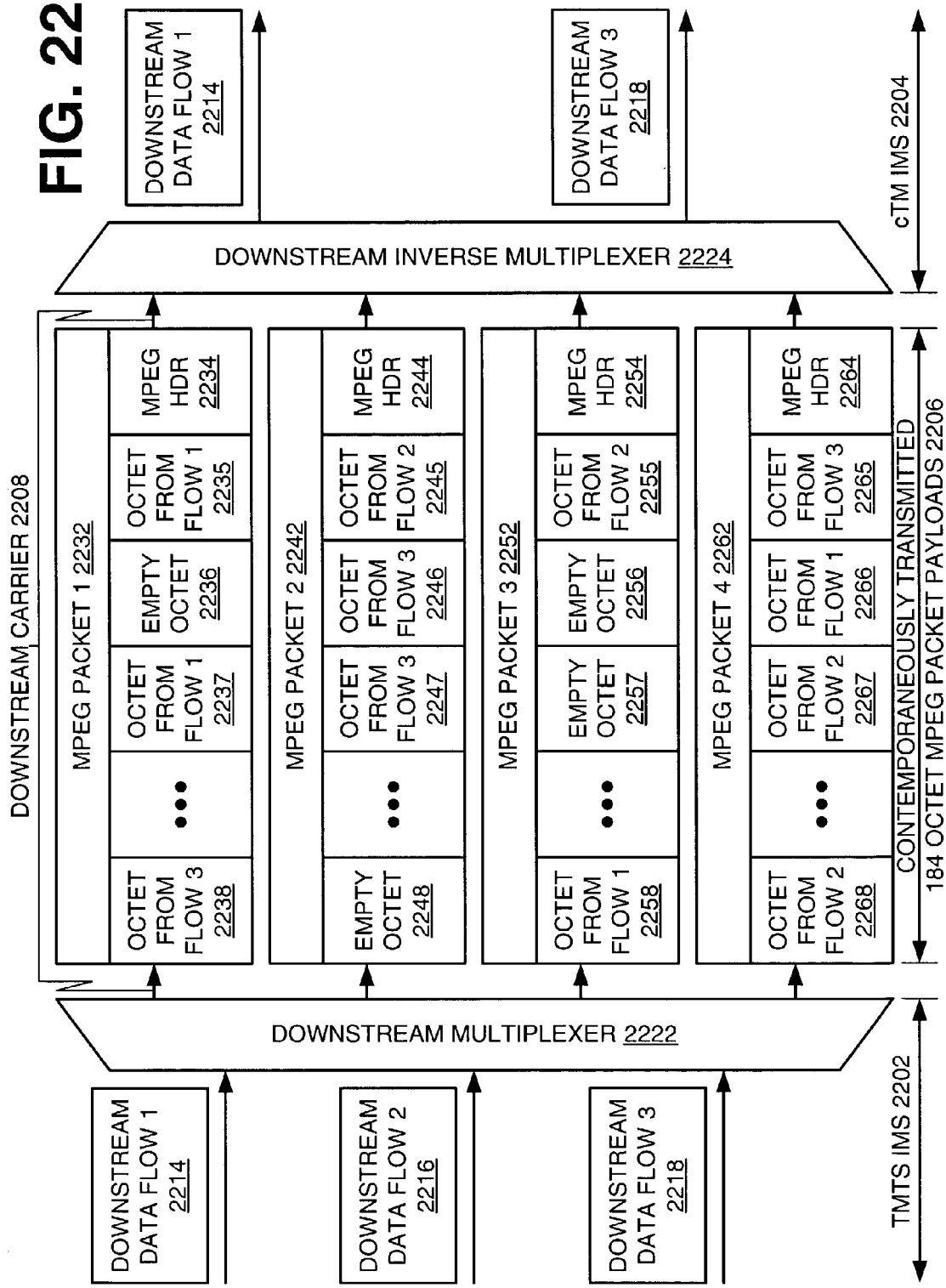
FIG. 22 shows the downstream inverse multiplex sublayer (IMS) communication of MPEG packets over multiple carriers.

As discussed above the preferred embodiments of the present invention generally carry downstream information in MPEG packets. The IMS sublayer of the TMTS is generally responsible for placing the downstream information into MPEG packets while the IMS sublayer of the cTM generally is responsible for recovering the information from the MPEG packets. FIG. 22 generally shows the downstream behavior of the TMTS IMS sublayer 2202 and the cTM IMS sublayer 2204. A plurality of 184 octet MPEG packet payloads 2206 may be contemporaneously transmitted downstream. Each of the contemporaneously transmitted MPEG packets is carried on its own downstream carrier frequency such as 2208. In the preferred embodiment of the present invention downstream carrier frequency such as 2208 is a 6 MHz frequency channel that is commonly found in CATV networks.

TMTS IMS 2202 is shown with three downstream data flows 2214, 2216, and 2218. Two of the downstream data flows 2214 and 2218 may be destined for one cTM IMS sublayer 2204. The other downstream data flow 2216 may be destined for a cTM IMS sublayer in a different client transport modem. The downstream data flows 2214, 2216, and 2218 generally are frame management sublayer data flows and carry information in FMS frames 1602 of FIG. 16. Downstream multiplexer in the TMTS 2222 is responsible for placing the downstream data flows into the correct MPEG packets while downstream inverse multiplexer 2224 is responsible for recovering the data flows from the correct MPEG packets.

FIG. 22 shows four MPEG packets 2232, 2242, 2252, and 2262 which each have an MPEG header 2234, 2244, 2254, and 2264 respectively. As shown in FIG. 22 octets from a single data flow are spread across a plurality of contemporaneously transmitted MPEG packets. For example, octets 2235, 2237, 2258, and 2266 of data flow 1 are spread across MPEG packets 2232, 2252, and 2262. Also, octets 2245, 2255, 2267, and 2268 of data flow 2 are spread across MPEG packets 2242, 2252, and 2262. In addition, octets 2238, 2246, 2247, and 2265 of data flow 3 are spread across MPEG packets 2232, 2242, and 2262. Empty octets 2236, 2248, 2256, and 2257 of MPEG packets 2232, 2242, and 2252 currently are not allocated to any data flow. Because the FMS data flows continuously transmit octets with 0x7E when there is no data to transmit, the octets of an MPEG packet that are allocated to a particular data flow generally contain either an octet from an FMS frame or the continuously transmitted 0x7E when there is no data from an FMS frame to be transmitted on an FMS data flow.

Figure 23:
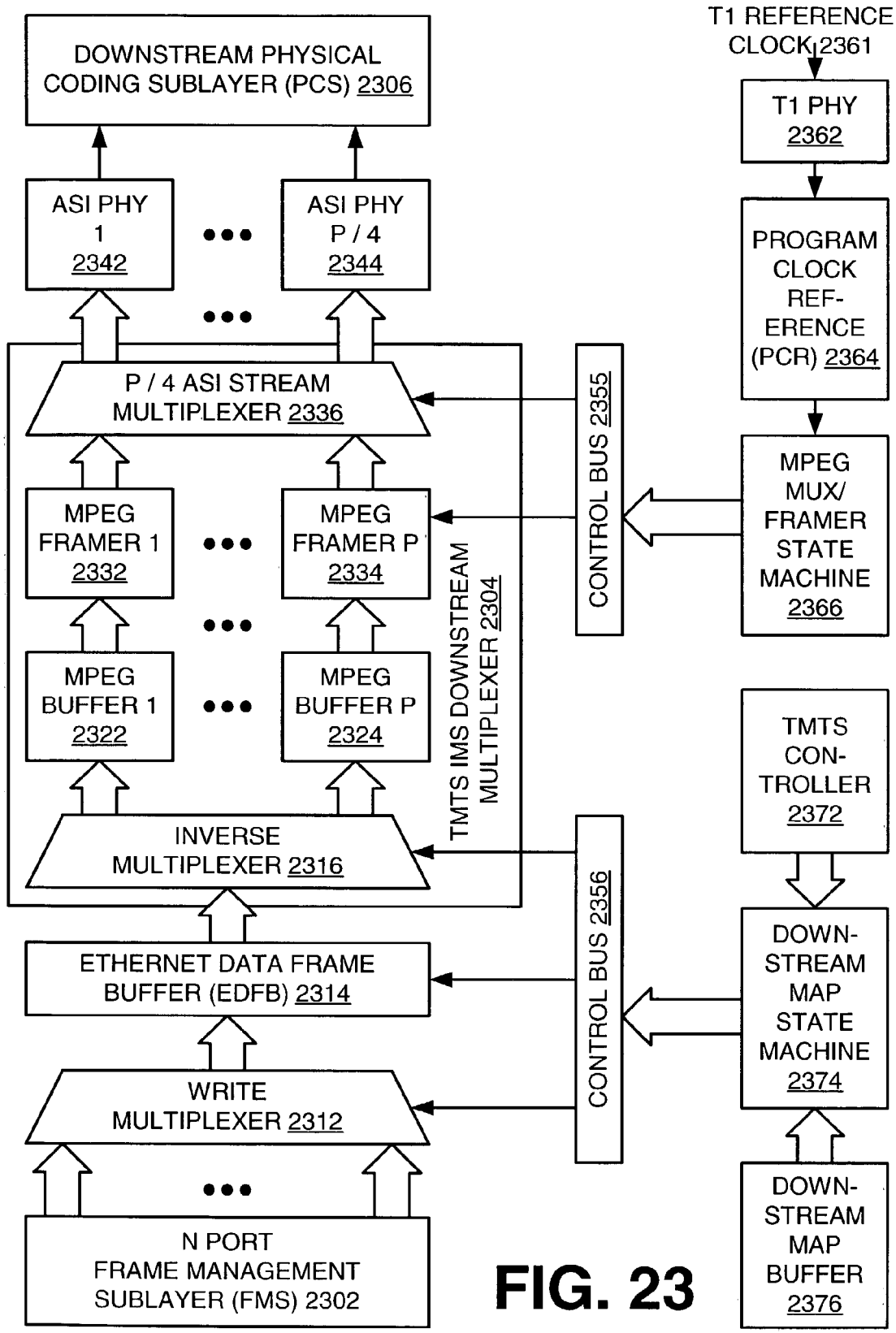
FIG. 23 shows the TMTS downstream IMS sublayer.

FIG. 23 shows a more detailed diagram of the downstream functionality of a TMTS multiplexer. An N port FMS sublayer 2302 communicates information to TMTS IMS downstream multiplexer 2304, which is further communicated to downstream PCS sublayer 2306 through various intermediate steps. N port FMS 2302 communicates information to write multiplexer 2312 which is responsible for managing the placement of data into ethernet data frame buffer (EDFB) 2314. EDFB 2314 is related to the frame buffers in FIG. 13. In general, N frame buffers may be implemented as a group of memory with write multiplexer 2312 and control bus 2356 specifying the correct memory address location associated with the proper FMS data flow. EDFB 2314 has one or more ring buffers associated with each data flow. The ring buffers keep up with pointers that specify the beginning address and ending address of valid data to be transferred to inverse multiplexer 2316. The behavior of inverse multiplexer 2316 will be described in more detail with respect to FIG. 24. However, inverse multiplexer 2316 generally reads data from EDFB 2314 and places it into one of P MPEG buffers shown as 2322 and 2324. Each MPEG buffer is associated with an MPEG framer shown as 2332 and 2334. MPEG framers 2332 and 2334 actually form MPEG frames including the MPEG headers and potentially adaptation fields that carry the program clock reference among other items. In the preferred embodiment of the present invention each group of four MPEG streams is converted into one asynchronous interface stream in P/4 ASI stream multiplexer 2336. These ASI streams have physical interfaces 2342 and 2344. The ASI streams are further passed to QAM modulators in PCS 2306. In other alternative embodiments of the present invention the MPEG streams go directly to the QAM modulators without utilizing ASI interfaces.

Furthermore, FIG. 23 also shows some of the hardware and/or software logic used to control the downstream communication of information from FMS sublayer 2302 into TMTS IMS downstream multiplexer 2304 and further into downstream PCS 2306. Control buses 2355 and 2356 carry at least some of the signals that drive this downstream communication through the sublayers in FIG. 23. In general, the preferred embodiments of the present invention use software and/or hardware to implement various logical functions. One skilled in the art will be aware of the trade-offs between implementing various functions in hardware, software, and/or some combination of hardware and software. Furthermore, one skilled in the art will be aware of methods for communicating signals between various portions of hardware and/or software. Also, one skilled in the art will be aware of the timing issues and techniques used in interfacing different types of hardware, logic, and/or circuitry to other hardware, logic, and/or circuitry. Moreover, one skilled in the art will be aware that interface buses are commonly used to facilitate the interconnection of hardware, logic, and/or circuitry. In addition, one skilled in the art will be aware that there are many other ways in addition to buses to handle the interconnection of hardware components. Thus, the use of buses is only one non-limiting example of hardware interconnection that may be used in the preferred embodiments of the present invention. One skilled in the art will be aware of other types of hardware interconnection as well as the various issues and complexities in utilizing various types of interconnections between and among hardware, logic, and/or circuitry.

As described with respect to FIGS. 20 and 21, the preferred embodiments of the present invention include a connection for a T1 reference clock 2361, which is input into T1 physical layer interface 2362. FIG. 21 also shows how the T1 clock is related to MPEG program clock reference (PCR) 2364. This PCR information is used in MPEG multiplexer/framer state machine 2366 that generates the changing values in the MPEG headers and passes the information to MPEG framers 2332 and 2334. Also, the TMTS includes TMTS controller 2372 that operates with downstream map state machine 2374 to cause the ethernet data from the correct data flow to be placed in the proper octet of the MPEG frames. This downstream map state machine 2374 also utilizes downstream map buffer 2376 which specifies the mapping of data flows into octets of MPEG packets.

Figure 24:
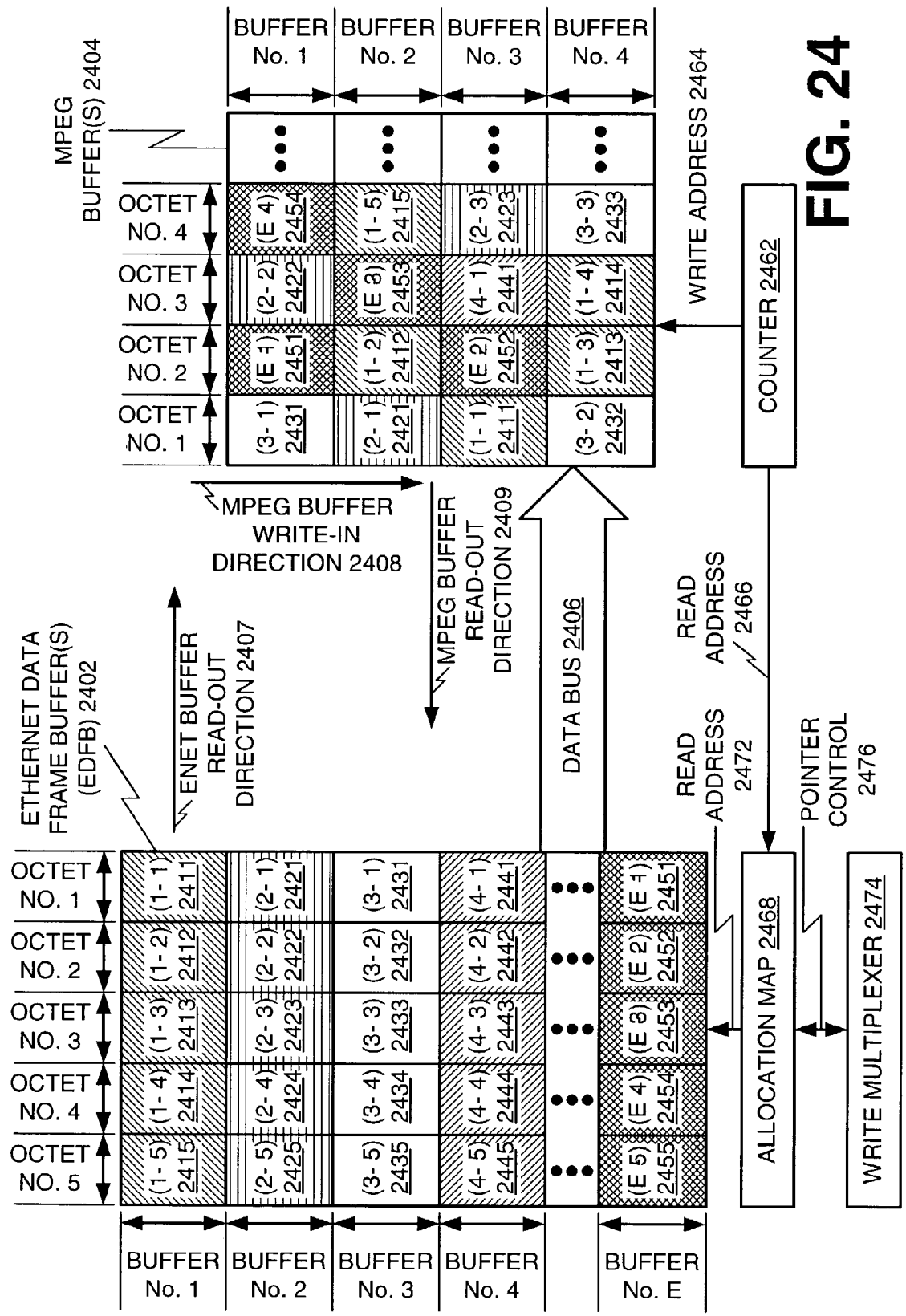
FIG. 24 shows the formation of MPEG packets from FMS frames.

FIG. 24 further shows the general behavior of downstream map state machine 2374 and its interaction with ethernet data frame buffer 2314 to cause the correct octets to be placed into MPEG buffers 2322 and 2324. FIG. 24 shows a small portion of the ethernet data frame buffer(s) (EDFB) 2402 as well as a portion of the MPEG buffers 2404. Basically, the octets in EDFB 2402 are read and moved across data bus 2406 to be written into MPEG buffers 2404. Arrow 2407 shows the ethernet buffer read-out direction, while arrow 2408 shows the MPEG buffer write-in direction. Also, arrow 2409 shows the MPEG buffer read-out direction, which generally relates to the direction that octets are transmitted on the cable distribution network. In FIG. 24 a non-limiting example of the preferred embodiments of the present invention would contemporaneously communicate octet No. 1 of MPEG buffer Nos. 1, 2, 3, and 4 on four different downstream 6 MHz channels. Also, in the non-limiting example of the preferred embodiments of the present invention, octet No. 2 of MPEG buffer Nos. 1, 2, 3, and 4 in FIG. 24 generally would be contemporaneously communicated on four different downstream 6 MHz channels. Similarly, in the non-limiting example of the preferred embodiments of the present invention, octet No. 3 of MPEG buffer Nos. 1, 2, 3, and 4 in FIG. 24 generally would be contemporaneously communicated on four different downstream 6 MHz channels. Furthermore, in the non-limiting example of the preferred embodiments of the present invention, octet No. 4 of MPEG buffer Nos. 1, 2, 3, and 4 in FIG. 24 generally would be contemporaneously communicated on four different downstream 6 MHz channels.

One skilled in the art will be aware that the concepts of the preferred embodiments of the present invention may transmit MPEG frames on at least one downstream frequency channel, and the use of a plurality of downstream frequency channels instead of just one frequency channel generally allows contemporaneous transmission of multiple MPEG packets and the corresponding octets. Thus, the choice of four MPEG buffers (Nos. 1, 2, 3, and 4) shown in FIG. 24 is only a non-limiting example that is used to better illustrate the possibility of utilizing more than one downstream frequency channel in the preferred embodiments of the present invention. In general, the portion of EDFB 2402 shown in FIG. 24 has five octets and buffers numbered 1 to E. One skilled in the art will be aware that this is a small example of a communication system utilizing the preferred embodiments of the present invention, and actual implementations would have more than five octets in EDFB 2402 as well as more than four octets in each of the four exemplary buffers of MPEG buffer(s) 2404.

In general the octets of the EDFB 2402 are labeled in FIG. 24 with an ordered pair of (EDFB buffer number—EDFB octet number). For example, octet 4 of buffer 3 in EDFB 2402 is (3-4). Also, the five octets of EDFB 2402 buffer 1 are 2411, 2412, 2413, 2414, and 2415; the five octets of EDFB 2402 buffer 2 are 2421, 2422, 2423, 2424, and 2425; the five octets of EDFB 2402 buffer 3 are 2431, 2432, 2433, 2434, and 2435; the five octets of EDFB 2402 buffer 4 are 2441, 2442, 2443, 2444, and 2445; and the five octets of EDFB 2402 buffer E are 2451, 2452, 2453, 2454, and 2455.

The values in these octets are read-out of EDFB 2402 according to ethernet buffer read-out direction 2407 and moved into the four MPEG buffer(s) 2404 according to the MPEG buffer write in direction 2408 whenever the allocation MAP specifies the same octet number for two or more MPEG buffers. (Because the data from the MPEG buffers 2404 generally is transmitted contemporaneously downstream with each MPEG buffer relating to an MPEG packet on its own carrier frequency, the No. 1 octets of MPEG buffers No. 1 through 4 are transmitted contemporaneously.) Also, the No. 2 octets of MPEG buffers No. 1 through 4 are transmitted contemporaneously. Thus, MPEG buffer write-in direction 2408 is the sequence for filling the MPEG buffers when the allocation maps specify that one FMS data flow is to the same octet number in two or more contemporaneously transmitted MPEG packets. Furthermore, the data in the EDFB buffers 2404 from FMS data flows generally is serial or sequential in nature with the value in octet 1 of any one of the EDFB buffer numbers 1 through E preceding the value of octet 2 in the same EDFB buffer number. In addition, the transmission of an MPEG packet that is formed based upon one of the MPEG buffers (numbered 1 through 4 in this example) is also sequential in nature such that the value in octet 1 of MPEG buffer 1 generally is transmitted downstream before the value in octet 2 of MPEG buffer 1. Thus, in general the information in an FMS data flow as held in one of the buffers of EDFB 2404 is read out in FIG. 24 in a right-to-left fashion. This information is written into the MPEG buffer(s) 2404 first in a top-to-bottom fashion (according to arrow 2408 that shows the MPEG buffer write-in direction) and then in a left-to-right fashion. The values in MPEG buffers 2404 generally are read out in a left-to-right fashion for downstream communication through a PCS sublayer and over a cable transmission network. The information of each of the MPEG data buffer(s) 2404 that are numbered 1 to 4 are read out in parallel for all four of the exemplary MPEG data buffers numbered 1 through four.

As an example, the values in octets 2431 (or 3-1), 2432 (or 3-2), and 2433 (or 3-3) generally are sequential octets of an FMS data flow comprising FMS data frames 1602 as shown in FIG. 16 that may be carrying ethernet/802.3 data frames or control frames. The value of octet 2431 (or 3-1) is read out of octet 1 of EDFB 2402 buffer No. 3 and written into octet 1 of MPEG buffer 2404 No. 1 prior to the value of octet 2432 (or 3-2) being read out of octet 2 of EDFB 2402 buffer No. 3 and being written into octet 1 of MPEG buffer 2404 No. 4. Furthermore, the value in octet 2432 (or 3-2) is read out of octet 2 of EDFB 2402 buffer No. 3 and written into octet 1 of MPEG buffer 2404 No. 4 prior to the value in octet 2433 (or 3-3) being read out of octet 3 of EDFB 2402 buffer No. 3 and being written into octet 4 of MPEG buffer 2404 No. 4. Then, the value of octet 2431 (or 3-1) is transmitted downstream contemporaneously with the value in octet 2432 (or 3-2), although the two octets are carried in different MPEG packets that are transmitted in parallel across multiple carrier frequencies. Also, the MPEG packet carrying the information from MPEG buffer 2404 No. 4 carries the values of the two consecutive or sequential octets 2432 (or 3-2) and 2433 (or 3-3) from an FMS data flow that was held in EDFB 2402 buffer No. 3. However, the MPEG packet that is formed (based upon MPEG buffer 2404 No. 4) now has intervening octets 2413 and 2414 (associated with different FMS data flows) between octet 2432 (or 3-2) and octet 2433 (or 3-3).

The process of reading from the ethernet data frame buffer(s) (EDFB) 2402, which generally contain FMS frames, and writing to MPEG buffer(s) 2404 is at least partially driven by counter 2462. Because MPEG packets are fixed length with 184 octets of payload, a counter 2462 can cycle through the octet positions of MPEG buffer(s) 2404, which generally hold fixed length MPEG payloads. The counter 2462 supplies its value as a write address for MPEG buffer(s) 2404. Also, the counter 2462 supplies its value as a read address 2466 to allocation map 2468, which generally keeps track of the relationship specifying the location in MPEG packets where the octets of FMS data flows contained in EDFB 2404 are to be placed. Allocation map 2468 may be implemented at least partially as a memory lookup table that uses read address 2466 to read out the value from the memory look up table associated with allocation map 2468. The value from the lookup table together with pointer control 2476 information from write multiplexer 2474 provides the information needed to generate the read address(es) 2472 of the EDFB 2402. As described with respect to FIG. 23, the ethernet data frame buffer(s), which are labeled as EDFB 2402 in FIG. 24, have one or more ring buffers with the position in each of the ring buffer determined based on at least two pointers associated with each ring buffer. The two pointers for each ring buffer specify the next write location for writing octets of FMS frames into a ring buffer of EDFB 2402 and specify the next read location for reading octets of the FMS frames out of the ring buffer of EDFB 2402 and into the MPEG buffer(s) 2404. Basically, the read and write pointers for each ring buffer keep track of which octets in EDFB 2402 contain valid information from FMS frames and which octets in EDFB 2402 have not yet been written to an MPEG payload as represented by the MPEG buffer(s) 2404.

Figure 25:
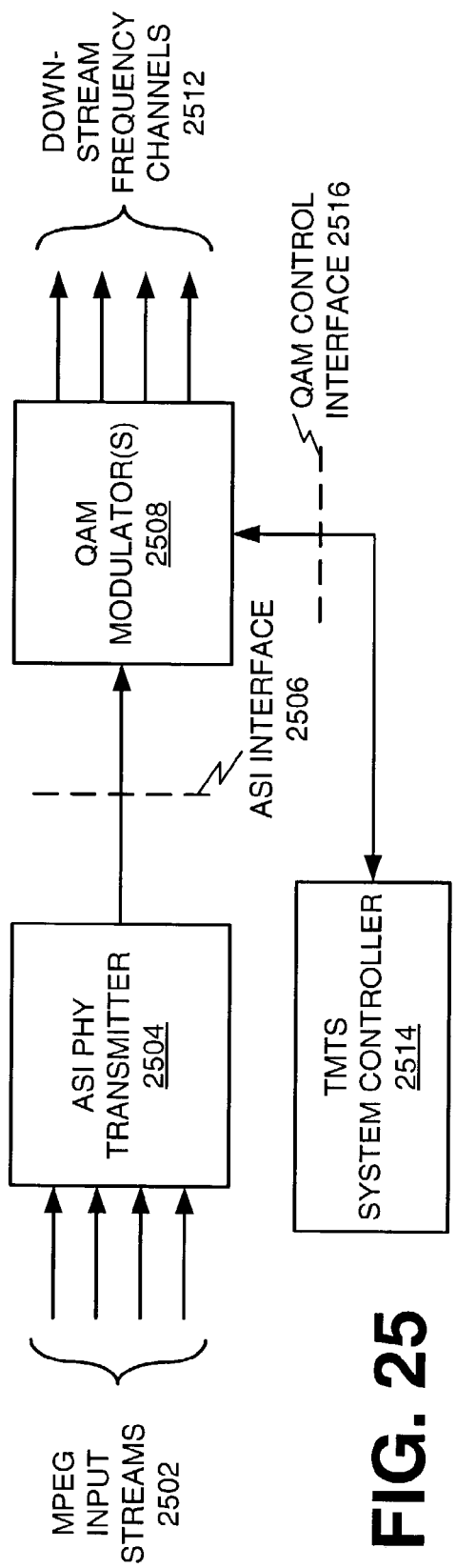
FIG. 25 shows the downstream communication of MPEG packets using an asynchronous serial interface (ASI) to communicate with external QAM modulators.

FIG. 25 shows a block diagram from communicating MPEG streams in an ASI format to QAM modulators for transmission on downstream frequency channels. Four MPEG input streams 2502 may be provided to an asynchronous serial interface (ASI) physical (PHY) transmitter 2504 that generates an ASI interface 2506 as the transmitted output. The ASI interface 2506 provides input to QAM modulator(s) 2508, which generate the electrical and/or optical signals for transmitting the digital information of the MPEG streams in ASI format on the downstream frequency channels 2512. In the preferred embodiments of the present invention the downstream frequency channels are 6 MHz channels that are commonly used in cable TV networks. One skilled in the art will be aware of this configuration for communicating MPEG input streams 2502 downstream on 6 MHz frequency channels because it is commonly used in delivery digital CATV services.

The QAM modulator(s) 2508 are controlled by and/or deliver feedback information to TMTS system controller 2514. In general, QAM control interface 2516 allows TMTS system controller to specify the downstream carrier frequency for each modulator of QAM modulator(s) 2508. Also, various other modulation parameters may be communicated from TMTS system controller 2514 to QAM modulator(s) 2508 over QAM control interface 2516. Furthermore, QAM modulator(s) 2508 may report various performance conditions including failures back to TMTS system controller 2514 over QAM control interface 2516. This use of QAM modulator(s) 2508 that generally are controlled by software and/or hardware logic (and/or circuitry) in the form of TMTS system controller 2514 is known by one of skill in the art because it is commonly used in CATV networks to deliver various services.

Figure 26:
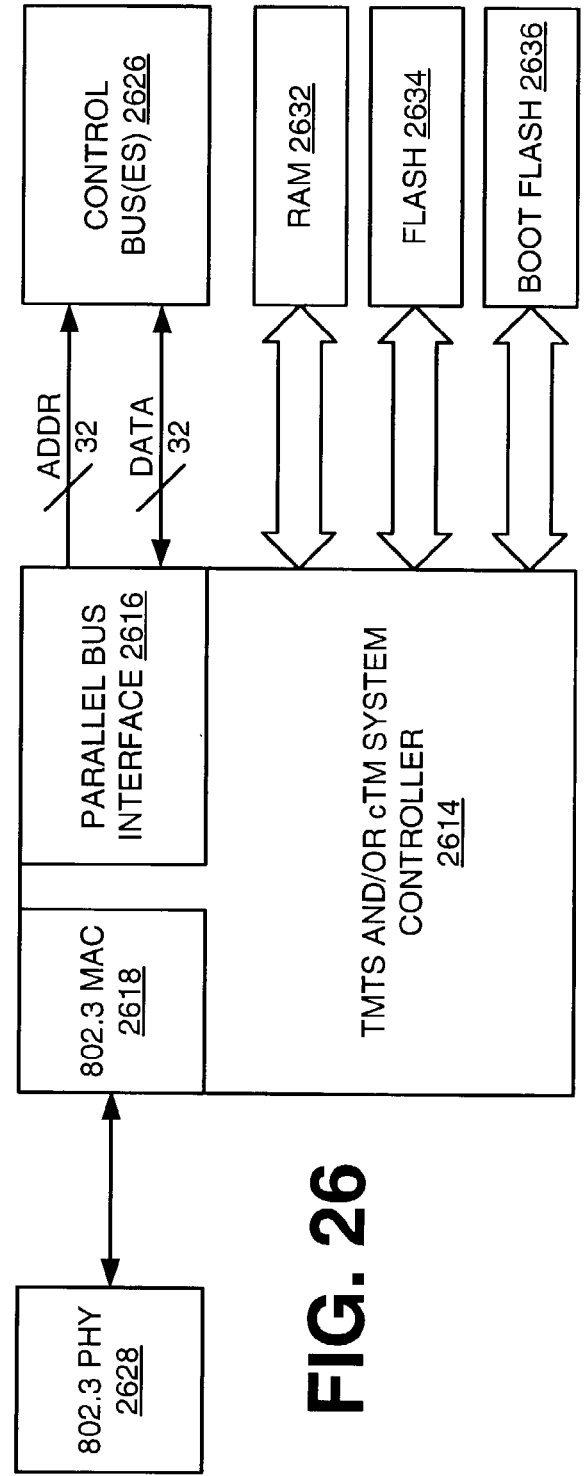
FIG. 26 shows a block diagram of a TMTS and/or cTM system controller.

FIG. 26 shows a block diagram of a system controller that may be used in a TMTS and/or a cTM. TMTS and/or cTM system controller 2614 is a Motorola MPC855T Power Quick Micro-controller in the preferred embodiments of the present invention. The data sheet for the MPC855T is incorporated by reference in its entirety herein. TMTS and/or cTM system controller has a parallel bus interface 2616 that includes a thirty-two bit address bus and a thirty-two bit data bus. The addresses and data from parallel bus interface 2616 are propagated throughout a TMTS and/or a cTM through various control bus(es) 2626. In addition, TMTS and/or cTM system controller 2614 includes an 802.3 (and/or ethernet) MAC interface 2618. This 802.3/ethernet MAC interface 2618 can be connected to an 802.3 physical interface 2628, which transmits and/or receives the proper electrical and/or optical signals for carrying 802.3/ethernet MAC frames over the various types of ethernet physical layers that are known to one of ordinary skill in the art.

The ethernet/802.3 MAC interface 2618 may be used for communicating various control information various protocols that are known to one of ordinary skill in the art. One commonly-used, non-limiting set of protocols is the TCP/IP (Transmission Control Protocol/Internet Protocol) suite, which is used on the Internet and includes many protocols for performing various functions. In the TCP/IP suite, telnet, HTTP (Hyper-Text Transfer Protocol), and SNMP (Simple Network Management Protocol) are commonly-used for configuration and/or management of network devices. In addition, FTP (File Transfer Protocol) and TFTP (Trivial File Transfer Protocol) are commonly used for downloading and/or uploading files of configuration settings as well as downloading software or firmware updates to network devices. Furthermore, the DHCP (Dynamic Host Configuration Protocol), which is an extension of the bootstrap protocol (BOOTP) is often used configuring IP address and other IP initialization information. One skilled in the art will be aware that these commonly-used protocols are only non-limiting examples of protocols for handling configuration/management, software/parameter setting file transfer, and IP configuration. One skilled in the art will be aware that many other protocols, both within the TCP/IP suite and outside the TCP/IP suite, can be used to perform similar functions.

Furthermore, FIG. 26 shows that TMTS and/or cTM system controller 2614 is connected to various types of memory including volatile storage or RAM 2632, which generally is used when TMTS or cTM system controller 2614 is operating as well as two areas of non-volatile storage in flash 2634 and boot flash 2636. Generally, flash 2634 contains configuration settings and system firmware and/or software, while boot flash 2636 generally contains a small amount of software and/or firmware that is used for booting TMTS and/or cTM system controller 2614 and is responsible for ensuring that downloads of new firmware and/or software to flash 2634 are applied correctly when a different firmware and/or software revision is installed in the system. This description of RAM 2632, flash 2634, and boot flash 2636 is the common way that network devices handle volatile operating memory and non-volatile memory for software/firmware and system configuration parameters. However, one skilled in the art will be aware of many other types of storage devices and technologies as well as other storage architectures that could be used to implement similar functionality to RAM 2632, flash 2634, and boot flash 2636.

Figure 27:
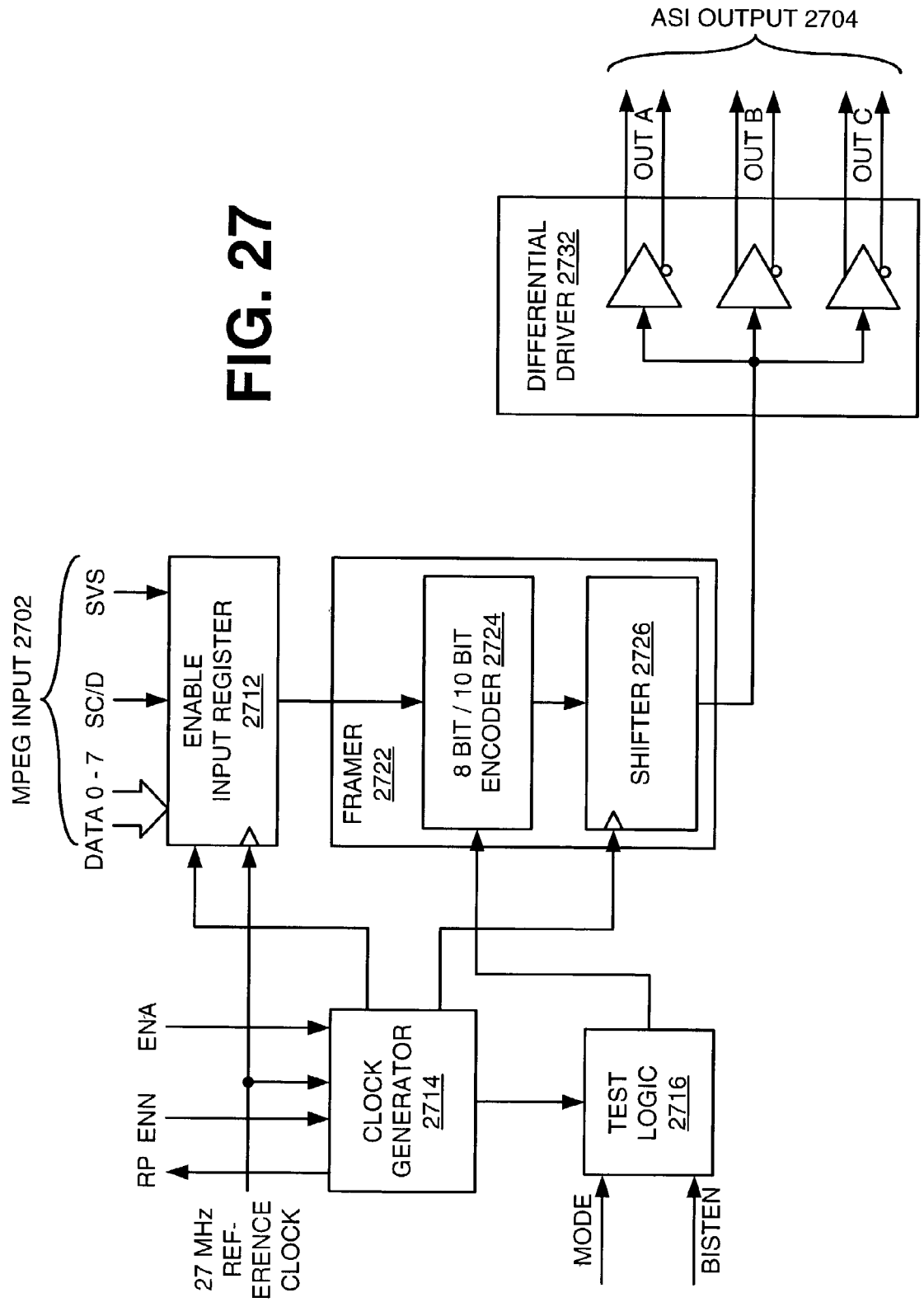
FIG. 27 shows a block diagram of an ASI transmitter.

FIG. 27 shows a block diagram of one implementation of an MPEG to ASI transmitter that may be used in the preferred embodiments of the present invention. The preferred embodiments of the present invention use a Cypress Semiconductor transmitter chip, such as the CY7B923 or the CY7B9234 SMPTE (Society of Motion Picture and Television Engineers), from the HOTLink chip family as ASI PHY transmitter 2504 in FIG. 25. The block diagram of FIG. 27 is from the data sheet for the CY7B9234, and this data sheet as well as the data sheet from the CY7B923 are in incorporated by reference in their entirety herein. In general, MPEG input 2702 is converted into an ASI output 2704. Enable input register 2712 passes the octets of MPEG packets into the framer 2722 based on 27 MHz reference clock. Framer 2722 creates an 8 bit/10 bit code in 8 bit/10 bit encoder 2724. This information is then shifted out to differential driver 2732 through shifter 2726, which may be implemented using positive emitter-coupled logic (PECL). Test logic 2716 is also used as an input to the 8 bit/10 bit encoder 2724. Due to the common usage of MPEG streams carried over ASI interfaces in the headend and/or distribution hubs of CATV networks, one skilled in the art will be aware of other off-the-shelf chips as well as other logic and/or circuitry that could be used as an ASI PHY transmitter 2504 to place four MPEG streams into an ASI bit stream.

Figure 28:
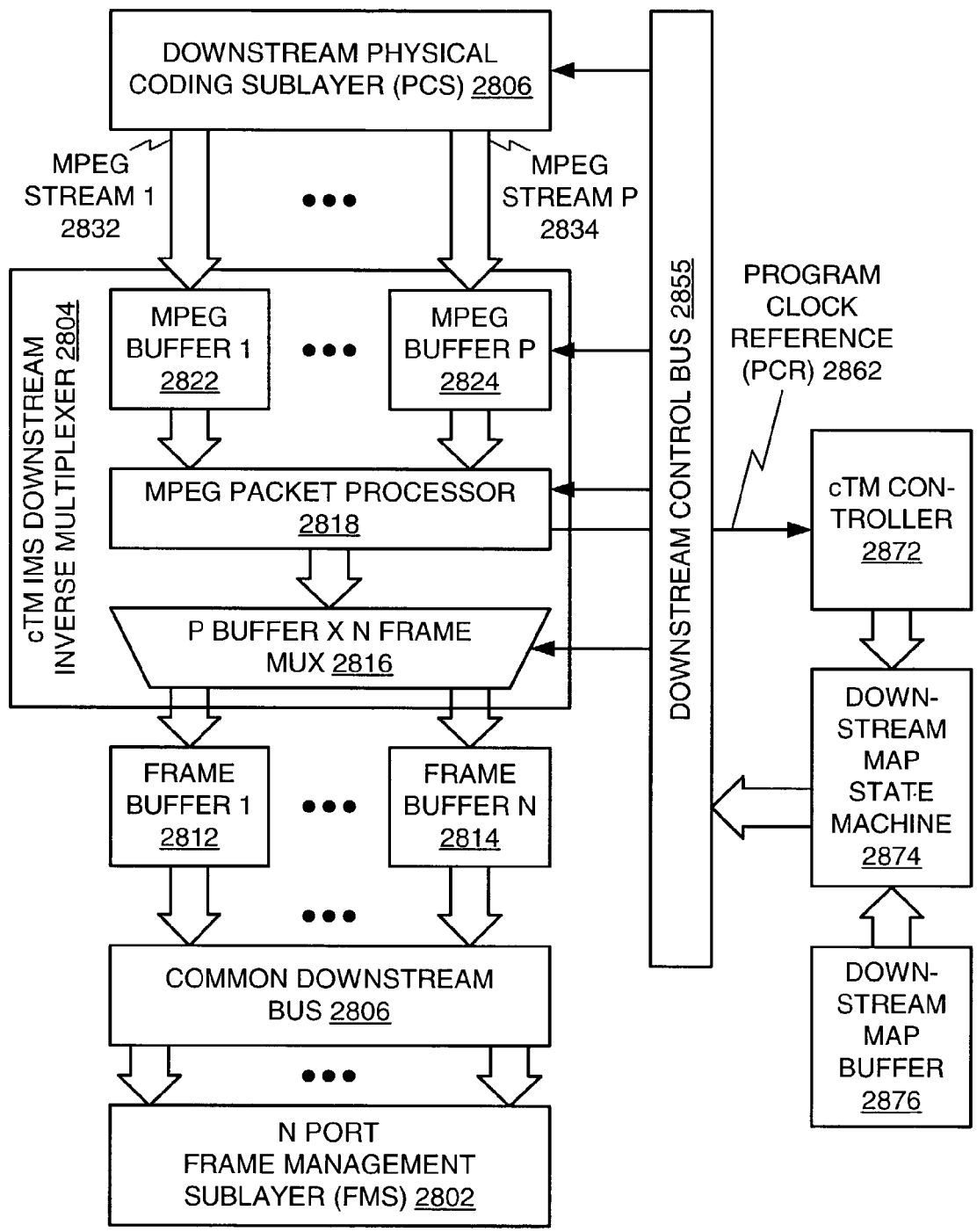
FIG. 28 shows the cTM downstream IMS sublayer.

FIG. 28 shows a block diagram for the downstream inverse multiplexer sublayer for a client transport modem. Downstream PCS 2806 recovers the MPEG streams 1 through P (2832 and 2834) from the QAM modulated downstream 6 MHz frequency channels. The MPEG streams are passed into cTM IMS downstream inverse multiplexer 2804 where they are converted back into FMS frames that are delivered over common downstream bus 2806 to N port frame management sublayer (FMS) 2802. In more detail, cTM IMS downstream inverse mux 2804 includes MPEG buffers 1 through P (2822 and 2824) to receive MPEG streams 1 through P (2832 and 2834). MPEG packet processor 2818 determines whether the packet ID (PID) of each MPEG packet is one of the PIDs carrying downstream traffic to this particular client transport modem. Other MPEG packets with other PIDs may contain traffic that is not destined for this particular cTM and thus are discarded. The traffic with other PIDs that is not destined for this particular cTM may contain traffic destined for other client transport modems as well as other applications and uses of MPEG packets. Thus, MPEG PID numbers actually provide a mechanism for time-division multiplexing (TDM) other types of MPEG traffic onto the same 6 MHz frequency channel that carries traffic to a plurality of cTMs. MPEG packet processor 2818 handles the selection based on the PID values of the proper MPEG packets for the cTM that may include multiple MPEG packets transmitted in parallel across multiple 6 MHz frequency channels. Basically, MPEG packet processor 2818 acts as a selection filter based upon PID values to only select the MPEG packets containing PID values destined for a particular cTM.

P buffer×N frame mux 2816 generally performs the reverse of the process shown in FIG. 24 for the MPEG packets with PIDs containing information destined for this particular cTM. The P buffer×N frame mux selects the proper octets from the incoming MPEG frames and places them into frame buffers 1 through N (2812 and 2814) to reassemble the FMS frames that may be carrying ethernet/802.3 data frames or control frames in the FMS frame format of FIG. 16. The P buffer×N frame mux 2816 reassembles the FMS frames from the MPEG packets based upon a downstream map that is contained in downstream map buffer 2876 and is further described with respect to FIG. 30. The assembly of FMS frames from MPEG packets starts with the first octet of the lowest PID which is allocated to the cTM and increments by increasing PID numbers (of the PID numbers allocated to the cTM) to first recover the last octet allocated to the cTM in a parallel transmission of octets over multiple MPEG packets on multiple 6 MHz channels. Then the assembly of FMS frames continues using the same process on the next set of octets transmitted in parallel (in multiple MPEG packets on multiple 6 MHz frequency channels) that has at least one octet allocated to the cTM. All other MPEG octets not allocated to this particular cTM are discarded during the process.

The recovered octets are placed into the correct frame buffer based upon the allocation of client transport modem ethernet/802.3 uplink ports. The frame buffers 1 through N (2812 and 2814) containing the FMS frames are communicated over common downstream bus 2806 to N port FMS 2802, which converts the FMS frames back into ethernet/802.3 frames for transmission on the ethernet/802.3 ports of the client transport modem. The control frames are passed to the cable transmission (CT) physical (PHY) control and generally are not forwarded to the ethernet/802.3 ports of a client transport modem. Most ethernet/802.3 transceivers would consider the control frames as ethernet/802.3 errors because the control frames have a different start frame delimiter (SFD) octet of 0xAE instead of the correct SFD for ethernet/802.3 of 0xAB. In addition to this issue of the control frames having an incorrect SFD for communication on ethernet/802.3 media, based on security policies the control frame information generally should not be distributed on ethernet/802.3 media connected to the cTM.

Downstream map state machine 2874 utilizes information communicated with cTM controller 2872 and downstream map buffer 2876 to control the process of reassembling FMS frames from the octets of MPEG packets. In the preferred embodiments of the present invention, the downstream map state machine 2874 communicates with various portions of the client transport modem using downstream control bus 2855. Also, MPEG packet processor 2818 extracts the program clock reference (PCR) from the incoming MPEG packets and passes information on the clock to the cTM controller 2872. The information on the PCR is utilized by cTM controller 2872 in synchronizing its clock with the clock of the TMTS. As described previously with respect to FIGS. 20 and 21, the PCR allows the cTM to generate an 8 kHz clock that is frequency-locked to an 8 kHz stratum reference clock, a related 1.544 MHz clock, or a related 27 MHz clock that is connected to the TMTS. Also, the PCR helps the cTM to transmit using an accurate frequency for the carrier for upstream transmission of the upstream frequency-division multiplex (FDM) tones.

Referring now to FIG. 29, the TMTS and the cTM generally need to both have similar information regarding the allocation of MPEG PIDs and octets to specific client transport modems (cTMs). This information can be communicated between the TMTS and the cTM using various mechanisms, which may or may not utilize the cable network to communicate the information. As a central concentrator, the TMTS generally has this allocation information for each of the plurality of connected cTMs. In contrast, a cTM generally is only connected to a single TMTS (although one skilled in the art will be aware that the concepts of the present invention could be used to develop a cTM that communicates with multiple TMTSes). Thus, the TMTS generally maintains an allocation map of MPEG PIDs and octets for each cTM, while a cTM generally maintains one allocation map of MPEG PIDs and octets that are associated with downstream communication from the TMTS.

Potentially this information could be hard-coded into the TMTS and/or cTM in software/firmware and/or hardware during the equipment production process, or alternatively the end user of a cTM could manually enter this information into a cTM using various types of user interfaces with the settings configured to match the settings that a service provider uses in the TMTS. Although these processes of communicating the downstream MPEG configuration between a cTM and TMTS will work, they are inflexible, tedious, laborious, and error prone. A preferred method is to use the cable transmission network to distribute the configuration information. A service provider could setup initial MPEG allocation configurations through the operations, administration, and maintenance (OA&M) interfaces of the TMTS. During initialization/registration, a cTM can receive information about the proper MPEG allocations from the TMTS. Also, later communications between a TMTS and a cTM can update the MPEG allocations, thus changing the bandwidth utilized downstream between a cTM and a TMTS.

FIGS. 29 and 30 show one method of forming packets that communicate this MPEG allocation information between a TMTS and a cTM. Generally, the allocation maps are communicated separately to each cTM, so that each cTM is not even aware of the MPEG PIDs and octets assigned to each of the other cTMs. This security reduces the possibility of someone using a device to capture packets on the broadcast cable transmission network and eavesdrop on the communications of customers. Without the proper map information on the allocation of MPEG PIDs and octets, the broadcast downstream data of the preferred embodiments of the present invention generally will appear as random gibberish. Also, the upstream allocation map of each cTM for communication over the tones is communicated separately between the TMTS and the cTM associated with the upstream tone allocation map to offer similar security in the upstream direction. This separate distribution of map information together with the separation of FMS data flows into specific MPEG frames, octets, and tones offers an extremely secure access methodology.

Each of the 184 octet payloads of the downstream MPEG packets is independently assignable, both statically and dynamically for bandwidth burst capability, to an FMS data flow of a cTM. The map of these MPEG PID and octet allocations to specific cTMs may be communicated during periodic maintenance dialogs as well as in response to bandwidth changes. The downstream MPEG PID and octet allocation map is communicated in a variable length 802.3/ethernet frame payload. The map has a 17 octet header as shown in FIG. 29. It comprises TMTS MAC address 2902 in six octets, cTM MAC address 2904 in six octets, the number of assigned ports of a cTM 2906 (with each port associated with one active FMS data flow) in one octet, the number of assigned payload octets 2908 in two octets, and the number of unassigned payload octets 2910 in two octets.

As shown in FIG. 30, the format of the actual downstream MPEG allocation map includes a one octet TMTS port ID 3001 and a one octet cTM port ID 3002 that together identify one associated FMS data flow. Basically, the TMTS port ID 3001 as well as the cTM port ID are associated with the attachment port numbers in FIG. 13, which generally correspond to active FMS data flows. The number of different MPEG PIDs 3003 allocated to an active FMS data flow is contained in one octet. The values of the thirteen-bit MPEG PIDs 3004 that are part of an FMS data flow are contained in two octets. For each of the MPEG PIDs 3004 that are part of an FMS data flow, the MPEG payload allocation bitmap 3005 comprises 23 octets or 184 bits. Each bit in the 184 bits of the bitmap 3005 is 0 if the corresponding octet in the 184 octet MPEG packet payload is not allocated to the FMS data flow, whereas the bit is set to 1 if the corresponding octet in the 184 octet MPEG packet payload is allocated to the FMS data flow.

Generally, the structure of FIG. 30 is in the form of variable length records that can be carried in variable length 802.3/ethernet frames. Each record generally is identified by a TMTS port ID 3001—cTM port ID 3002 pair that relates to one FMS data flow. Then each record specifies the number of MPEG PIDs 3003 assigned to the FMS data flow. Each one of the MPEG PIDs 3004 assigned to an FMS data flow has an associated 23 octet (=184 bits) bitmap 3005 providing an indication of the allocation of the 184 octets in an MPEG payload.

For the purposes of describing FIG. 30, assume that the number of assigned ports 2906 in FIG. 29 contains a value identified by the letter W. This value of w indicates that the downstream MPEG allocation map contains W records identified by the TMTS Port ID—cTM port ID pairs of TMTS Port ID 1—cTM Port ID 1 (3011 and 3012), TMTS Port ID 1—cTM Port ID 1 (3041 and 3042), and through pair TMTS Port ID W—cTM Port ID W (3071 and 3072).

The record associated with TMTS Port ID 1—cTM Port ID 1 (3011 and 3012) has the value of X PIDs 3014. The PID values of the X PIDs 3014 are contained in PID 1 3016, PID 2 3026, and PID X 3036. Each one of the X PIDs is associated with one 184 bit bitmap pattern. Thus, PID 1 3016 is associated with bitmap pattern 1 3018; PID 2 3026 is associated with bitmap pattern 3028; and PID X 3036 is associated with bitmap pattern X 3038.

Similarly, the record associated with TMTS Port ID 2—cTM Port ID 2 (3041 and 3042) has the value of Y PIDs 3044. The PID values of the Y PIDs 3044 are contained in PID 1 3046, PID 2 3056, and PID Y 3066. Each one of the Y PIDs is associated with one 184 bit bitmap pattern. Thus, PID 1 3046 is associated with bitmap pattern 1 3048; PID 2 3056 is associated with bitmap pattern 3058; and PID Y 3066 is associated with bitmap pattern Y 3068.

Also, the record associated with TMTS Port ID Z—cTM Port ID Z (3071 and 3072) has the value of Z PIDs 3074. The PID values of the Z PIDs 3074 are contained in PID 1 3076, PID 2 3086, and PID Z 3096. Each one of the Z PIDs is associated with one 184 bit bitmap pattern. Thus, PID 1 3076 is associated with bitmap pattern 1 3078; PID 2 3086 is associated with bitmap pattern 3088; and PID Z 3096 is associated with bitmap pattern Z 3098. The information communicated in the map of FIG. 30 allows both the cTM and the TMTS to have a consistent map of the allocation of octets from MPEG packets with various PIDs to the downstream portion of an FMS data flow between the TMTS and the cTM.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A method of communicating a plurality of flows of frames carried in a packet, the method comprising:
    placing a first octet from a first one of the flows in the packet;
    placing a second octet from a second one of the flows into the packet; and
    transmitting the packet on a frequency channel;
    wherein the first flow of frames contains data that is segregated from the second flow of frames, and wherein one first client device forwards information from the first flow of frames and forwards information from the second flow of frames.

2. The method of claim 1, wherein the packet is an MPEG packet.

3. A method of communicating a plurality of flows of frames carried in a packet, the method comprising:
    placing a first octet from a first one of the flows in the packet;
    placing a second octet from a second one of the flows into the packet; and
    transmitting the packet on a frequency channel;
    wherein the first flow of frames contains data that is segregated from the second flow of frames, and wherein one first client device forwards information from the first flow of frames and discards information from the second flow of frames that is destined for at least one second client device.

4. The method of claim 3, wherein the packet is an MPEG packet.

5. A method of communicating a plurality of frames, each frame including a plurality of octet positions, using a series of packets, each packet including a plurality of octet positions, the method comprising the steps of:
    reading data from one octet position in a first of the frames and placing the data to a specified octet position in a first of the packets in accordance with an allocation map that specifies the octet position in the first packet;
    reading data from another octet position in the first frame and placing the data to a specified octet position in a second of the packets in accordance with the allocation map that specifies the octet position in the second packet;
    transmitting the first packet on a first frequency channel; and
    transmitting the second packet on a second frequency channel different than the first frequency channel.

6. The method of claim 5, wherein the reading of data from one octet position in the first of the frames uses a counter which indexes into the allocation map.

7. The method of claim 5, wherein the reading of data from data at one octet position in the first of the frames further comprises using a counter to determine which packet of the series of packets is the first packet in the series of packets.

8. The method of claim 5, further comprising the steps of:
    selecting, based on the allocation map, the first packet and the octet position in the first packet;
    determining whether the octet position in the first packet and in the second packet are the same; and
    responsive to the determination that the octet positions are the same, selecting the second packet to follow the first packet in the series of packets.

9. The method of claim 5, wherein the reading of data from one octet position in the first frame step further comprises:
    selecting the first packet from the series of packets according to a packet write-in direction whenever the allocation map specifies the same octet number as a last selected packet.

10. The method of claim 5, further comprising the steps of:
    selecting the first frame from a first data flow;
    selecting a second frame from a second data flow different than the first data flow; and
    placing data from an octet position in the second frame to an octet position in one of the packets different than the first packet.

11. The method of claim 10, wherein the first data flow comprises a frame management sublayer data flow.

12. The method of claim 5, wherein the another octet position in the first frame succeeds the one octet position in the first frame, and the reading of data from the another octet position is performed after the step of placing copying data at the one octet position.

13. The method of claim 5, wherein the one octet position in the one of the frames and the another octet position in the one of the frames are consecutive.

14. The method of claim 5, wherein the transmitting steps are performed contemporaneously.

15. The method of claim 5, wherein the frames comprise Ethernet/802.3 frames and the packets comprise MPEG-2 packets.

* * * * *